(12) United States Patent
Wang et al.

(10) Patent No.: US 11,208,571 B2
(45) Date of Patent: Dec. 28, 2021

(54) METHODS FOR NONDESTRUCTIVE DISPERSING OF CARBON NANOMATERIALS IN WATER

(71) Applicant: University of Maryland, College Park, College Park, MD (US)

(72) Inventors: YuHuang Wang, Laurel, MD (US); Peng Wang, Rockville, MD (US); Mijin Kim, New York, NY (US); Chiyu Zhang, Berwyn Heights, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 16/536,166

(22) Filed: Aug. 8, 2019

(65) Prior Publication Data

US 2020/0048489 A1    Feb. 13, 2020

Related U.S. Application Data

(60) Provisional application No. 62/716,156, filed on Aug. 8, 2018.

(51) Int. Cl.
*C09D 11/52* (2014.01)
*C01B 32/172* (2017.01)
(Continued)

(52) U.S. Cl.
CPC ............ *C09D 11/52* (2013.01); *C01B 32/156* (2017.08); *C01B 32/159* (2017.08);
(Continued)

(58) Field of Classification Search
CPC ..................................................... C09D 11/52
See application file for complete search history.

(56) References Cited

U.S. PATENT DOCUMENTS 5,853,877 A    12/1998    Shibuta
7,070,753 B2    7/2006    Niu et al.
(Continued)

FOREIGN PATENT DOCUMENTS

JP    2016524586 A    8/2016
WO    2009/055831 A1    4/2009

OTHER PUBLICATIONS

Arnold et al. (2006) "Sorting carbon nanotubes by electronic structure using density differentiation," Nat. Nanotech. 1: 60-65.
(Continued)

*Primary Examiner* — William D Young
(74) *Attorney, Agent, or Firm* — Leydig, Voit & Mayer, Ltd.

(57) ABSTRACT

A method termed "superacid-surfactant exchange" (S2E) for the dispersion of carbon nanomaterials in aqueous solutions. This S2E method enables nondestructive dispersion of carbon nanomaterials (including single-walled carbon nanotubes, double-walled carbon nanotubes, multi-wall carbon nanotubes, and graphene) at rapidly and at large scale in aqueous solution without a requirement for expensive or complicated equipment. Dispersed carbon nanotubes obtained from this method feature long length, low defect density, high electrical conductivity, and in the case of semiconducting single-walled carbon nanotubes, bright photoluminescence in the near-infrared.

23 Claims, 35 Drawing Sheets

(51) Int. Cl.

| | |
|---|---|
| *C01B 32/159* | (2017.01) |
| *C01B 32/156* | (2017.01) |
| *C01B 32/21* | (2017.01) |
| *C01B 32/194* | (2017.01) |
| *C01B 32/19* | (2017.01) |
| *C09D 11/037* | (2014.01) |
| *C01B 32/174* | (2017.01) |

(52) U.S. Cl.
CPC .......... *C01B 32/172* (2017.08); *C01B 32/174* (2017.08); *C01B 32/19* (2017.08); *C01B 32/194* (2017.08); *C01B 32/21* (2017.08); *C09D 11/037* (2013.01); *C01B 2202/02* (2013.01); *C01B 2202/04* (2013.01); *C01B 2202/06* (2013.01); *C01B 2202/22* (2013.01); *C01B 2202/28* (2013.01); *C01B 2202/34* (2013.01)

(56) References Cited

U.S. PATENT DOCUMENTS

| | | |
|---|---|---|
| 7,074,310 B2 | 7/2006 | Smalley et al. |
| 7,125,502 B2 | 10/2006 | Smalley et al. |
| 7,288,238 B2 | 10/2007 | Smalley et al. |
| 7,374,649 B2 | 5/2008 | Jagota et al. |
| 7,632,762 B2 | 12/2009 | Tiano et al. |
| 8,153,014 B2 | 4/2012 | Doorn et al. |
| 8,518,472 B2 | 8/2013 | Veerasamy |
| 8,703,090 B2 | 4/2014 | Tour et al. |
| 8,803,094 B2 | 8/2014 | Leeds et al. |
| 9,136,030 B2 | 9/2015 | Heintz et al. |
| 9,157,003 B2 | 10/2015 | Landorf et al. |
| 9,534,319 B2 | 1/2017 | Tour et al. |
| 9,545,584 B2 | 1/2017 | Khripin et al. |
| 9,718,691 B2 | 8/2017 | Johnson et al. |
| 9,763,964 B2 | 9/2017 | Pellicciari et al. |
| 9,983,058 B2 | 5/2018 | Wang et al. |
| 2005/0009039 A1 | 1/2005 | Jagota et al. |
| 2007/0280876 A1* | 12/2007 | Tour ...................... B82Y 40/00 423/460 |
| 2010/0111814 A1 | 5/2010 | Doorn et al. |
| 2014/0366773 A1 | 4/2014 | Johnson et al. |
| 2015/0238929 A1* | 8/2015 | Wei ...................... C01B 32/174 502/401 |
| 2015/0298164 A1 | 10/2015 | Pasquali et al. |
| 2016/0362300 A1* | 12/2016 | Debski ................ B01F 17/0021 |
| 2018/0265779 A1 | 9/2018 | Wang et al. |

OTHER PUBLICATIONS

Behabtu et al. (2013) "Strong, Light, Multifunctional Fibers of Carbon Nanotubes with Ultrahigh Conductivity," Science 339(6116): 182-186.
Booker et al. (2009) "High-shear treatment of single-walled carbon nanotube-superacid solutions as a pre-processing technique for the assembly of fibres and films," Proc. IMechE, Part N: J. Nanoengineering and Nanosystems 222: 101-109.
Choi et al. (Oct. 2017) "Fabrication of water-dispersible single-walled carbon nanotube powder using N-methylmorpholine N-oxide," Nanotechnology 28, 465706:1-8.
Cognet et al. (2007) "Stepwise quenching of exciton fluorescence in carbon nanotubes by single-molecule reactions," Science 316(5830): 1465-1468.
Davis et al. (2004) "Phase Behavior and Rheology of SWNTs in Superacids," Macromolecules 37(1): 154-160.
Davis et al. (2009) "True solutions of single-walled carbon nanotubes for assembly into macroscopic materials," Nat. Nanotech. 4: 830-834.
De Volder et al. (2013) "Carbon nanotubes: Present and future commercial applications," Science 339(6119): 535-539.
Dyke et al. (2004) "Overcoming the insolubility of carbon nanotubes through high degrees of sidewall functionalization," Chem. Eur. J. 10(4): 812-817.
Ewels et al. (2005) "Nitrogen Doping in Carbon Nanotubes," J. Nanosci. Nanotech. 5(9): 1345-1363.
Fagan et al. (2014) "Isolation of Specific Small-Diameter Single-Wall Carbon Nanotube Species via Aqueous Two-Phase Extraction," Advanced Materials 26(18): 2800-2804.
Fagan et al. (2015) "Isolation of >1 nm Diameter Single-Wall Carbon Nanotubes Species Using Aqueous Two-Phase Extraction," ACS Nano 9(5): 5377-5390.
Fagan (Jul. 2019) "Aqueous two-polymer phase extraction of single-wall carbon nanotubes using surfactants," Nanoscale Adv. 1: 18 pp.
Gao et al. (2015) "Optical detection of individual ultra-short carbon nanotubes enables their length characterization down to 10 nm," Sci. Rep. 5: 17093.
Geng et al. (2007) "Effect of acid treatment on carbon nanotube-based flexible transparent conducting films," J. Am. Chem. Soc. 129(25): 7758-7759.
Girifalco et al. (2000) "Carbon nanotubes, buckyballs, ropes, and a universal graphitic potential," Phys. Rev. B 62(19): 13104-13110.
Graf et al. (2016) "Large scale, selective dispersion of long single-walled carbon nanotubes with high photoluminescence quantum yield by shear force mixing," Carbon 105: 593-599.
Gui et al. (2015) "Redox Sorting of Carbon Nanotubes," Nano Lett. 15(3): 1642-1646.
Haggenmueller et al. (2008) "Comparison of the quality of aqueous dispersions of single wall carbon nanotubes using surfactants and biomolecules," Langmuir 24(9): 5070-5078.
Harrah et al. (2011) "The Role of Length and Defects on Optical Quantum Efficiency and Exciton Decay Dynamics in Single-Walled Carbon Nanotubes," ACS Nano 5(1): 647-655.
Hecht et al. (2006) "Conductivity scaling with bundle length and diameter in single walled carbon nanotube networks," Appl. Phys. Lett. 89(13): 133112.
Hecht et al. (2011) "Emerging transparent electrodes based on thin films of carbon nanotubes, graphene, and metallic nanostructures," Adv. Mater. 23(13): 1482-1513.
Hecht et al. (2011) "High conductivity transparent carbon nanotube films deposited from superacid," Nanotechnology 22, 075201: 1-5.
Hecht et al. (2011) Corrigendum to "High conductivity transparent carbon nanotube films deposited from superacid," Nanotechnology 22, 169501: 1 pp.
Hernandez et al. (2008) "High-yield production of graphene by liquid-phase exfoliation of graphite," Nature Nanotechnology 3: 563-568.
Hersam (2008) "Progress towards monodisperse single-walled carbon nanotubes," Nat. Nanotech. 3: 387-394.
Hofmann et al. (2010) "Bile salts of vertebrates: structural variation and possible evolutionary significance," Journal of Lipid Research 51: 226-246.
Hong et al. (2015) "Carbon Nanomaterials for Biological Imaging and Nanomedicinal Therapy," Chem. Rev. 115(19): 10816-10906.
Kang et al. (2012) "Transparent Indium Oxide Films Doped with High Lewis Acid Strength Ge Dopant for Phosphorescent Organic Light-emitting Diodes," J. Phys. Chem. D: Appl. Phys. 45(32): 325102.
Khripin et al. (2013) "Spontaneous partition of carbon nanotubes in polymer-modified aqueous phases," J. Am. Chem. Soc. 135(18): 6822-6825.
Landry et al. (published online Jan. 2017) "Single-molecule detection of protein efflux from microorganisms using fluorescent single-walled carbon nanotube sensor arrays," Nat. Nanotech. (Apr. 2017) 12: 368-377.
Li et al. (2008) "Processable aqueous dispersions of graphene nanosheets," Nature Nanotechnology 3: 101-105.
Lotya et al. (2009) "Liquid Phase Production of Graphene by Exfoliation of Graphite in Surfactant/Water Solutions," J. Am. Chem. Soc. 131(10): 3611-3620.
Lu et al. (1996) "Mechanical damage of carbon nanotubes by ultrasound," Carbon 34(6): 814-816.

(56) References Cited

OTHER PUBLICATIONS

Mirri et al. (2012) "High-performance carbon nanotube transparent conductive films by scalable dip coating," ACS Nano 6(11): 9737-9744.

Miyata et al. (2010) "Solution-phase extraction of ultrathin inner shells from double-wall carbon nanotubes," ACS Nano 4(10): 5807-5812.

Moore et al. (2003) "Individually Suspended Single-Walled Carbon Nanotubes in Various Surfactants," Nano Letters 3(10):1379-182.

O'Connell et al. (2002) "Band gap fluorescence from individual single-walled carbon nanotubes," Science 297(5581): 593-596.

Parra-Vasquez et al. (2010) "Spontaneous dissolution of ultralong single- and multiwalled carbon nanotubes," ACS Nano 4(7): 3969-3978.

Penicaud et al. (2005) "Spontaneous Dissolution of a Single-Wall Carbon Nanotube Salt," J. Am. Chem. Soc. 127(1):8-9.

Qiu et al. (2010) "Dispersing Carbon Nanotubes with Graphene Oxide in Water and Synergistic Effects between Graphene Derivatives," Chemistry: A European Journal 16(35): 10653-10658.

Roxbury et al. (2015) "Hyperspectral microscopy of near-infrared fluorescence enables 17-chirality carbon nanotube imaging," Sci. Rep. 5: 14167.

Shin et al. (2012) "Nitrogen-Doped Multiwall Carbon Nanotubes for Lithium Storage with Extremely High Capacity," Nano Letters 12(5): 2283-2288.

Subbaiyan et al. (2014) "Role of Surfactants and Salt in Aqueous Two-Phase Separation of Carbon Nanotubes toward Simple Chirality Isolation," ACS Nano 8(2): 1619-1628.

Subbaiyan et al. (2015) "Bench-top aqueous two-phase extraction of isolated individual single-walled carbon nanotubes," Nano Res. 8: 1755-1769.

Tabakman et al. (2010) "Optical properties of single-walled carbon nanotubes separated in a density gradient: Length, bundling, and aromatic stacking effects," J. Phys. Chem. C 114(46): 19569-19575.

Tu et al. (2009) "DNA sequence motifs for structure-specific recognition and separation of carbon nanotubes," Nature (London, United Kingdom) 460: 250-253.

University of Maryland Ventures (Jul. 2018) "Nondestructive Dispersion of Carbon Nanotubes in Water," Available online at www.umventures.org/technologies/nondestructive-dispersion-carbon-nanotubes-water#comment-0, 2 pp.

Varade et al. (2004) "Mixed micelles of cationic surfactants and sodium cholate in water," Indian Journal of Biochemistry & Biophysics 41: 107-112.

Wang et al. (Aug. 9, 2017) "Superacid-Surfactant Exchange: Enabling Nondestructive Dispersion of Full-Length Carbon Nanotubes in Water," ACS Nano 11(9): 9231-9238.

Wang et al. (Aug. 9, 2017) "Superacid-Surfactant Exchange: Enabling Nondestructive Dispersion of Full-Length Carbon Nanotubes in Water," ACS Nano 11(9): 9231-9238, supporting information.

Wang et al. (published online Aug. 9, 2018) "Stretchable Transparent Conductive Films from Long Carbon Nanotube Metals," Small (Sep. 2018) 14(38), 1802625: 9 pp.

Wang et al. (May 2019) "Superacid-Surfactant Exchange," 235th ECS Meeting: Dallas, TX. May 26-30, 2019: 28 pp.

Wenseleers et al. (2004) "Efficient isolation and solubilization of pristine single-walled nanotubes in bile salt micelles," Adv. Func. Mater. 14(11): 1105-1112.

Wu et al. (2004) "Transparent, conductive carbon nanotube films," Science 305(5688): 1273-1277.

Zhai et al. (Sep. 2018) "Reversible dispersion and precipitation of single-walled carbon nanotubes using a pH-responsive rigid surfactant," Chem. Commun. 54(86): 12171-12173.

Zhang et al. (2014) "Single-Step Total Fractionation of Single-Wall Carbon Nanotubes by Countercurrent Chromatography," Analytical Chemistry 86(8): 3980-3984.

Yang et al. (2020) "Chirality Pure Carbon Nanotubes: Growth, Sorting, and Characterization," Chemical Reviews 120: 2693-2758.

\* cited by examiner

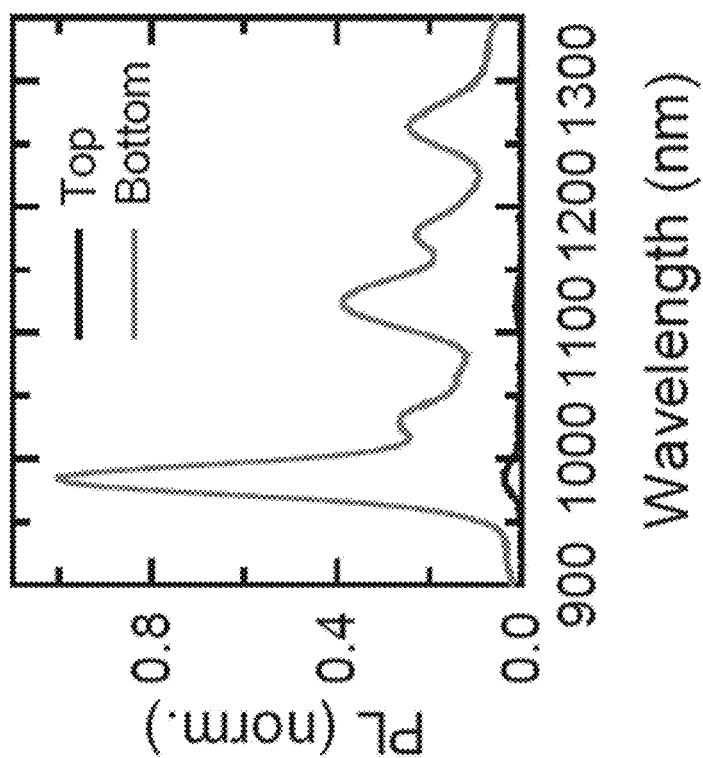
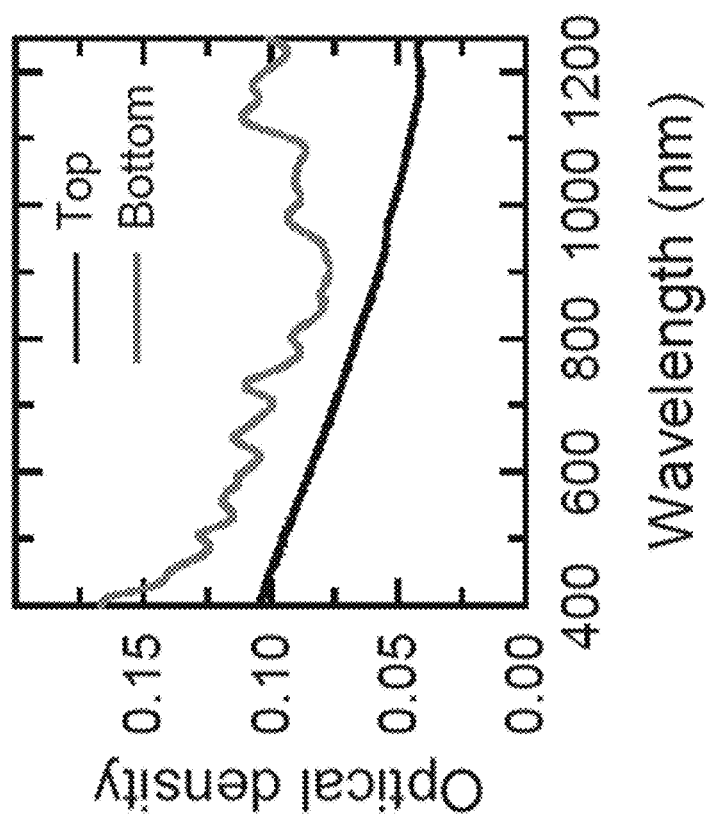
FIG. 5C
FIG. 5B

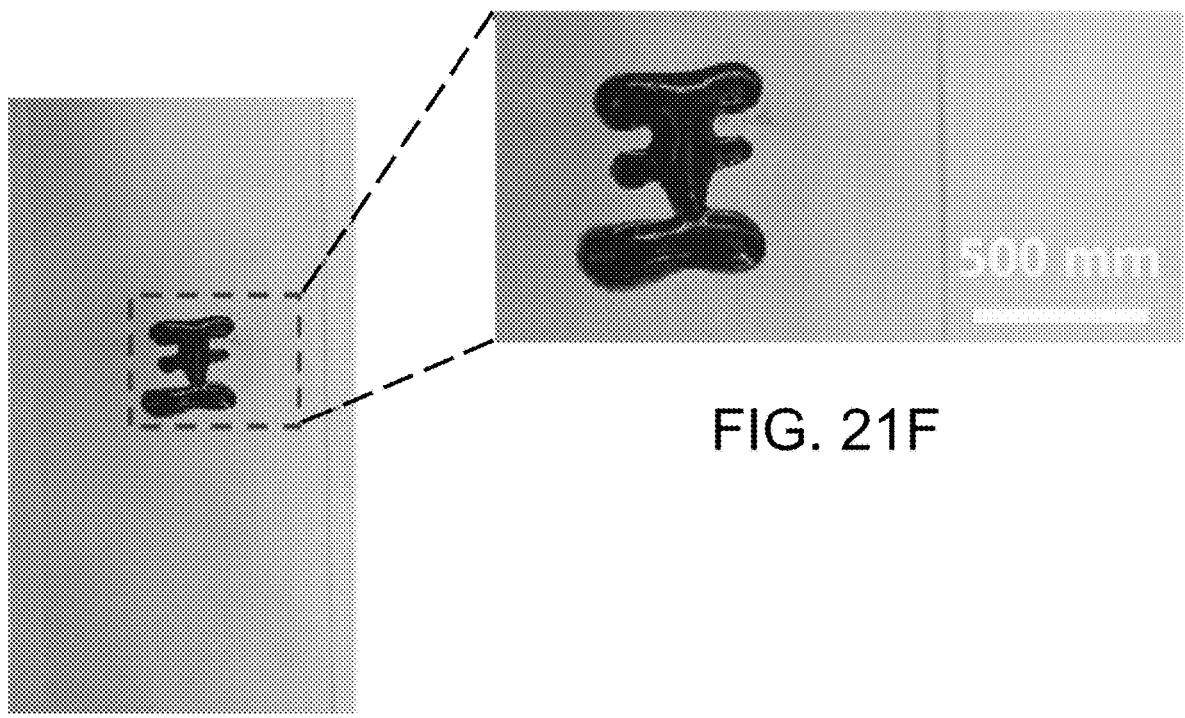
FIG. 21E
FIG. 21F
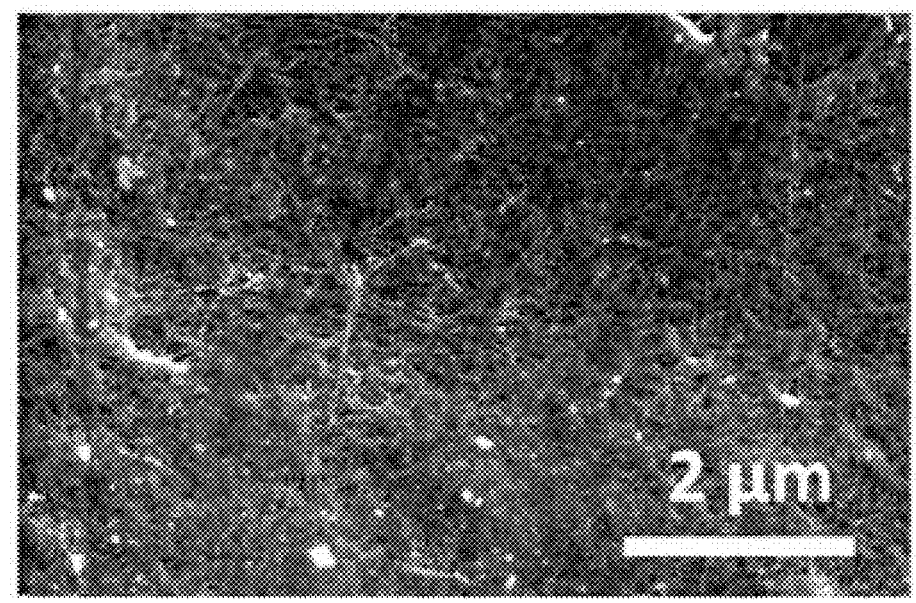
FIG. 21G

METHODS FOR NONDESTRUCTIVE DISPERSING OF CARBON NANOMATERIALS IN WATER

CROSS-REFERENCE TO RELATED APPLICATIONS

This application claims the benefit of U.S. Provisional Application No. 62/716,156, filed Aug. 8, 2018 which is incorporated by reference herein in its entirety.

STATEMENT REGARDING FEDERALLY SPONSORED RESEARCH OR DEVELOPMENT

This invention was made with government support under DEAR0000527 awarded by DOE ARPA-E, CHE1507974 awarded by NSF, and FA95501610150 awarded by AFOSR. The government has certain rights in the invention.

BACKGROUND OF THE INVENTION

The remarkable optical, electrical, and mechanical properties of carbon nanotubes come with an important caveat: they only occur in long, low-defect, and individually dispersed nanotubes. Attaining aqueous solutions of individual carbon nanotubes is a critical first step for harnessing the extraordinary properties of these materials for a broad range of applications. However, carbon nanotubes have a natural tendency to bundle together due to cumulatively strong van der Waals interactions (~0.5 eV/nm for 1.4 nm diameter nanotubes [Girifalco, 2000]) with the resulting, less exceptional material properties being more representative of the agglomerated bundle than of the individual tubes. To overcome this limitation, a method of dispersing surfactant-stabilized individual single-walled carbon nanotubes (SWCNTs) in aqueous solutions via ultrasonication followed by ultracentrifugation was reported [O'Connell, 2002]. This technique and its variants allow SWCNTs to be studied and chemically manipulated at the single nanotube level [Cognet, 2007; Hong, 2015; Landry, 2017] and to be further isolated into pure single chirality SWCNT structures [Arnold, 2006; Hersam, 2008; Tu, 2009; Khripin, 2013; Subbaiyan, 2014].

However, ultrasonication also damages SWCNTs, creating defects and cutting them into short pieces [Lu, 1996; Miyata, 2010; Gao, 2015], which dramatically degrade the electrical conductivity, weaken the mechanical strength, and in the case of semiconducting SWCNTs, quench the photoluminescence (PL) [Cognet, 2007; Hecht, 2006; Tabakman, 2010; Harrah, 2011]. Furthermore, both ultrasonication and ultracentrifugation require costly equipment, and the methods are time consuming and energy intensive, all of which present significant challenges to large-scale production. Many current studies that use individually dispersed SWCNTS are largely limited to the shorter versions of this material (typically 300-500 nm, e.g., less than 1 micron).

To overcome these problems, alternative methods have been actively pursued. It has been reported that gentle stirring of SWCNTs in aqueous surfactant solutions can scratch off lose nanotubes from the surface without causing measurable damage to their carbon bonding structure [Wenseleers, 2004; Subbaiyan, 2015]. However, the procedure takes several weeks and the yield is extremely low, limiting it to microscopic sample preparation. Graf, 2016 recently reported high-speed shear mixing as a way to successfully disperse SWCNTs in toluene, but the method is energy intensive and time consuming (i.e., 96 h of high speed shear mixing is required). Moreover, toluene is incompatible with common SWCNT sorting processes that are aqueous based [Arnold, 2006; Hersam, 2008; Tu, 2009; Khripin, 2013; Subbaiyan, 2014] and is a less environmentally friendly solvent compared to water. Covalent surface modifications can render SWCNTs soluble in water after heavy functionalization [Dyke, 2004], but functionalization can also cause the loss of both the optical and electrical properties that make SWCNTs attractive materials.

Although SWCNTs are generally difficult to disperse in aqueous solutions, Pénicaud, 2005 reported that Li/Na-reduced SWCNT salts can dissolve in some organic solvents. Notably, it has been reported that SWCNTs will spontaneously dissolve in superacids. [Davis, 2009]. The discovery of this solvent for SWCNTs has led to the fabrication of high-quality CNT fibers and thin films [Behabtu, 2013]. Unfortunately, both Li/Na and superacids are extremely reactive and corrosive, making them incompatible with established SWCNT sorting methods and many other applications [Arnold, 2006; Tu, 2009; Khirpin, 2013; Subbaiyan, 2014; U.S. Pat. No. 9,545,584; US Pub. Application 2010/0111814; U.S. Pat. No. 8,153,014].

The method and materials of the present invention provide solutions to the problems noted above and provide aqueous dispersions of carbon nanomaterials useful in a wide variety of applications.

SUMMARY OF THE INVENTION

In one aspect, the invention provides a method, herein designated superacid surfactant exchange (S2E), to nondestructively disperse carbon nanomaterials in aqueous solution. The method is applicable to various carbon nanomaterials that are individually dispersed in superacid. In particular S2E methods herein are useful for nondestructive dispersion of carbon nanotubes (single-walled carbon nanotubes (SWCNTs), double-walled carbon nanotubes (DWCNTs), multi-walled carbon nanotubes (MWCNTs)), graphite and graphite oxide (dispersed to form graphene and graphene oxide), and graphene (reduced and oxidized) nanoribbons. In particular, the S2E-SWCNT process is employed to nondestructively disperse single-wall carbon nanotubes in aqueous solution. Carbon nanotubes dispersed by the S2E method exhibit long length and low defect density. More specifically, SWCNTs dispersed by this method feature long length and low defect density as well as bright and homogenous photoluminescence. Carbon nanomaterials dispersed in aqueous solution by the S2E method exhibit lower defects than carbon nanomaterials dispersed in aqueous solution employing sonication. The S2E method does not employ sonication, ultrasonication or ultracentrifugation. The S2E method does not require covalent chemical functionalization of carbon nanomaterials.

Methods of this invention provide individually dispersed carbon nanomaterials which can be further processed by established sorting techniques, particularly those established for sorting of carbon nanotubes. In particular, the S2E method herein when combined with established carbon nanotube sorting methods provides full-length, chirality-sorted SWCNTs for a wide range of applications.

In embodiments, the invention provides a method for dispersion of a carbon nanomaterial in aqueous solution which comprises adding carbon nanomaterial that is dissolved in a superacid acid, into a basic aqueous solution containing a steroid acid surfactant such that the carbon nanomaterials are dispersed in aqueous solution. In specific embodiments, the steroid acid surfactant is a cholate salt or derivative thereof selected from a salt of cholate, deoxycholate, chenodeoxycholate, ursodeoxycholate, lithocholate, obeticholate, taurine or glycine conjugates thereof, and mixtures thereof. In a more specific embodiment, the steroid acid surfactant is selected from a sodium or ammonium salt of cholate, deoxycholate, chenodeoxycholate, ursodeoxycholate, lithocholate, obeticholate and taurine or glycine conjugates thereof and mixtures thereof. In more specific embodiments, the steroid acid surfactant is sodium cholate, sodium deoxychloate or a mixture thereof. In more specific embodiments, the steroid acid surfactant is ammonium cholate, ammonium deoxychloate or a mixture thereof.

In an embodiment, the method further comprises the step of dissolving the carbon nanomaterial in a selected superacid or mixture of superacids. In an embodiment, the further step is dissolution of carbon nanotubes in a selected superacid or mixture of superacids. In an embodiment, the further step is dissolution of graphite in a selected superacid or mixture of superacids.

In general any superacid can be used for dissolution of carbon nanotubes. In preferred embodiments, the superacid employed does not induce significant levels of oxidization of the carbon nanomaterials. In embodiments, the preferred superacid is chlorosulfonic acid.

In embodiments, the carbon nanomaterials are single-walled carbon nanotubes, double-walled carbon nanotubes, multi-walled carbon nanotubes, graphite, graphite oxide or graphene nanoribbons. In embodiments, the carbon nanomaterials are SWCNTs. In embodiments, the carbon nanomaterials are graphite or graphite oxide, which is dispersed as graphene or graphene oxide sheets or flakes, respectively. In embodiments, the carbon nanomaterials are organic-color-center-tailored carbon nanotubes or N-doped carbon nanotubes.

In specific embodiments, the carbon nanomaterials are single-walled carbon nanotubes and the steroid acid surfactant is sodium or ammonium deoxycholate.

In specific embodiments, the carbon nanomaterial is graphite, the steroid acid surfactant is sodium or ammonium cholate and the aqueous dispersion comprises graphene.

In embodiments, the concentration of carbon nanomaterials dissolved in the superacid ranges from 0.001 mg/mL to 20 mg/mL. More specifically, the concentration of carbon nanomaterials dissolved in the superacid ranges from 0.1 mg/mL to 20 mg/mL. More specifically, the concentration of carbon nanomaterials dissolved in the superacid ranges from 0.1 mg/mL to 10 mg/mL.

In embodiments, the concentration of steroid acid surfactant in the basic aqueous solution ranges from 0.01 wt/v % to 2 wt/v % (mg/100 mL). In embodiments, the concentration of steroid acid surfactant in the basic aqueous solution ranges from 0.1 wt/v % to 1.5 wt/v %. More specifically, the concentration of steroid acid surfactant in the basic aqueous solution ranges from 0.1 wt/v % to 1 wt/v %.

In embodiments, the basic aqueous solution to which the superacid solution is added has pH higher than 13. In embodiments, the basic aqueous solution has OH concentration ranging from 0.1 to 3 M (mole/Liter). In embodiments, the basic aqueous solution has OH concentration ranging from 0.5 to 2 M (mole/Liter). In embodiments, the basic aqueous solution has OH concentration ranging from 0.5 to 1 M (mole/Liter).

The superacid carbon nanomaterial solution is added to the basic aqueous solution until the pH of the resulting mixture is below pH 13.0. The superacid carbon nanomaterial solution is added to the basic aqueous solution until the pH of the resulting mixture ranges from the pKa of the steroid acid of the steroid acid surfactant to pH 13.0. The pKa of deoxycholic acid is 6.58 and the pKa of cholic acid is 6.4. Addition of superacid carbon nanomaterial solution can continue until the pH is lowered to about the pKa of the steroid acid, such that the steroid acid surfactant remains in solution. In an embodiment, the steroid acid is deoxycholic acid and the superacid solution of carbon nanomaterials is added to the basic solution until the pH of the resulting mixture ranges from about pH 6.6 to pH 13, such that the steroid acid salt is soluble in the aqueous solution. In specific embodiments, the superacid carbon nanomaterial solution is added to the basic aqueous solution until the pH of the resulting mixture is between 8 and 13. In other specific embodiments, the superacid carbon nanomaterial solution is added to the basic aqueous solution, until the pH of the resulting mixture is between 9 and 12. In other specific embodiments, the superacid carbon nanomaterial solution is added to the basic aqueous solution, until the pH of the resulting mixture is between 10.5 and 11.5.

In an embodiment, SWCNTs dispersed in aqueous solution by S2E have average length greater than the carbon nanotubes prior to dispersion. In an embodiment, SWCNTs dispersed in aqueous solution by S2E have average length of 1-5 microns. In an embodiment, SWCNTs dispersed in aqueous solution by S2E have average length of 5-10 microns. In an embodiment, SWCNTs dispersed in aqueous solution by S2E have average length of 10 microns or greater.

In an embodiment, where single-walled carbon nanotubes are dissolved in chlorosulfonic acid, the superacid solution is added to a basic solution of sodium or ammonium deoxycholate.

In an embodiment, where graphite is dissolved in chlorosulfonic acid, the superacid solution is added to a basic solution of sodium or ammonium cholate.

In an embodiment, the S2E method further comprises removing undissolved particulates from the aqueous dispersion of carbon nanomaterials. In an embodiment, undissolved particulates are removed by subjecting the dispersion to low-speed centrifugation.

In another aspect, the disclosure provides an efficient method to selectively remove the inorganic salt in the aqueous solution after S2E, and if desired adjust the concentration of the surfactant stabilized carbon nanomaterials in the aqueous solution. In an embodiment, the concentration can be adjusted to obtain more concentrated dispersions. In an embodiment, the concentration can be adjusted to obtain a more dilute dispersions. This modification of the S2E method includes a step of adding a second surfactant, other than the steroid acid surfactant in the dispersion, to the aqueous dispersion of carbon nanotubes.

In an embodiment, the S2E method further comprises adding a second surfactant to the aqueous dispersion of carbon nanomaterials to cause phase separation. In an embodiment, the phase separation is separation into two phases. In an embodiment, phase separation results in a separation of carbon nanomaterials with different structure or properties. In an embodiment, phase separation results in concentration of carbon nanomaterials in one of the separated phases. In an embodiment, the S2E method further comprises adding a second surfactant to the aqueous dispersion of carbon nanomaterials to cause phase separation, wherein the carbon nanomaterials are predominantly found in one of the separated phases. In embodiments, the second surfactant is a cationic surfactant, or an anionic surfactant. In embodiments, the second surfactant is a steroid acid salt surfactant other than the steroid acid salt surfactant in the dispersion. In an embodiment, the second surfactant is the cationic surfactant cetyltrimethylammonium bromide. In an embodiment, the second surfactant is the anionic surfactant sodium dodecyl sulfate. In an embodiment, the amount and type of second surfactant added is sufficient to induce phase separation.

In an embodiment of the S2E methods herein the S2E method further comprising adjusting the pH of the initial aqueous dispersion of carbon nanomaterials to a lower pH to precipitate surfactant-encapsulated nanomaterials out of the aqueous solution; separating the aqueous solution from the precipitated surfactant-encapsulated nanomaterials; addition of a second aqueous solution having increased pH to the precipitated surfactant-encapsulated nanomaterials to redisperse the carbon nanomaterials in the second aqueous solution. In an embodiment, the pH of the aqueous dispersion is lowered to below the pKa of the steroid acid of the surfactant and the pH of the second aqueous solution is above the pKa of the steroid acid of the surfactant. In an embodiment, this method is employed to adjust the concentration of the carbon nanomaterials in the aqueous dispersion. In an embodiment, the volume of second aqueous solution added is less than the volume of the initial aqueous solution separated from the precipitated surfactant-encapsulated nanomaterials and the redispersed aqueous dispersion is more concentrated in carbon nanomaterials than the initial aqueous dispersion of carbon nanomaterials. In an embodiment, the volume of second aqueous solution added is more than the volume of the initial aqueous solution separated from the precipitated surfactant-encapsulated nanomaterials and the redispersed aqueous dispersion is less concentrated in carbon nanomaterials than the initial aqueous dispersion of carbon nanomaterials.

In an embodiment, the invention provides an aqueous dispersion of individually dispersed carbon nanomaterials prepared by the S2E method. In an embodiment, the carbon nanomaterials of the dispersion are single-walled carbon nanotubes. In an embodiment, the carbon nanomaterials of the dispersion are graphene, graphene oxide, or graphene or graphene nanoribbons. In an embodiment, the SWCNT of the aqueous dispersion have average length ranging from 1-5 nm. In an embodiment, the SWCNTs of the aqueous dispersion have average length over 3 nm. In an embodiment, the SWCNTs of the aqueous dispersion have average length over 5 nm. In an embodiment, the aqueous dispersions prepared by the S2E method contain a concentration in the dispersion of 0.1 mg/mL to 100 mg/mL. More specifically, the concentration of carbon nanomaterials in the dispersion is greater than 0.5 mg/mL. More specifically, the concentration of carbon nanomaterials in the dispersion is greater than 1 mg/mL. In an embodiment, the invention provides an aqueous dispersion of individually dispersed carbon nanotubes wherein the carbon nanotubes have average length ranging from 1-10 micron, or 1-5 micron and a concentration in the dispersion of 1 mg/mL or higher.

In a related aspect, the invention provides improved methods for purifying and sorting carbon nanomaterials, particularly carbon nanotubes. These new methods employ aqueous dispersion prepared by S2E methods as starting materials for such purification and sorting. The methods are improved in that the new starting dispersions contain carbon nanomaterials that have not been significant damaged by use of destructive carbon nanomaterial dispersion methods.

In yet another aspect, the disclosure provides a technique of sorting longer carbon nanotubes with single chirality purity which applies the two phase (ATP or ATPE) method to separate S2E-SWCNTs. In an embodiment, the invention provides a method for separating carbon nanotubes by chirality which comprises:

mixing the aqueous dispersion prepared by the method of claim 1 with a second surfactant to generate phase separation into a first phase and a second phase, wherein a first fraction of the dispersed carbon nanotubes of a first chirality enter the first phase and a second fraction of the dispersed carbon nanotubes of a second chirality enter the second phase; and separating the first and second phases to separate the carbon nanotubes by chirality. In an embodiment, the second surfactant is selected from cetyltrimethyl ammonium bromide or sodium dodecylsulfate.

In yet another aspect, the disclosure provides a method of fabricating transparent conductive films (TCFs) from the obtained S2E carbon nanomaterial with high optoelectronic performance. In an embodiment, the invention provides a method for making a conductive transparent film of carbon nanomaterials which comprises forming a film from an aqueous dispersion prepared by S2E. In an embodiment, the carbon nanomaterial is a carbon nanotube. In an embodiment, the carbon nanomaterial is a SWCNT. In an embodiment, the SWCNT is a semi-conducting SWCNT. In an embodiment, the film exhibits sheet resistance below 130 Ω/sq at 83% transmittance. The invention further provides thin conducting films of carbon nanomaterials prepared from S2E aqueous dispersions.

In yet another aspect, the invention provides a method for making precipitates from the aqueous dispersions, termed clays herein, which can be used in various applications and in particular can be used to prepare carbon nanomaterial inks. In an embodiment, the invention provides a method for making a carbon nanotube clay which comprises precipitating a mixture of carbon nanotubes and steroid acid salt surfactant from an aqueous disperse prepared by the method of claim 1 and adjusting the pH to precipitate the steroid acid salt surfactant and carbon nanotubes and collecting the precipitated carbon nanotube clay. In an embodiment, this method further comprising redispersing the precipitated carbon nanotube clay by mixing the clay with basic water to obtain a carbon nanotube composition suitable as an ink. In an embodiment, the carbon nanotube clay comprises semiconducting carbon nanotubes and sodium deoxycholate or ammonium deoxycholate. In an embodiment, the carbon nanotube clay comprises metallic carbon nanotubes and sodium deoxycholate or ammonium deoxycholate. In an embodiment, the weight ratio of carbon nanotubes to steroid acid salt surfactant in the clay ranges is higher than 0.1. In an embodiment, the weight ratio of carbon nanotubes to steroid acid salt surfactant in the clay ranges from 0.5 to 5. In an embodiment, the weight ratio of carbon nanotubes to steroid acid salt surfactant in the clay ranges from 0.5 to 1. In an embodiment, the weight ratio of carbon nanotubes to steroid acid salt surfactant in the clay ranges from 0.4 to 0.6. In an embodiment, the clays can comprise a mixture of steroid acid salt surfactant and cationic surfactant or a mixture of steroid acid surfactant and anionic surfactant. In embodiments, such clays are prepared by the method above, with the added step of introducing the anionic surfactant or cationic surfactant. In embodiment, the weight ratio of steroid acid salt surfactant to anionic surfactant or cationic surfactant generally ranges from 20 to 1. In embodiments, the weight ratio of steroid acid salt surfactant to anionic surfactant or cationic surfactant ranges from 20 to 5. In embodiments, the weight ratio of steroid acid salt surfactant to anionic surfactant or cationic surfactant ranges from 10 to 1.

In an embodiment, the invention provides compositions comprising carbon nanomaterials and surfactants, particularly as precipitated from aqueous dispersions as described herein. These compositions are designated clays herein. In an embodiment, the clays readily dispersed on addition of water and pH adjustment. In specific embodiments, the surfactant is a steroid acid salt surfactant and the composition contains no cationic or anionic surfactant. In specific embodiments, the surfactant is a mixture of a steroid acid salt surfactant and an anionic surfactant. In embodiments, the surfactant is a mixture of a steroid acid salt and a cationic surfactant. In an embodiment, the weight ratio of carbon nanomaterial to surfactant in the clay is greater than 0.1. In an embodiment, the weight ratio of carbon nanomaterial to surfactant in the clay ranges from 0.05 to 5. In an embodiment, the weight ratio of carbon nanomaterial to surfactant in the claim ranges from 0.4 to 0.6. In an embodiment, the carbon nanomaterials of the clay are carbon nanotubes. In an embodiment, the clay largely consist of a composite of individualized carbon nanotubes and surfactant that readily disperse in water. In an embodiment, the clay comprises at least 10% by weight of a composite of individualized carbon nanotubes and surfactant. In an embodiment, the clay comprises at least 25% by weight of a composite of individualized carbon nanotubes and surfactant. In an embodiment, the clay comprises at least 50% by weight of a composite of individualized carbon nanotubes and surfactant. In an embodiment, the average length of the carbon nanotubes in the clay ranges from 1-5 micron. In an embodiment, the average length of the carbon nanotubes in the clay are longer than 5 micron.

In an embodiment, the invention provides a technique to formulate multifunctional inks containing carbon nanomaterials, particularly from long SWCNTs and electronically pure (semiconducting and metallic) SWCNTs that can be used for various electronics printing applications. The invention also provides carbon nanomaterial inks prepared from carbon nanomaterial clays of the invention.

Other aspects and embodiments of the invention will be apparent to one of ordinary skill in the art on review of the drawings, detailed description and examples of the invention.

BRIEF DESCRIPTION OF THE DRAWINGS

FIG. 1A is the UV-Vis-NIR absorption spectrum of the SWCNTS dispersed in 1 wt % DOC. FIG. 1B is the excitation-emission PL map of 1 wt % DOC stabilized SWCNTs in $D_2O$, showing the optical fingerprints characteristic of individually dispersed SWCNTs.

FIGS. 2A and 2B are the TEM images of different areas of the sample.

FIG. 3A shows UV-Vis-NIR absorption and FIG. 3B shows PL intensity at 565 nm excitation of the S2E-SWCNT solution after 1 h (dashed line) and 3 months (solid line). The inset plots present the relative changes of the optical density and PL intensity over time.

FIG. 4 is a graph plotting the concentration of HiPco SWCNTs in chlorosulfonic acid against the integrated area of the (6,5)-SWCNT PL peak at 565 nm excitation (IPL, black), as well as the integrated area normalized by concentration (IPL-norm, gray). The inset is the PL spectrum of HiPco S2E-SWCNTs prepared at 0.5 mg/mL. The IPL is the integrated shaded area.

FIGS. 5A-5C illustrate extraction of SWCNTs in the DOC-CTAB-SWCNT system. FIG. 5A illustrates the molecular structures of CTAB and DOC, and the proposed surfactant packing on SWCNTs before and after the addition of CTAB to the DOC-SWCNT system. The anionic (−) and cationic (+) headgroups of DOC and CTAB are shown. FIGS. 5B and 5C, are the absorption and PL spectra (at 565 nm excitation) of the separated top (lack) and bottom (gray) phases showing concentration of SWCNTs in the bottom phase. The bottom (gray) fraction was diluted 4 times using 1 wt/v % DOC-$D_2O$ for spectral characterization.

FIG. 7 is a graph of PL intensity at 565 nm excitation as a function of wavelength (nm) for SWCNTS dispersed in aqueous surfactant solution for various surfactants. The concentrations of all surfactant solutions, including SDS (1), CTAB (2), Triton X-100 (3), SDBS (4), and DOC (5), were 1 wt/v % in 0.5 M NaOH in $D_2O$. SWCNTs dispersed in DOC exhibited the strongest PL intensity at 565 nm excitation, which indicates high-quality suspensions of SWCNTs.

FIGS. 8A, 8C, 8E are illustrations of excitation-emission PL mapping for CoMoCAT SG65i, CoMoCAT SG76, and MEIJO eDIPS EC 1.0 SWCNTs, respectively, dispersed in 1 wt/v % DOC-$D_2O$. Corresponding absorption measurements are illustrated in FIGS. 8B, 8D and 8F.

FIGS. 9A and 9B are AFM images of S2E-SWCNTs, sonic-SWCNTs, respectively, on a Si substrate. Scale bars of FIGS. 9A and 9B are: 1 μm. FIG. 9C is a graph showing length distributions of S2E-SWCNTs (gray) and sonic-SWCNTs (black). The length distributions are fitted by log-normal functions (gray and black lines). FIGS. 9D and 9D are graphs showing the average SWCNT length ($L_{avg}$) and Raman ID/IG ratio, respectively, as a function of sonication time. The gray star and black squares represent S2E-SWCNTs and sonic-SWCNTs, respectively. The black star in FIG. 9E represents the raw HiPco SWCNT material.

FIG. 10A compares S2E-SWCNTs (black) and sonic-SWCNTs (gray) prepared from CoMoCAT SG65i. FIG. 10B compares S2E-SWCNTs (black) and sonic-SWCNTs (gray) prepared from CoMoCAT SG76. FIG. 10C compares S2E-SWCNTs (black) and sonic-SWCNTs (gray) prepared from MEIJO eDIPS EC1.0. Length distribution histograms are measured by AFM. Log-normal distribution functions (solid lines) were used to fit the length distributions. AFM images are not shown.

FIG. 12A illustrates I-V curves of TCFs made from S2E-SWCNTs (gray) and sonic-SWCNTs (black) at 75% transmittance at a wavelength of 550 nm. FIG. 12B is a graph illustrating sheet resistance versus optical transmittance for TCFs made from S2E-SWCNTs (gray circles, closed and open) and sonic-SWCNTs (black closed circles). The sources of S2E-SWCNTs used were MEIJO eDIPS EC1.0 (open gray circles) and HiPco (closed gray circles). The star indicates the typical sheet resistance of an ITO film at ~80% transmittance. Other data points (gray squares, triangles, etc.) shown are literature values of HiPco TCFs as cited in the text.

FIGS. 15A and 15B are before immersion in nitric acid and rinsing in water. FIGS. 15C and 15D are after immersion in nitric acid and rinsing in water. FIGS. 15E and 15F are raw HiPco SWCNTs.

FIG. 17 is a graph of sheet resistance over time (days). The sheet resistances (Rs) of five S2E HiPco TCFs in open air (exposed to oxygen) is monitored over a period of 30 days. Error bars represent the standard deviations of sheet resistance changes for the 5 TCFs.

FIG. 18A illustrates the UV-Vis-NIR absorption spectra of HiPco S2E-SWCNT starting material (black) and (6,5)-SWCNTs sorted from S2E-SWCNTs via ATP (gray). The absorption spectra are offset for clarity. FIG. 18B illustrates the excitation-emission PL map of the sorted S2E (6,5)-SWCNTs in 1 wt/v % DOC-$D_2O$. FIGS. 18C and 18D are broadband (900-1600 nm) PL images of the sorted S2E (6,5)-SWCNTs and the sonicated (6,5)-SWCNT control, respectively. Scale bars are 10 μm. FIG. 18E illustrates the length distributions of the S2E (6,5)-SWCNTs (gray) and sonicated (6,5)-SWCNT control (black). FIG. 18F illustrates a histogram of the PL intensity of each pixel. Intensity counts lower than 100 were attributed to background noise and rejected from the statistics. FIG. 18G shows the correlation between PL intensity per unit length and the SWCNT length for S2E (6,5)-SWCNTs (gray) and the sonicated (6,5)-SWCNT control (black).

FIGS. 21A-F illustrate formulation of "binder-free" inks made from S2E long SWCNTs. FIG. 21A is a photograph of SWCNT-clays on a piece of filter paper. FIGS. 21B and 21C are SEM images of the SWCNT-clays. The SWCNTs are homogenous distributed in the solid steroid acid (deoxycholate acid) matrix. FIG. 21D is a photograph of the formulated SWCNTs ink. FIGS. 21E and 21F illustrate a Chinese character printed using the SWCNTs ink. FIG. 21G is a SEM image of the free printed features after drying. The feature comprises a continuous SWCNTs networks free of cracks.

DETAILED DESCRIPTION OF THE INVENTION

Figure 1A:
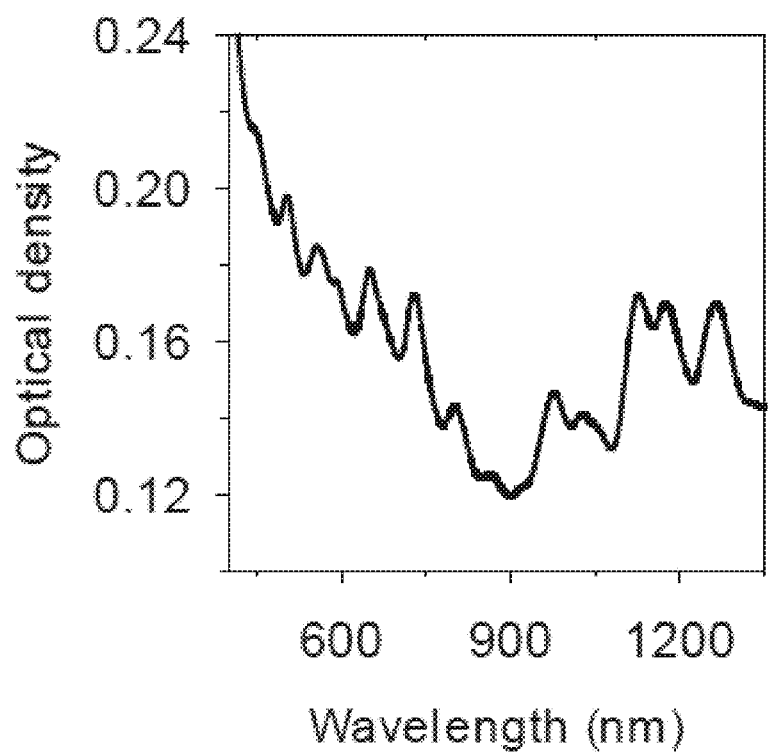
FIGS. 1A and 1B illustrate that neutralizing a SWCNT-superacid solution in the presence of a steroid acid salt surfactant (e.g., DOC) leads to individually dispersed SWCNTs in water.

The invention relates to the preparation of aqueous dispersions of carbon nanomaterials comprising individually dispersed particles of the carbon nanomaterial without use of sonification, ultrasonication or ultracentrifugation. Avoidance of sonication and ultrasonication is important as to avoid significant damage to the carbon nanomaterials. This is particularly important in the preparation of aqueous dispersions of carbon nanotubes because sonication and ultrasonication can significantly damage carbon nanotubes and generally decreases the length of carbon nanotubes. The invention relates to direct neutralization of a solution of the carbon nanomaterial in the presence of a surfactant. The method provides for non-destructive aqueous dispersion of carbon nanomaterials, particularly of carbon nanotubes. Dispersed carbon nanomaterials, particularly carbon nanotubes, exhibit low density of defects. The dispersions of carbon nanotubes exhibit low density of defects, particularly longer average length, and bright and homogenous photoluminescence (PL) in the near-infrared.

It is found that steroid acid salt surfactants are particularly useful in making aqueous dispersions of carbon nanomaterials and more specifically useful in making aqueous dispersions of carbon nanotubes. The method herein which is designated Superacid-Surfactant Exchange (S2E) results in aqueous dispersions of carbon nanomaterials containing individually dispersed carbon nanomaterial in minutes. The S2E method as applied to carbon nanotubes provides aqueous dispersions of individual carbon nanotubes in minutes which preserving the length of the nanotubes in the starting material (e.g., raw nanotubes as synthesized). Aqueous dispersions of carbon nanotubes prepared by the S2E method can exhibit carbon nanotube average length up to 350% longer than aqueous dispersions prepared using sonication methods. Aqueous dispersions of carbon nanotubes prepared by the S2E method can contain a significant fraction of carbon nanotubes approaching 9 μm in length. The S2E method and aqueous dispersions made by this method are fully compatible with established techniques for sorting carbon nanotubes by their electronic structures, such as Aqueous Two Phase (ATP) separation protocols, as described, for example, in Khripin, 2013; Zhang, 2014; Fagan, 2014 and Fagan, 2015, as well as density gradient ultracentrifugation methods (DGU) and chromatography methods.

Aqueous dispersions prepared by the S2E method can also be used to prepare carbon nanomaterial precipitates comprising surfactant which can be readily redispersed to, for example, purify the aqueous dispersion, adjust the concentration of carbon nanomaterials in aqueous dispersions, and modify the surfactant content of aqueous dispersions. Aqueous dispersion prepared by S2E methods can also be used to prepare carbon nanomaterial products, such as film and inks. In particular, transparent thin films of carbon nanotubes prepared from S2E aqueous dispersion exhibit ultrahigh electrical conductivity which can exceed that of indium tin oxide. In embodiments, products prepared by S2E methods, and particularly when combined with carbon nanomaterial sorting methods, can provide additives materials or surface coating materials to modulate the properties of various materials to which they are added or upon which they are coated. More specifically, such additives and surface coating materials can be employed for additives and coatings for textile fibers and textiles.

In embodiments, products prepared by S2E methods, and particularly when combined with carbon nanomaterial sorting methods, can provide near infrared emitters. In embodiments, products prepared by S2E methods, and particularly when combined with carbon nanomaterial sorting methods, can provide field effect transistors.

Further, the S2E method is rapid, can be readily adapted to large scale processing and does not require expensive or complex instrumentation.

Unlike ultrasonication and other previous carbon nanomaterial dispersion methods, the S2E technique of this invention believed to be driven by two acid-base reactions that are chemically reversible:

$$(CNT)_{bundled} + H^+ \rightarrow (CNT)_{individual}H^+ \quad \text{Eq. 1A}$$

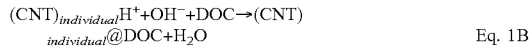

$$(CNT)_{individual}H^+ + OH^- + DOC \rightarrow (CNT)_{individual}@DOC + H_2O \quad \text{Eq. 1B}$$

where carbon nanomaterials are exemplified by carbon nanotubes (CNTs). Crystalline SWCNTs can spontaneously dissolve in chlorosulfonic acid, as established by Davis, 2009. The superacid is believed to protonate the weakly basic nanotubes, exfoliating the bundled material into individual structures due to the Coulombic repulsion between the positively charged nanotubes (Eq. 1A). The experiments of this invention indicate that as hydroxide anions neutralize the protonated SWCNTs in the second step, the "naked" nanotubes are then immediately encapsulated by the surrounding DOC molecules and thus stay as individual articles in the aqueous solution (Eq. 1B). This protonation mechanism is currently believed to apply to dissolution of carbon nanomaterials including graphite, graphite oxide, and graphene ribbons.

The term superacid is used in the art to refer to acids that have acidity greater than that of 100% pure sulfuric acid. Superacids generally useful in the methods of this invention include, among others, Bronsted superacids, Lewis superacids, and conjugate Bronsted-Lewis superacids. Bronsted superacids include, for example, perchloric acid, chlorosulfonic acid, fluorosulfonic acid, trifluoromethanesulfonic acid (triflic acid), and higher perfluoroalkane sulfonic acids (e.g., pentafluoroethane sulfonic acid, nonafluorobutane sulfonic acid, undecafluoropentane sulfonic acid, tridecafluorohexane sulfonic acid, heptadecafluorooctane sulfonic acid). Lewis superacids include, for example, for example, antimony pentafluoride and arsenic pentafluoride. Bronsted-Lewis superacids include, for example, oleums (fuming sulfuric acid, i.e., sulfuric acids containing sulfur trioxide, e.g., up to 20% or up to 30% sulfurtrioxide); magic acid (mixtures of fluorosulfuric acid and antimony pentafluoride, typically in 1:1 molar ratio); polyphosphoric acid oleum mixtures, tetra(hydrogen sulfate) boric acid-sulfuric acid, fluorosulfuric acid-sulfur trioxide mixtures, fluorosulfuric acid-arsenic pentafluoride mixtures, fluorosulfonic acid-hydrogen fluoride-antimony pentafluoride mixtures, fluorosulfonic acid-antimony pentafluoride-sulfur trioxide mixtures, fluoroantimonic acid, and tetrafluoroboric acid.

Although not formally a superacid, 100% sulfuric acid can be employed to dissolve carbon nanomaterials. In an embodiment, the acid used to dissolve carbon nanomaterials is chlorosulfonic acid, oleum, trifluromethanesulfonic acid, 100% sulfuric acid or mixtures thereof.

In a preferred embodiment, the superacid exhibits little or no oxidation of the carbon nanomaterials. It is presently preferred that the superacid protonates the carbon nanomaterial to facilitate dissolution in the superacid. In an embodiment, the superacid is chlorosulfonic acid. In an embodiment, the superacid is fluorosulfonic acid. In an embodiment, the superacid is triflouromethanesulfonic acid. In an embodiment, the superacid is a higher perfluoroalkane sulfonic acid or mixture thereof. In an embodiment, the superacid is chlorosulfonic acid, fluorosulfonic acid, triflouromethanesulfonic acid or a mixture thereof. In embodiments, the superacid used to dissolve carbon nanomaterials for the S2E method does not contain nitric acid. In embodiments, the superacid used for the S2E method does not contain an oxidizing agent. In embodiments, the superacid used for the S2E method does not contain $H_2O_2$.

The S2E method involves direct neutralization of a superacid solution of carbon nanomaterials with aqueous basic solution comprising surfactant. The surfactant is a steroid acid salt surfactants or steroid acid conjugate salts or mixtures thereof. In embodiments, the basic aqueous solution to which the superacid solution is added has pH higher than 13. In embodiments, the basic aqueous solution has OH concentration ranging from 0.1 to 3 M (mole/Liter). In embodiments, the basic aqueous solution has OH concentration ranging from 0.5 to 2 M (mole/Liter). In embodiments, the basic aqueous solution has OH concentration ranging from 0.5 to 1 M (mole/Liter).

The superacid carbon nanomaterial solution is added to the basic aqueous solution until the pH of the resulting mixture is below pH 13.0. Neutralization is accomplished by addition of incremental amounts of superacid solution to the base. This method avoids the dangers associated with addition of water or basic aqueous solution to larger amounts of superacid. Such incremental addition of drops of superacid solution to basic surfactant containing solutions is preferred and may facilitate surfactant interaction with carbon nanomaterials to facilitate dispersion. It will be appreciated by one of ordinary skill in the art that other means for incremental mixing of the superacid and basic solutions may be employed. It is noted that the base concentration in the aqueous surfactant solution can be adjusted to accommodate different amounts of superacid solution.

The dispersion can have a pH between 13 and a lower pH at which the surfactant or mixture of surfactants remains soluble in the aqueous solutions. Typically the lowest pH of the dispersion is about the pKa of the steroid acid of the steroid acid salt surfactant. The pH of the dispersion is generally maintained above the pKa of the steroid acid of the steroid acid salt surfactant to avoid precipitation of the surfactant. One of ordinary skill in the art will appreciate that for a given dispersion of a given carbon nanomaterial for a given steroid acid salt surfactant the pH at which the surfactant precipitates may vary and need to be adjusted to maintain the dispersion. In specific embodiments, the pH of the dispersions ranges from pH 6 to 13, pH 7-13, pH 8-13, pH 9-13, pH 7-12, pH 8-12. pH 9-12 or pH 10-12. Stable dispersions of carbon nanomaterials have been prepared with pH of 11.

Aqueous dispersions of carbon materials of the invention are prepared by the S2E methods herein employing steroid acid salt surfactants or steroid acid conjugate salts or mixtures thereof. Aqueous S2E dispersions also include aqueous dispersions prepared by further addition of one or more cationic surfactants to the initially prepared S2E dispersion. Aqueous S2E dispersions also include aqueous dispersions prepared by further addition of one or more anionic surfactants to the initially prepared S2E dispersion. These secondary S2E dispersions of carbon nanomaterials contain mixtures of one or more steroid acid salt or steroid acid conjugate salt surfactant with one or more cationic surfactant or one or more anionic surfactant.

In an embodiment herein, surfactants used in the S2E methods herein are not polymers or polymeric surfactants, such as poly(ethylene glycol) or derivatives thereof. In an embodiment herein, surfactants used in the S2E methods herein are not polysaccharides, such as dextran or dextran sulfate. In embodiments, the aqueous dispersions prepared by the S2E methods herein do not contain saccharides, particularly mono- or disaccharides. In specific embodiments, the aqueous dispersions prepared by the S2E methods herein do not contain sucrose, glucose, fructose or trehalose.

Water used in compositions of this invention and particularly in aqueous dispersions herein is of appropriate quality for the intended application of the composition as will be appreciated and understood by one of ordinary skill in the art. In many applications, highly purified water, such as nanopure water, where the term nanopure is used herein as it is generally used in the art of nanomaterials and particularly in the field of carbon nanomaterials.

In embodiments, high purity deionized water may be employed. For certain applications or methods of analysis, it may be appropriate to employ deuterated water or tritiated water. One of ordinary skill in the art can selected the appropriate purity of water or isotopic variants thereof for a give application of dispersion, precipitates, films or inks herein.

Steroid acids are monocarboxylic acids having a steroid 4-ring structure (A, B, C and D ring) which is known in the art. The carboxylic acid group is typically on an alkyl chain on the 4-member D ring and more typically on an alkyl chain at C17 of the steroid ring (where IUPAC steroid ring numbering is used). Typically, the carboxylic acid group is at the terminal of a 5 or 8 carbon alkyl chain. More preferred steroid acids are hydroxylated, typically carrying 1-4 hydroxyl groups or 1-3 hydroxyl on the steroid ring system. Hydroxylation can in general be at any of the C1, C2, C3, C6, C7, C12, C15 or C16 ring positions on the steroid ring. The hydroxyls can in general be α or β isomers at the listed positions. Preferred steroid acids are hydroxylated at one or more of the C3, C7 and/or C12 ring positions on the steroid ring. More preferred steroid acids are hydroxylated at one or more of the C3, C7 and/or C12 ring positions on the steroid ring and are the α-stereoisomers at those positions.

Steroid acid salt based surfactants also include salts of steroid acid conjugates with an amino acid and particularly with glycine or taurine, which are designated glycol-steric acid or tauro-steric acids.

Steroid acids salt can include naturally-occurring bile salts as well a synthetic or semi-synthetic steroid acids salts. Examples of semi-synthetic bile acid analogues are 6-alkyl-chenodeoxycholic acids, such as described in U.S. Pat. No. 9,763,964, and particularly 6α-ethyl-chenodeoxycholic acid and glycine and taurine conjugates thereof.

In an embodiment, steroid acid based surfactants are salts of acids of formula:

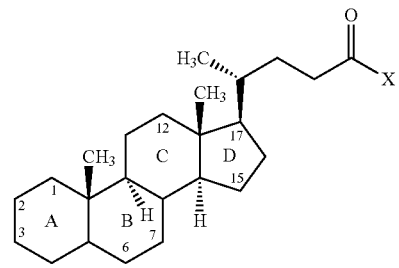

where X is OH, NH—CH$_2$—COOH or NH—(CH$_2$)$_2$SO$_3$H and which are hydroxylated at any one to four of positions C1, C2, C3, C6, C7, C12, C15 or C16. Preferred acids are hydroxylated at one to three of positions C3, C7 or C12. More preferred hydroxylated acids are the α-hydroxyl stereoisomers. Preferred salts of this formula are ammonium, alkylammonium, dialkylammonium, trialkylammonium, tetraalkylammonium (particularly where the alkyl group is a C1-C3 alkyl group and more particularly a methyl group) or alkali metal salts and more particularly, ammonium, lithium, sodium or potassium salts. In specific embodiments of this formula, salts are sodium salts. In specific embodiments, the steroid acid salt surfactant is an alkali metal salt of cholic acid and in particular is sodium cholate. In an embodiment, the steroid acid salt surfactant is an alkali metal salt of deoxycholic acid and in particular is sodium deoxycholate.

Specifically useful steroid acid-based surfactants include salts of cholic acid, glycocholic acid, taruaocholic acid, deoxycholic acid, glycodexoycholic acid, taurodeoxycholic acid, chenodeoxycholic acid, glycochenodeoxycholic acid, taurochenodeoxycholic acid, lithocholic acid, glycolithocholic acid, tauraolithocholic acid, ursodeoxycholic acid, glycoursodeoxycholic acid, tauroursodeoxycholic acid, hyodeoxycholic acid, glycohyodeoxycholic acid, taurohyodeoxycholic acid. Salts of the specifically listed steroid acids include, among others, ammonium, alkyl ammonium, dialkyl ammonium, trialkyl ammonium, or tetraalkyl ammonium salts (particularly where the alkyl group is a C1-C3 alkyl group and more particularly a methyl group), alkali metal salts or metal salts. More particularly, salts of the specifically listed steroid acids include ammonium, lithium, sodium or potassium salts. In specific embodiments of the specifically listed steroid acids, the salts are sodium salts. In specific embodiments of the specifically listed steroid acids, the salts are ammonium salts.

Steroid acid salts can in general have any monovalent anion, including among others, ammonium, alkyl ammonium, dialkyl ammonium, trialkyl ammonium and tetralkyl ammonium (particularly where the alky groups are C1-C3 alkyl groups and more particularly are methyl groups), alkali metal cation (particularly lithium, sodium, potassium, rubidium, or cesium) or a metal cation.

In a specific embodiment, the steroid acid anion is the anion of a bile acid which is a steroid acid or steroid acid conjugate found in the bile of a mammal or other vertebrate. Steroid acid anions include those of steroid acid conjugates particularly where the steroid acid is conjugated with glycine or taurine. Preferred bile acids carry at least one hydroxyl group. In specific embodiments, useful bile acid salts are those that carry 1-4 hydroxyl groups or 1-3 hydroxyl groups. Exemplary useful naturally-occurring bile acids and cations thereof are described in Hofmann, 2010, which is incorporated by reference herein for its description of such bile acids and bile salts. In embodiments, the bile acid cation can be combined with any useful monovalent cation, including those listed above and more specifically an ammonium cation or an alkali metal cation. Useful alkali metal cations include lithium, sodium, potassium, rubidium, or cesium. More preferred alkali metal cations for bile acid cations are sodium, lithium or potassium cations. In specific embodiments, the steroid acid salt is a bile salt, which is typically a sodium salt.

Various cationic surfactants are known in the art and can be employed in methods herein. Particular useful cationic surfactants for preparation of aqueous dispersions of carbon nanomaterials are quaternary ammonium salts. Quaternary ammonium salts include for example, quaternary ammonium salts, and alkyl pyridinium salts. Quaternary ammonium salts include tetraalkyl ammonium salts, and benzalkonium salts (where the quaternary nitrogen carries a benzyl group and three alkyl groups), where one or two of the alkyl groups are alkyl groups having 10-21 carbon atoms and the remaining alkyl groups are methyl or ethyl groups. Tetraalkyl quaternary ammonium salt cationic surfactants include those having one long straight-chain alkyl group having 10-21 carbon atoms or more preferably, having 12-20 carbon atoms or yet more preferably 14-18 carbon atoms. Quaternary ammonium salt cationic surfactants include those which contain three methyl groups and one long straight-chain alkyl group having, 10-21 carbon atoms, more preferably 12-20 carbon atoms, or yet more preferably 14-18 carbon atoms. Benzalkonium salt cationic surfactants include those having one long straight-chain alkyl group, having 10-21 carbon atoms or more preferably, having 12-20 carbon atoms or yet more preferably 14-18 carbon atoms, and two C1-C3 alkyl groups, particularly, methyl or ethyl groups. Useful cationic surfactants include those that are halide salts, particularly chloride and bromide salts. Specific useful cationic surfactants include, among others, cetyltrimethylammonium bromide (CTAB), cetyltrimethylammonium chloride cetyldimethylethylammonium bromide, cetyldimethylethylammonium chloride, octadecyltrimethyl ammonium bromide, octadecyltrimethyl ammonium chloride, dioctadecyldimethyl ammonium chloride, dioctadecyldimethylammonium bromide, tetradecyltrimethylammonium bromide, tetradecyltrimethylammonium chloride, dodecyldimethylbenzylammonium bromide, dodecyldimethylbenzylammonium chloride, tetradecyldimethylbezylammonium bromide, tetradecyldimethylbezylammonium chloride, cetyldimethylbenzyammonium bromide, cetyldimethylbenzyammonium chloride, octadecyldimethylbenzyl bromide, and octadecyldimethylbenzyl chloride.

Preferred cationic surfactants are those of formula $(C_nH_{2n+1})-N^+(CH_3)_3$ $Y^-$, where n is 10-21 and $Y^-$ is a halide. The long chain alkyl group is preferably a straight-chain alkyl. In specific embodiments, n is 12-20 or n is 14-18 or n is 15-17. In specific embodiments, $Y^-$ is bromide or chloride.

In a specific embodiment, the cationic surfactant is cetyltrimethylammonium bromide (CTAB) or cetyltrimethylammonium chloride (CTAC). In a specific embodiment, the cationic surfactant is cetyltriammonoium bromide.

Various anionic surfactants are known in the art and can be employed in the methods of this invention. In general anionic surfactants include, among others, salts of alky sulfonates, alkyl sulfates, alkylbenzene sulfonates, fatty acids (carboxylates), derivatized fatty acids (e.g., sarcosinates), phosphate esters. Particular useful anionic surfactants for preparation of aqueous dispersions of carbon nanomaterials are salts of alkyl sulfonates, alkyl sulfates, alkylether sulfates, alkyl carboxylates, alkyl sarcosinates, where the alkyl group has 10 to 21 carbon atoms and is typically a straight-chain alkyl group. Specific useful anionic surfactants salts of alkyl sulfonates, alkyl sulfates, alkylether sulfates, alkyl carboxylates and alkyl sarcosinates, where the alkyl group has 12 to 20 or 14-18 or 15-17 carbon atoms and is typically a straight-chain alkyl group. Specifically useful anionic surfactants include, among others, salts of dodecyl sulfate, lauryl ether sulfate, lauroyl sarcosinate and steric acid. Mixtures of anionic surfactants, particularly mixtures of listed anionic surfactants are useful in the methods herein. The cation of anionic surfactant salts can in general be an alkali metal cation, a metal cation, an ammonium, dialkyl ammonium, trialkyl ammonium or tetraalkyl ammonium cation (particularly where the alky groups have 1 to 3 carbons and more particularly where the alkyl groups are methyl groups). In specific embodiments, the anionic surfactants are ammonium salts or alkali metal salts. In. specific embodiments, the anionic surfactants are sodium salts or ammonium salts. A particular useful group of anionic surfactants are sodium or ammonium alky sulfates, where the alkyl groups is a straight-chain alkyl group having 10-21 carbon atoms, or more specifically 12 to 20 carbon atoms, or 12-18 or 12-16 carbon atoms. Specifically useful anionic surfactants include sodium or ammonium dodecylsulfate. In an embodiment, the anionic surfactant is sodium dodecylsulfate (SDS).

The S2E methods of the invention for dispersion of carbon nanomaterials in aqueous solution is generally applicable to any carbon nanomaterial that can be individually dispersed in superacid. More specifically, dispersion methods herein can be applied to dispersion of carbon nanotubes, graphite and graphite oxide (dispersed as graphene and graphene oxide, respectively) and graphene nanoribbons.

In particular, the S2E methods are useful for dispersion of carbon nanotubes. Carbon nanotubes are particularly well-studied and can be synthesized by carbon arcs, laser deposition and ion bombardment, among others known methods, and are now in some cases commercially available. The S2E methods herein are useful for dispersion of single-walled carbon nanotube, double-walled carbon nanotubes, and multi-walled carbon nanotubes, from any known source, prepared by any known method. Carbon nanotubes useful in methods herein can be essentially unfunctionalized (as prepared without intentional functionalization or doping) or functionalized by art known methods.

The S2E methods herein can in particular be applied to carbon nanotubes which carry color centers and particularly those which carry organic color centers (designated OCC-carbon nanotubes). Color centers can be introduced into carbon nanotubes by replacing carbon atoms in the sp2 lattice with nitrogen or boron atoms. Color centers can also be introduced into such a lattice by formation of C—C bonds between organic functional groups and one or more carbons in the lattice. Color centers which are formed by covalent bonding of such organic functional groups into the lattice are called organic color centers. U.S. Pat. No. 9,983,058 and published U.S. application 20180265779 provide examples of organic color centers formed in carbon nanotubes and provide methods for making such color centers. Each of these patent documents is incorporated by reference herein in its entirety for description of such carbon nanotube color centers and methods of making carbon nanotubes having such color centers. In specific embodiments, color centers are formed by alkylation or arylation reactions with the carbon lattice, for example as described in U.S. Pat. No. 9,983,058. Methods for introduction of such color centers include diazonium chemistry, diazoether chemistry, aryl halide chemistry (arylation), alkyl halide chemistry (alkylation), bisdiazonium chemistry and the Billups-Birch reaction. Organic color centers can be covalently introduced into the $sp^2$ lattice of carbon nanotubes.

Such organic color centers can be prepared by introduction of monovalent organic functional groups or by introduction of divalent organic functional groups. Monovalent organic functional groups of such organic color centers can include optionally substituted alkyl or optionally substituted aryl groups. Optional substitution of alkyl or aryl groups includes substitution with one or more halogens, particularly one or more fluorines, one or more amino groups (—$NH_2$) or alkylated amino groups (—$N(RN)_2$), which may be protonated (—$N(R_N)_2H^+$) where RN is H or an alkyl group, one or more carboxylic acid or carboxylate groups (—COOH, one or more thiol (—SH) groups, or one or more nitro, cyano or other electronegative group. Optional substitution of aryl groups includes substitution with one or more alkyl groups which in turn may be optionally substituted, particularly with fluorine. Optional substitution of alkyl groups includes substitution with one or more aryl groups, particularly phenyl groups, which in turn are optionally substituted, particularly with fluorine. OCC-carbon nanotubes may also be functionalized with complexing groups, chelating agents, proteins, peptides, oligopeptides, sugars (including monosaccharides and disaccharides), oligonucleotides or other functional groups.

The functional group bonded to the carbon lattice to form the color center can be a divalent group, for example, $>C(R_M)_2$, where $R_M$ is independently an optionally substituted alkyl group, an optionally substituted aryl group, or a halogen, particularly a fluorine. The two $R_M$ together can also represent a cyclic alkyl or a cyclic aryl group that is optionally substituted. Optional substitution of alkyl or aryl groups includes substitution with one or more halogens, particularly one or more fluorines, one or more amino groups (—$NH_2$) or alkylated amino groups (—$N(R_N)_2$), which may be protonated (—$N(R_N)_2H^+$) where $R_N$ is H or an alkyl group, one or more carboxylic acid or carboxylate groups (—COOH, —$COO^-$), one or more thiol (—SH) groups, or one or more nitro, cyano or other electronegative group. Optional substitution of aryl groups includes substitution with one or more alkyl groups which in turn may be optionally substituted, particularly with fluorine. Optional substitution of alkyl groups includes substitution with one or more aryl groups. More specific examples of divalent groups include $>C(R)_2$ where R is independently H or F or $>C_6(R)_4$, where R is independently H, fluorine.

Color centers described herein can be prepared by art known methods or routine adaptation of art known methods. Examples of monovalent functional groups are provided in each of U.S. Pat. No. 9,983,058 and published U.S. application 20180265779.

The S2E methods herein can in particular be applied to nitrogen-doped carbon nanotubes, including N-doped SWCNTs, DWCNTS and MWCNTs. Various methods are known in the art for preparation of N-doped carbon nanotubes [Ewels, 2005; Shin, 2012].

U.S. Pat. No. 9,534,319 reports the dissolution of graphite, graphite oxide and graphite and graphene nanoribbons in superacid solution. Dissolution of graphite is reported to provide exfoliated forms of graphite and graphite oxide which are graphene and graphene oxide. Graphene refers to sheets or flakes or graphite which are up to about 10 carbon layers thick. Preferably graphene includes sheets or flakes of graphite that are single carbon layer graphene. Exfoliation of graphite oxide results in graphene oxide sheets or flakes. Dissolution of graphite, graphite oxide and graphite and graphene nanoribbons is reported, for example, by stirring in chlorosulfonic acid without application of sonication. S2E methods herein are useful for the dispersion of graphite or graphite oxide in aqueous solution.

S2E methods herein are useful for dispersion of graphene nanoribbons in aqueous solution. Graphene nanoribbons are strips of graphene with width less than 50 nm and typically less than 10 carbon layers thick. Graphene nanoribbons can be produced by graphite nanotomy, by axial cutting of carbon nanotubes or grown by ion implantation on SiC substrates. Graphene nanoribbons can be grown on SiC wafers or grown on germanium wafers using chemical deposition. U.S. Pat. No. 8,703,090 relates to preparation of oxidized and reduced graphene nanoribbons by longitudinally opening carbon nanotubes. Like carbon nanotubes, graphene ribbons have a sp2 carbon lattice. Color centers, including organic color centers as discussed above, can be introduced into carbon nanoribbons by methods analogous to those employed for carbon nanotubes.

The method of the invention can be used to prepare precipitates (designated clays herein) comprising a carbon nanomaterial, particularly carbon nanotubes, more particularly SWCNTs, and yet more particularly purified SWCNTs, and a steroid acid salt surfactant or a mixture of such surfactants. The precipitates are prepared by adjusting the pH of an aqueous dispersion of the carbon nanomaterial in the presence of the steroid acid salt surfactant to at or below the pKa of the steroid acid which results in precipitation of the steroid acid salt along with the carbon nanomaterial. For example, the pKa of deoxycholic acid is about 6.6 and adjusting the pH of an aqueous dispersion of SWCNTs in DOC to about 6 results in precipitation of a SWCNT clay which can then be collected, and washed if desired with water or selected organic solvent to remove any remaining undesired impurities or to remove residual water. The clays can be re-dispersed in a selected amount of water or other aqueous medium with adjustment of pH above the pKa of the steroid acid surfactant to allow selection of the concentration of carbon nanomaterials in a dispersion. For example, a SWCNT/DOC clay is re-dispersed in nanopure water. In specific embodiments, the mass ratio of carbon nanomaterial to surfactant in precipitated clays ranges from 0.05 to 5. In more specific embodiments, the mass ratio of carbon nanomaterial to surfactant ranges from 0.1 to 1, or from 0.4 to 0.6, or is 0.5.

In embodiments, the surfactant is a steroid acid salt surfactant. In embodiments, the surfactant is a steroid acid salt surfactant in combination with a cationic surfactant such as CTAB. In embodiments, the mass ratio of cationic surfactant to steroid acid salt surfactant ranges from 0.01 to 1. In embodiments, the mass ratio of cationic surfactant to steroid acid salt surfactant ranges from 0.1 to 1. In embodiments, the surfactant is a steroid acid salt surfactant in combination with an anionic surfactant such as SDS. In embodiments, the mass ratio of anionic surfactant to steroid acid salt surfactant ranges from 0.01 to 1. In embodiments, the mass ratio of anionic surfactant to steroid acid salt surfactant ranges from 0.1 to 1.

Precipitates can be made using SWCNTs, DWCNTs, MWCNTs and mixtures thereof. More specifically, precipitates of carbon nanotubes, particularly SWCNTs with a deoxycholate salt, more particularly sodium deoxycholate can be prepared. Precipitates can be prepared from aqueous dispersions of this invention of graphite which dispersions comprise graphene. More specifically, precipitates of graphene with a cholate salt, more specifically sodium cholate, can be prepared as described herein.

The methods of the invention can be used to prepare precipitates (designated clays herein) comprising a carbon nanomaterial, particularly carbon nanotubes, more particularly SWCNTs, and yet more particularly purified SWCNTs, and a steroid acid salt surfactant or a mixture of such surfactants. The precipitates are prepared by adjusting the pH of an aqueous dispersion of the carbon nanomaterial in the presence of the steroid acid salt surfactant to at or below the pKa of the steroid acid which results in precipitation of the steroid acid salt along with the carbon nanomaterial. For example, the pKa of deoxycholic acid is about 6.6 and adjusting the pH of an aqueous dispersion of SWCNTs in DOC to about 6 results in precipitation of a SWCNT clay which can then be collected, and washed if desired with water or selected organic solvent to remove any remaining undesired impurities or to remove residual water. The clays can be re-dispersed in a selected amount of water or other aqueous medium with adjustment of pH above the pKa of the steroid acid to allow selection of the concentration of carbon nanomaterials in a dispersion. For example, a SWCNT/DOC clay is re-dispersed in nanopure water which adjustment of pH to facilitate redispersion. It will be appreciated that the pH for precipitation of clays will depend upon the solubility of the steroid acid salt surfactant or combination of surfactants used in the dispersion and one of ordinary skill in the art can without undue experimentation determine the pH needed for precipitation with a given surfactant or mixture of surfactants used. In a preferred embodiment, only steroid acid salt surfactants are used to make clays herein. In embodiment, a cationic or an anionic surfactant may be combined with the steroid acid salt surfactant to make clays of this invention.

The clay prepared from S2E dispersions of carbon nanomaterials largely consist of a composite of individualized carbon nanomaterials and surfactant that readily disperse in water. It is believed that the surfactant, particularly the steroid acid salt surfactant is associated with the carbon nanomaterial in the composite and as such redispersion is facilitated. In an embodiment, the clay comprises at least 10% by weight of such a composite comprising individualized carbon nanomaterials and surfactant. In an embodiment, the clay comprises at least 25% by weight of such a composite comprising individualized carbon nanomaterials and surfactant. In an embodiment, the clay comprises at least 50% by weight of such a composite comprising individualized carbon nanomaterials and surfactant. In an embodiment, the clay comprises at least 75% by weight of such a composite comprising individualized carbon nanomaterials and surfactant. In an embodiment, the clay comprises at least 90% by weight of such a composite comprising individualized carbon nanomaterials and surfactant. The clay prepared from S2E dispersion of carbon nanomaterials is readily redispersed in water with adjustment of pH, typically by addition of base. Redispersion may however not be completed and it may be useful or necessary to remove small amounts of non-dispersed particulates.

In an embodiment, the carbon nanomaterial of the clay is carbon nanotubes. In an embodiment, the clay comprises at least 25% by weight of a composite of individualized carbon nanotubes and surfactant. In an embodiment, the clay comprises at least 50% by weight of a composite of individualized carbon nanotubes and surfactant. In an embodiment, the average length of the carbon nanotubes in the clay ranges from 1-5 micron. In an embodiment, the average length of the carbon nanotubes in the clay are longer than 5 micron. In an embodiment, the carbon nanotubes of the clays are SWCNTs. In an embodiment, the carbon nanotubes of the clays are semiconducting SWCNTs. In an embodiment, the carbon nanotubes of the clays are metallic SWCNTs.

The invention provides a method to formulate multifunctional inks containing carbon nanomaterials, particularly carbon nanotubes and more particularly long SWCNTs and electronically pure (semiconducting and metallic) SWCNTs that can be used for various electronics printing applications. The invention provides carbon nanomaterial inks prepared from carbon nanomaterial clays of the invention.

Precipitates useful for preparation of inks can be made using SWCNTs, DWCNTs, MWCNTs and mixtures thereof. More specifically, precipitates of carbon nanotubes, particularly SWCNTs with a deoxycholate salt, more particularly sodium deoxycholate can be prepared for use in preparation of inks. Precipitates can also be prepared from aqueous dispersions of this invention of graphite which dispersions comprise graphene and such precipitates can be used for preparation of inks. More specifically, precipitates of graphene with a cholate salt, more specifically sodium cholate, can be prepared as described herein and used for preparation of inks.

In a specific embodiments inks prepared as described herein comprise carbon nanotubes, wherein the carbon nanotubes therein have average length ranging from 1-10 micron or higher. In a specific embodiment, in inks comprising carbon nanotubes, the carbon nanotubes therein have average length ranging from 1-5 micron or higher. In a specific embodiment, in inks comprising carbon nanotubes, the carbon nanotubes therein have average length greater than 5 micron.

Carbon nanomaterial precipitate clays as described herein, can, for example, be used to prepare carbon nanomaterial inks. The ink of the invention comprises carbon nanomaterials, steroid acid salt surfactant, optionally a secondary cationic or anionic surfactant and an aqueous solvent.

In embodiments, the ink of the invention is a liquid. In embodiments, the ink of the invention is a paste. In embodiments, the concentration of the clay in the water-based ink is adjusted to form a liquid ink. In embodiments, such inks are water-based inks. In embodiments, the concentration of the clay in the water-based ink is adjusted to form a paste. In embodiments, such inks are conductive. In embodiments, the ink comprises a buffer. In specific embodiments, the ink comprises a buffer to maintain the pH of the ink between pH 5-8. In specific embodiments, inks of the invention can further comprise a glycol, such as propylene glycol, a higher alkyl glycol or polyethylene glycol.

In specific embodiments, inks of the invention include one or more binding agents suitable for use in ink. In specific embodiments, such inks do not contain binders, such as polymers. In specific embodiments, such inks do not contain polyols, such as sucrose, trehalose or glycerol. In specific embodiments, such inks do not contain surfactant other than a steroid acid salt. In specific embodiments, such inks do not contain an alkylsulfonate, alkaryl sulfonate or arylsulfonate surfactant. In specific embodiments, such inks do not contain sodium dodecylbenzene sulfonate (SDSB). In specific embodiments, such inks do not contain polyethylenenimine. In specific embodiments, such inks do not contain metal. In specific embodiments, such inks do not contain an enzyme. In specific embodiments, such inks can be prepared without application of sonication. In specific embodiments, such inks can be prepared without application of ultracentrifugation. In embodiments, the inks of the invention comprise carbon nanomaterial as the pigment. In embodiments, the inks of the invention comprise carbon nanomaterial as a pigment and further comprise a pigment or dye other than a carbon nanomaterial.

In specific embodiments, inks of the invention can comprise minor amounts of additives as known in the art which affect the flow, thickness or viscosity of the ink. In specific embodiments, inks of the invention can comprise minor amounts of one or more viscosity modifiers, plasticizers, sequestering agents, stabilizing agents, or de-foaming agents, as are known in the art to be useful in ink formulations. In specific embodiments, the total amount of additives in the inks of the invention is less than 5% by weight of the ink and more specifically is less than 1% by weight of the ink. In preferred embodiments, additives, or amounts thereof present in the ink, do not affect the dispersion properties of the steroid acid salt surfactant and do no significant affect the electronic properties of the carbon nanomaterial.

In embodiments, such inks comprise carbon nanotubes. In embodiments, such inks comprise individually dispersed carbon nanomaterials. In embodiments of such inks, at least 10% of the carbon nanomaterials are individually dispersed. In embodiments of such inks, at least 25% of the carbon nanomaterials are individually dispersed. In embodiments of such inks, at least 50% of the carbon nanomaterials are individually dispersed. In embodiments of such inks, at least 80% of the carbon nanomaterials are individually dispersed. In embodiments of such inks, at least 90% of the carbon nanomaterials are individually dispersed. In embodiments, such inks comprise carbon nanotubes as the carbon nanomaterial. In embodiments, such inks comprise SWCNTs. In embodiments, such inks comprise SWCNTs as the carbon nanomaterial. In embodiments, such inks comprise purified SWCNTs as the carbon nanomaterial. In specific embodiments, such inks comprise SWCNTs with average length of 3 micron or more. In embodiments, such inks comprise graphene as the dispersed carbon nanomaterial.

U.S. Pat. No. 8,803,094 describes carbon nanotube compositions that are suitable for printing as well as substrates having a print thereon containing such carbon nanotube compositions. This patent describes applications of such compositions as inks, for example, for printing. This patent is incorporated by reference herein in its entirety for descriptions of such applications and methods of use of such inks.

Inks of the invention can be employed for applying markings to or printing on substrates, such as paper. Application of the ink can be done by any suitable means, for example, using pens or various printers. Inks can be used, for example, for ink jet printing, screen printing, lithography, brushing, spraying, stamping, electrophoretic deposition, or wet spinning. In a specific embodiment, the inks of the invention can be employed in a closed vessel useful for printing, such as a disposable or reusable ink cartridge or a cartridge in a pen. Inks of the invention can be used for marking or printing on any suitable substrate, including among others, cellulosic materials (e.g., paper, cardboard, wood) which may be coated or uncoated, polymer substrates (e.g., plastics), glass, metal, silicon, quartz.

Carbon nanotubes can be characterized for example as semi-conducting or metallic as is known in the art. In generally any carbon nanotubes and particularly any single-walled carbon nanotubes, and particularly those that are characterized as semi-conducting or metallic, can be employed in the methods herein. Methods as described herein can be employed to sort or separate mixtures of metallic and semi-conducting carbon nanotubes. Such sorting or separation methods provide resultant carbon nanotube samples that contain an enhanced amount of metallic or semi-conducting carbon nanotubes, respectively, compared to the starting carbon nanotube mixture. In embodiments, the amount of enhancement in the resultant samples that is obtained by application of the sorting or separation methods herein is greater than 10%, greater than 20%, greater than 30%, greater than 40% or greater than 50%.

Carbon nanotubes can be characterized, for example, by (n, m) chirality. This carbon nanotube nomenclature is well known and generally used in the art to distinguish carbon nanotube structures. In general, carbon nanotubes of any such known chirality can be employed in the methods herein. In specific embodiments, semiconducting carbon nanotubes of any such known chirality can be employed in the methods herein In specific embodiments, carbon nanotubes of chirality (10,0), (11,0), (13,0), (14,0), (16,0), (17,0), (11,1), (12,1), (14,1), (15,1), (8,7), (9,7), (9,8), (5,4), (6, 4), (7, 3), (9,1), (6,5), (8, 3), (7, 5), (9, 4), (7, 6), (9, 4), (11, 1) and (10, 3) can be used in the methods herein. As is known in the art, samples of carbon nanotubes as prepared by known methods and as available from commercial sources may contain a mixture of carbon nanotubes of different chiralities. Method of this invention can be used as described herein to sort or separate carbon nanotubes, and particularly SWCNTs of different chiralities. Such sorting or separation methods provide a resultant carbon nanotube sample that contains an enhanced amount of carbon nanotubes of a selected chirality compared to a starting carbon nanotube mixture. In embodiments, the amount of enhancement of the selected chirality that is obtained by application of the sorting or separation methods herein is greater than 10%, greater than 20%, greater than 30%, greater than 40% or greater than 50%.

In an embodiment, the average length ($L_{avg}$) of S2E-SWCNTS is 1.0 μm or longer. In an embodiment, the average length of S2E-SWCNTS is 1.2 or longer. In an embodiment, the average length of S2E-SWCNTS is 1.3 μm or longer. In an embodiment, the average length of S2E-SWCNTS is 1.4 or longer. In an embodiment, the average length of S2ESWCNTS is 1.5 μm or longer. In an embodiment, the average length of S2E-SWCNTS is 1.7 or longer. In an embodiment, the average length of S2E-SWCNTS is 2.0 μm or longer. In an embodiment, the average length of S2E-SWCNTS is 2.5 or longer. The average length of carbon nanotubes is calculated, as is known in the art and described herein, from length distributions determined using AFM.

The ratio of integrated areas of the D peak to G peak ($I_D/I_G$) in the Raman spectra of SWCNTs is directly correlated with the density of defects within the carbon lattice. In an embodiment, the $I_D/I_G$ ratio of S2E-SWCNTs is less than 0.05. In an embodiment, the $I_D/I_G$ ratio of S2E-SWCNTs is less than 0.04. In an embodiment, the $I_D/I_G$ ratio of S2E-SWCNTs is less than 0.03. In an embodiment, the $I_D/I_G$ ratio of S2E-SWCNTs is less than 0.02. In an embodiment, the $I_D/I_G$ ratio of S2E-SWCNTs is equal to or less than 0.01. In an embodiment, the $I_D/I_G$ ratio of S2E-SWCNTs is between 0.01 and 0.03. In an embodiment, the $I_D/I_G$ ratio of S2E-SWCNTs is between 0.01 and 0.045. In an embodiment, the $I_D/I_G$ ratio of S2E-SWCNTs is less than the $I_D/I_G$ ratio of that of the source SWCNTs material from which the S2E-SWCNTs is derived by S2E processing.

All patents and publications mentioned in the specification are indicative of the levels of skill of those skilled in the art to which the invention pertains. All references cited herein are hereby incorporated by reference to the extent not inconsistent with the disclosure herewith. All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of alternatives, such as a group of substituents or device elements is disclosed herein, it is understood that all individual members of those groups and all subgroups are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

One of ordinary skill in the art will appreciate that methods, device elements, starting materials and synthetic methods other than those specifically exemplified can be employed in the practice of the invention without resort to undue experimentation. All art-known functional equivalents, of any such methods, device elements, starting materials and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claimed invention. Herein, the basic and novel characteristics of the claimed invention, in one aspect include, methods for making aqueous dispersions of carbon nanomaterials without use of sonication, ultrasonication or ultracentrifugation and in particular are non-destructive to the carbon nanomaterials. In particular, materials or steps that interfere with the formation of such dispersions or which are destructive to the carbon nanomaterials are excluded. In another aspect, the basic and novel characteristics are dispersions, products made from dispersions and methods for sorting carbon nanomaterials, particularly carbon nanotubes. In particular, materials or steps that interfere with the preparation and recited uses of dispersed carbon nanomaterials or affect the desirable properties of the carbon nanomaterials, particularly carbon nanotubes, are excluded.

Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

There may be descriptions herein which refer to potential mechanisms of action or of current understanding of mechanism of processes or techniques of the invention. Such descriptions or explanations of potential mechanism or current understanding of mechanisms are not intended to be limiting.

In general the terms and phrases used herein have their art-recognized meaning, which can be found by reference to standard texts, journal references and contexts known to those skilled in the art. The preceding definitions are provided to clarify their specific use in the context of the invention Although the description herein contains many specificities, these should not be construed as limiting the scope of the invention but as merely providing illustrations of some of the presently preferred embodiments of the invention. For example, thus the scope of the invention should be determined by the appended claims and their equivalents, rather than by the examples given.

THE EXAMPLES

Example 1

Non-Destructive Dispersion of Carbon Nanomaterials (General S2E Method)

Raw carbon nanomaterials, including SWCNTs, double-walled carbon nanotubes, multi-walled carbon nanotubes, fullerenes, and graphite materials are dissolved in chlorosulfonic acid (CSA) at varied concentration from ~0.05 to ~0.5 mg/mL The resulting carbon nanomaterial-superacid solutions are added dropwise to a basic aqueous solution of 0.5 M to 1 M NaOH with 0.05 to 1.5 wt/v % DOC or SC until the basic solution pH decreases to ~8-11. For initial dispersion in aqueous DOC or SC solutions the pH is kept sufficiently high so that the DOC or SC remaining in solution. The pH should be higher than the pKa of DOC or SC. The solution can be stirred, if necessary, until the pH stabilizes. Undissolved particulates can be removed from the dispersion using a low-speed benchtop centrifuge at 6,000 g for 30 min. All dispersion and characterization experiments are performed at room temperature. The dispersions formed can be employed for further processing, including, among others, washing, collection, drying, additional separation methods, extractions, concentration, precipitation, dispersion in non-aqueous or different aqueous solvents, film formation or preparation of inks. It is important to note that adding surfactants directly into the superacid-carbon nanomaterial solution does not work to suspend the carbon nanomaterials individually because the surfactant molecules are chemically unstable in the superacid.

Wang, et al. *ACS Nano* 2017 and supporting information available on ACS Publications website at DOI: 10.1021/acsnano.7b04429 are incorporated herein in their entirety for descriptions therein of S2E methods and analysis of carbon materials, particularly SWCNTs, processed by S2E methods.

Example 2

S2E Dispersion of Carbon Nanotubes

Raw HiPco SWCNT materials (Rice University) are dissolved in chlorosulfonic acid (CSA, Sigma-Aldrich, 99%) at a concentration of ~0.5 mg/mL. The SWCNT-superacid solution is added drop-by-drop to an aqueous solution of 0.5 M NaOH and 1 wt/v % DOC (Sigma-Aldrich, ≥97%) until the solution pH decreased to and stayed stable at ~11. Drops of the acid solution are added to the large excess of aqueous base to control the exothermic neutralization and generation of HCl. Undissolved particulates are removed from the dispersion using a low-speed benchtop centrifuge at 6,000 g for 30 min.

As controls, sonic-SWCNTs are prepared by the ultrasonication plus ultracentrifugation approach from 1 mg/mL solutions of raw SWCNT material in deuterium oxide ($D_2O$, Cambridge Isotope Laboratories, Inc. 99.8%), following an established protocol [Subbaiyan, 2014] using DOC as the surfactant (tip sonication at 15 W, Qsonica S-4000) at increasing sonication times.

Figure 1B:
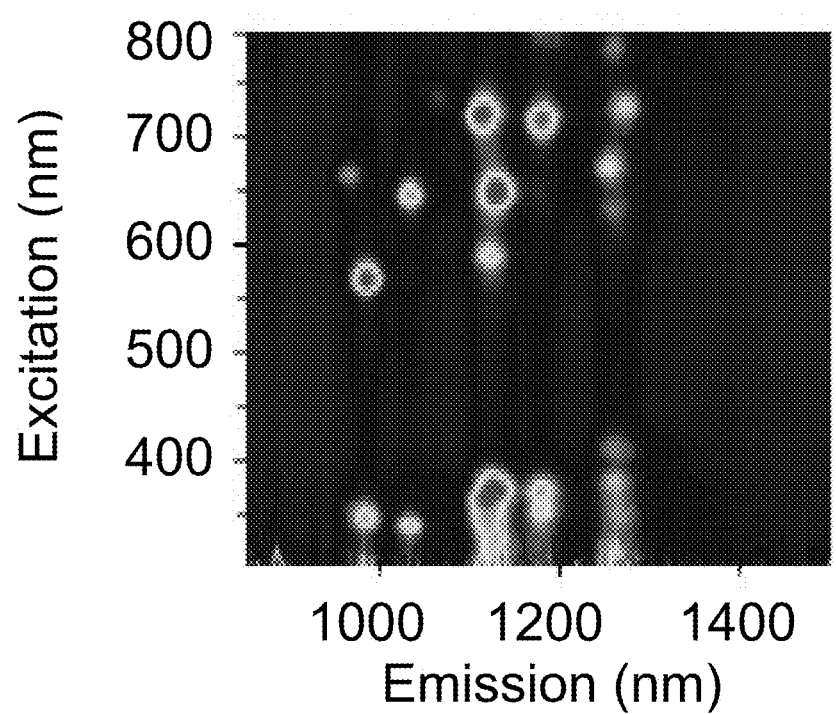
Figure 2A:
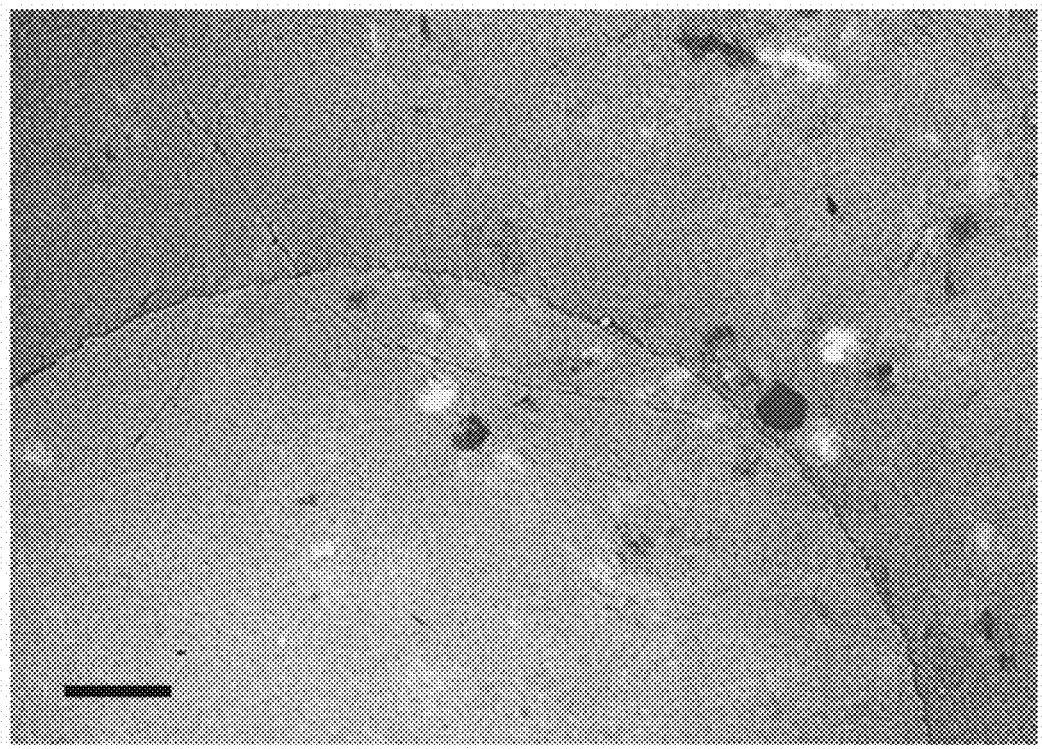
FIGS. 2A and 2B illustrate Cryo-TEM characterization of HiPco S2E-SWCNTs. The sample was prepared from aqueous dispersions (1 wt % DOC stabilized SWCNTs) by direct freezing using liquid-$N_2$. Scale bars are 200 nm.
Figure 2B:
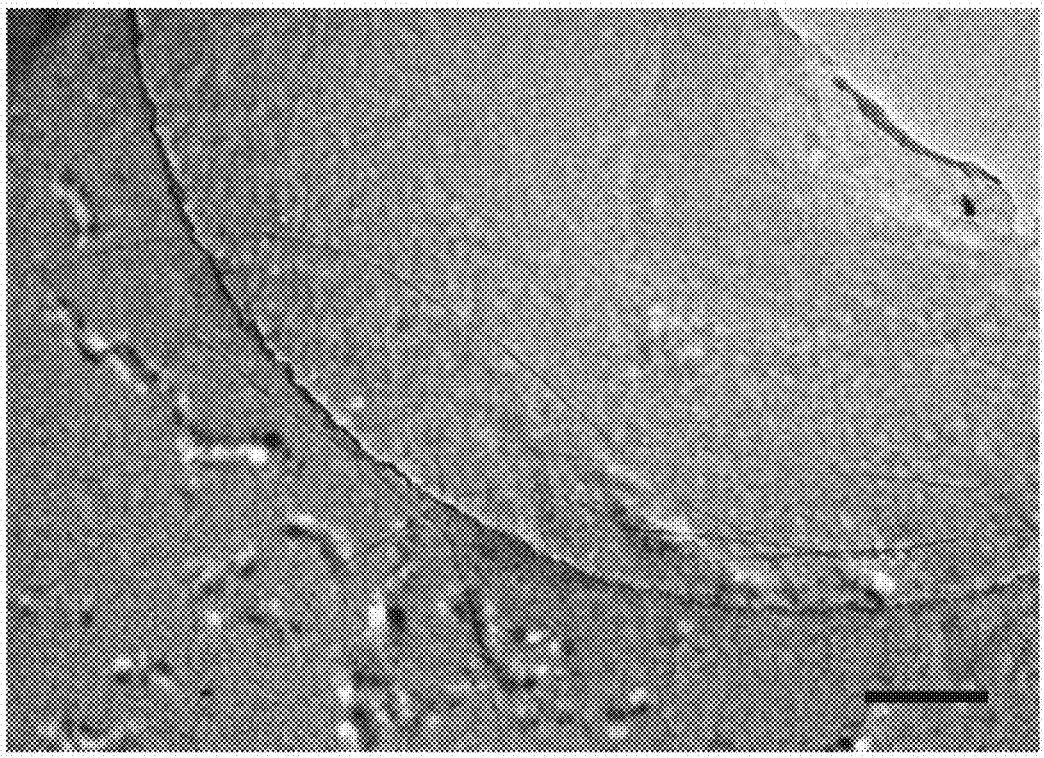

The addition of SWCNTs dissolved in chlorosulfonic acid to the basic aqueous solution of sodium deoxycholate (DOC) resulted in a homogeneous, black aqueous solution of SWCNTs. The process takes just minutes to complete. UV-Vis-NIR absorption spectra and PL excitation-emission maps of the supernatant unambiguously confirm sharp absorption peaks and bright fluorescence that are characteristic of individually suspended semiconducting SWCNTs (FIGS. 1A and 1B). Cryo-transmission electron microscopy (cryo-TEM) imaging of the rapidly frozen solution further confirmed that the nanotubes were individualized rather than bundled together (FIGS. 2A and 2B).

Figure 3A:
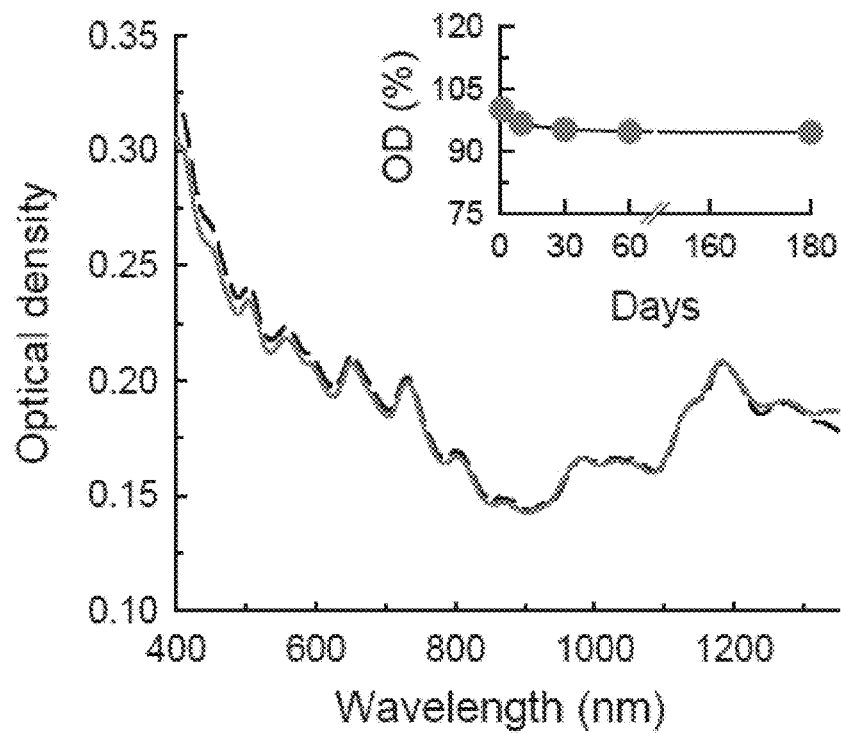
FIGS. 3A and 3B illustrate stability of DOC-suspended HiPco SWCNTs by S2E.
Figure 3B:
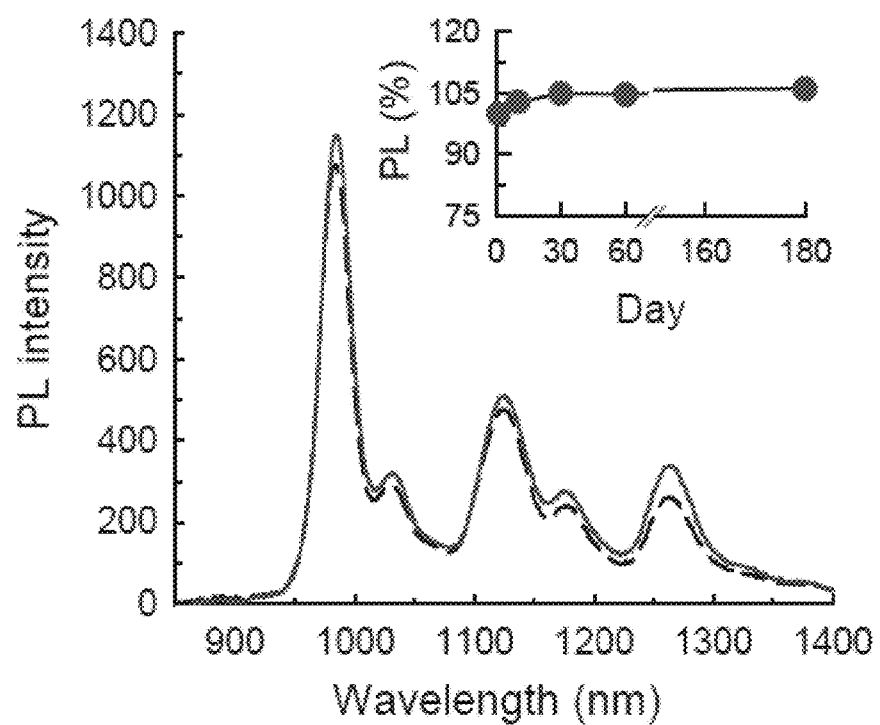

The superacid-surfactant exchange process is sensitive to the solution pH. At pH ~11, the solution was stable for more than 6 months. FIGS. 3A and 3B illustrate stability of the SWCNT dispersions in 1 wt % DOC over three months. Further addition of the SWCNT-superacid solution to the basic solution containing DOC can cause the pH to drop to ~pH 6 at which point nanotubes coagulated and precipitated. This observed pH dependence is believed to relate to the fact that deoxycholic acid has a pKa of ~6.6, such that at this lower pH it loses its solubility and hence efficacy as a surfactant.

The pH dependence of dispersion in steroid acid salt surfactants can be used to selectively separate SWCNTs from inorganic salts (e.g., NaCl and $Na_2SO_4$) and concentrate the SWCNTs. Salt removal and concentration of SWCNTs is accomplished by reversible protonation of the steroid acid (e.g., DOC) molecules. To achieve this, after S2E with at ~0.08 wt/v % DOC condition, a few drops of HCl is added to the solution to adjust the pH value to ~6 (at or preferably below the pKa of deoxycholic acid), so that the DOC together with the dispersed SWCNTs are coagulated out, while the soluble inorganic salts remain in the solution. The precipitates (SWCNT-clays) are collected by filtration and can be redispersed in nanopure water. By this method, the concentration of the SWCNTs can be easily condensed to more than ~100 mg/L.

Figure 4:
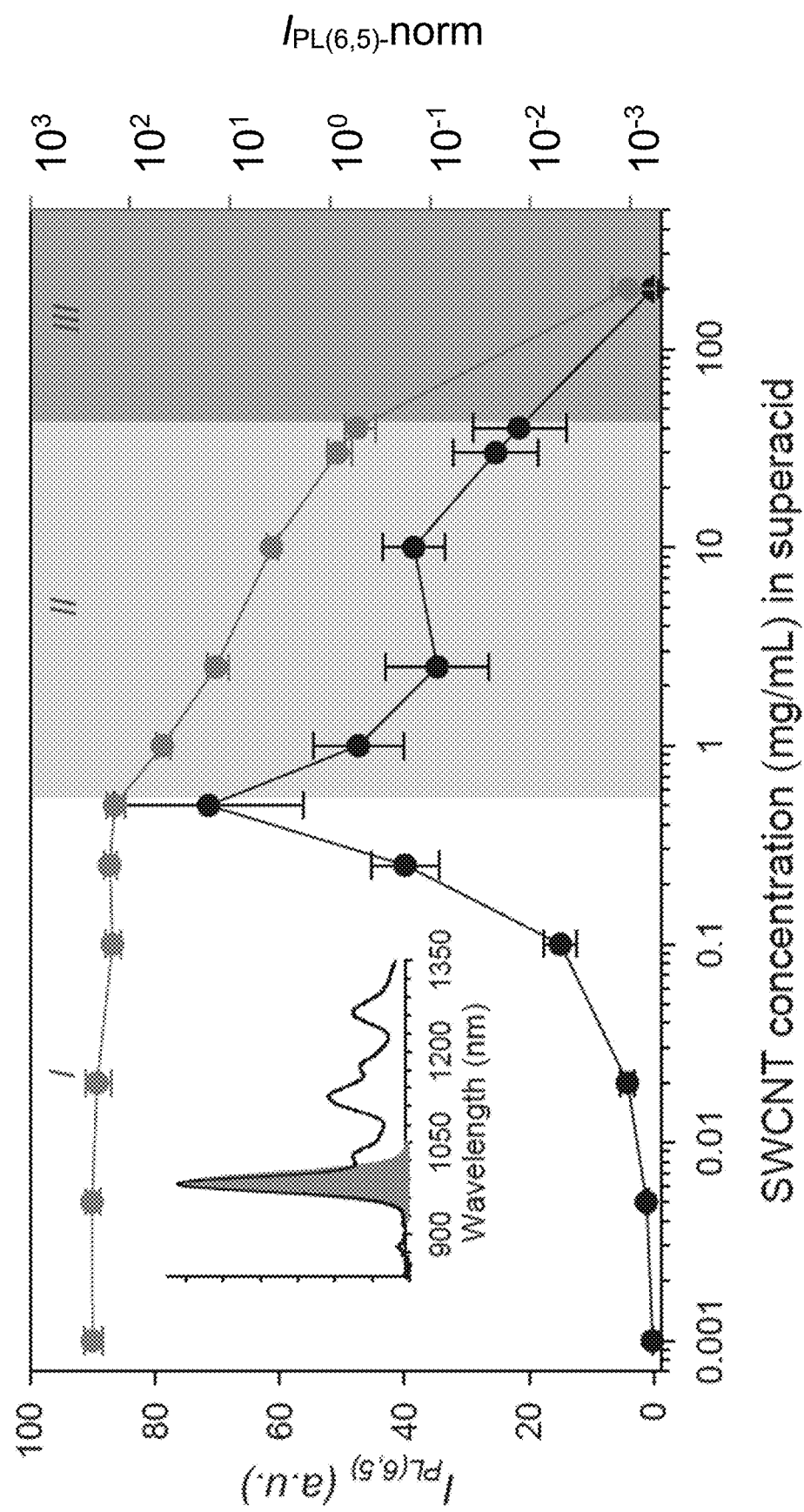
FIG. 4 illustrates the influence of SWCNT concentration on the dispersion efficiency of S2E.

It was also found that S2E was more effective for SWCNTs dispersion in a certain concentration window of SWCNTs (FIG. 4). It is believed that this phenomenon can be understood in light of the diffusion kinetics requiring DOC to encapsulate the "naked" SWCNTs in a timely manner; re-bundling occurs otherwise since the acid-base reactions are instantaneous. Lower concentrations are translated into larger average distances between the "naked" SWCNTs, which gives the surfactant molecules time to stabilize the tubes as individual particles in an aqueous suspension.

Example 3

Addition of Co-Surfactant (CTAB) to S2E-SWCNT Dispersions

After the superacid-surfactant exchange, an aqueous solution of 1.5 wt/v % CTAB is added to the DOC-stabilized SWCNT solution, such that the final concentrations of CTAB and DOC are 0.5 wt/v % and 0.67 wt/v %, respectively. The addition of this second surfactant caused the solution to phase separate, with individually dispersed SWCNTs collecting in the bottom fraction. This phase separation process can be accelerated by centrifugation at 2000 g for 2 min using a low-speed benchtop centrifuge. The collected S2E-SWCNTs can be diluted to a desired concentration for further uses and other electrical/optical measurements. By addition of CTAB to the neutralized solution, the suspension can be concentrated readily to a high final concentration of ~80 mg/L.

Figure 5A:
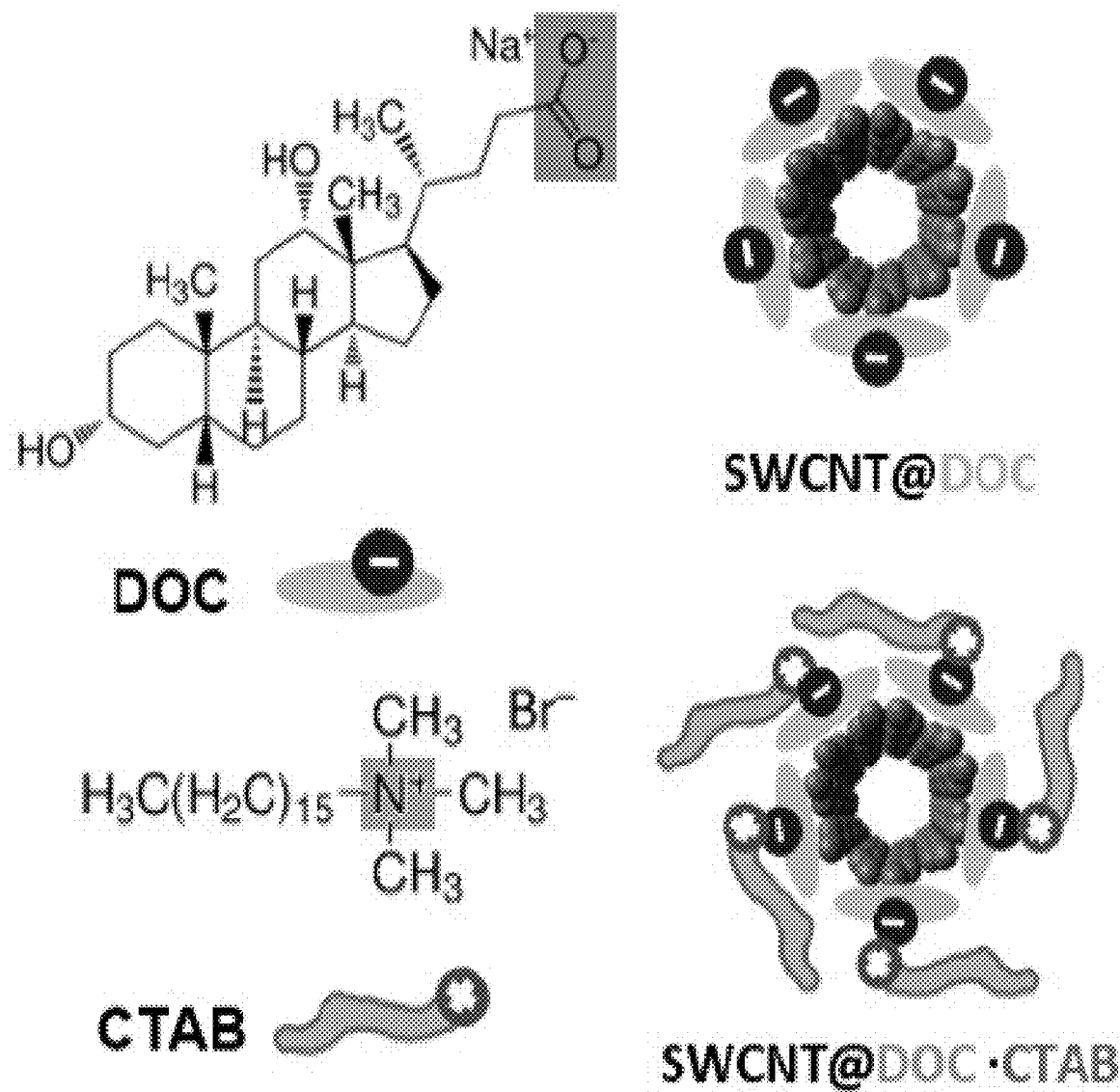

This phase separation behavior is believed to occur due to the specific molecular packing arrangement of CTAB and DOC on the SWCNT surfaces, as illustrated in FIG. 5A. In the absence of CTAB, the hydrophobic parts of DOC interact more directly with SWCNTs while the negatively charged headgroups protrude outward. After the addition of CTAB, coulombic attractions between the cationic heads of CTAB and the anionic heads of DOC shield the ionic groups, making the surfaces of the SWCNT/DOC more hydrophobic and triggering phase separation. FIGS. 5B and 5C show absorption and PL spectra (at 565 nm excitation), respectively of the separated top and bottom phases and confirm concentration of SWCNTS in the bottom phase. The phase separation enabled the significant SWCNT enrichment in the surfactant-rich bottom phase (over 200-fold).

Figure 6:
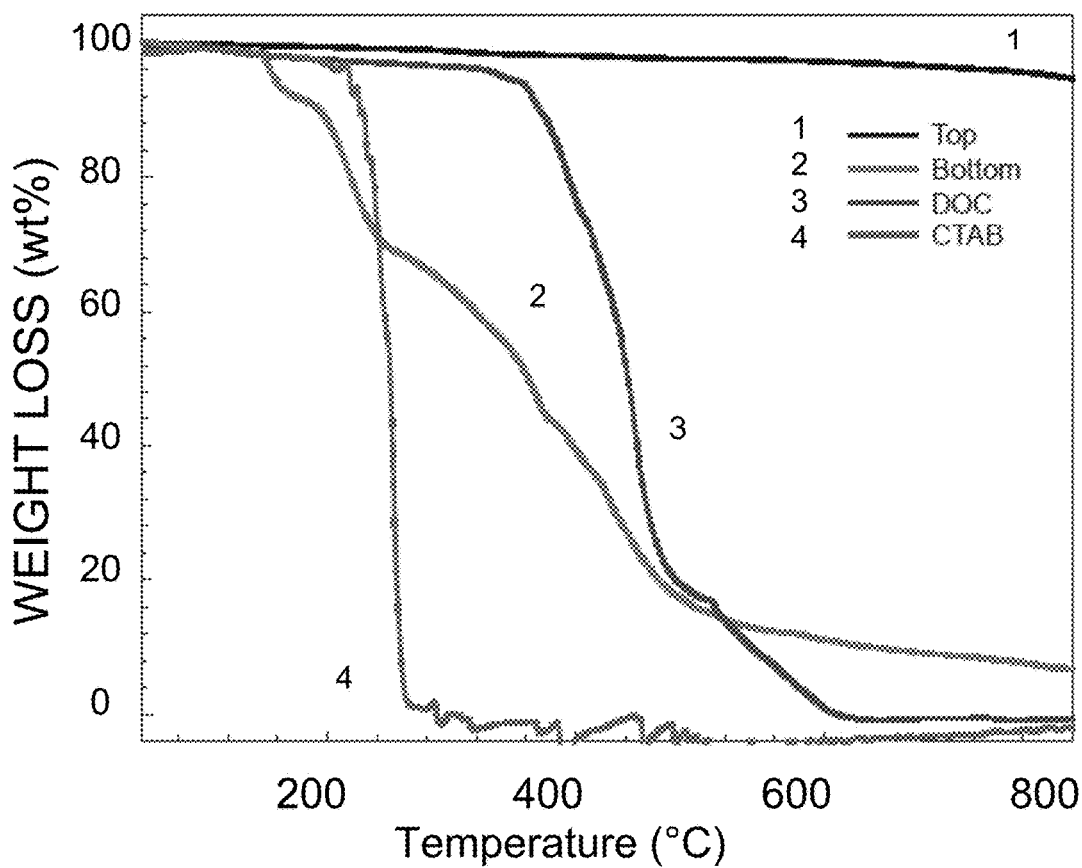
FIG. 6 illustrates thermal gravimetric analysis of the main compositions of the top and bottom phases after the addition of CTAB. In contrast to solid residue from the top phase (1) that shows no significant weight loss, 94% weight loss was observed for the solid residue of the bottom phase (2), which mainly consists of DOC and CTAB. The TGA curves of pure DOC (3) and CTAB (4) are shown for comparison.

The chemical compositions of the two separated phases were further analyzed by thermal gravimetric analysis (TGA; Mettler Toledo, TGA/DSC 2). Here the samples were prepared by the same neutralization procedure, but without the SWCNTs to better resolve the weight loss of the surfactants. The top and bottom phases were pipetted into glass dishes, left to dry at room temperature, and the residues were used for TGA experiments. TGA thermal curves were collected at a heating rate of 10° C./min under an atmosphere of air (flow rate 30 sccm) and over a temperature range of 50-800° C. TGA curves confirmed that that the solutes from the top phase mainly consisted of thermally stable salts such as NaCl, $Na_2SO_4$, and NaOH generated from the neutralization step, while the bottom phase was enriched with the two surfactants with little salt (FIG. 6).

Example 4

Use of Surfactants Other than DOC for SWCNT Dispersion

Figure 7:
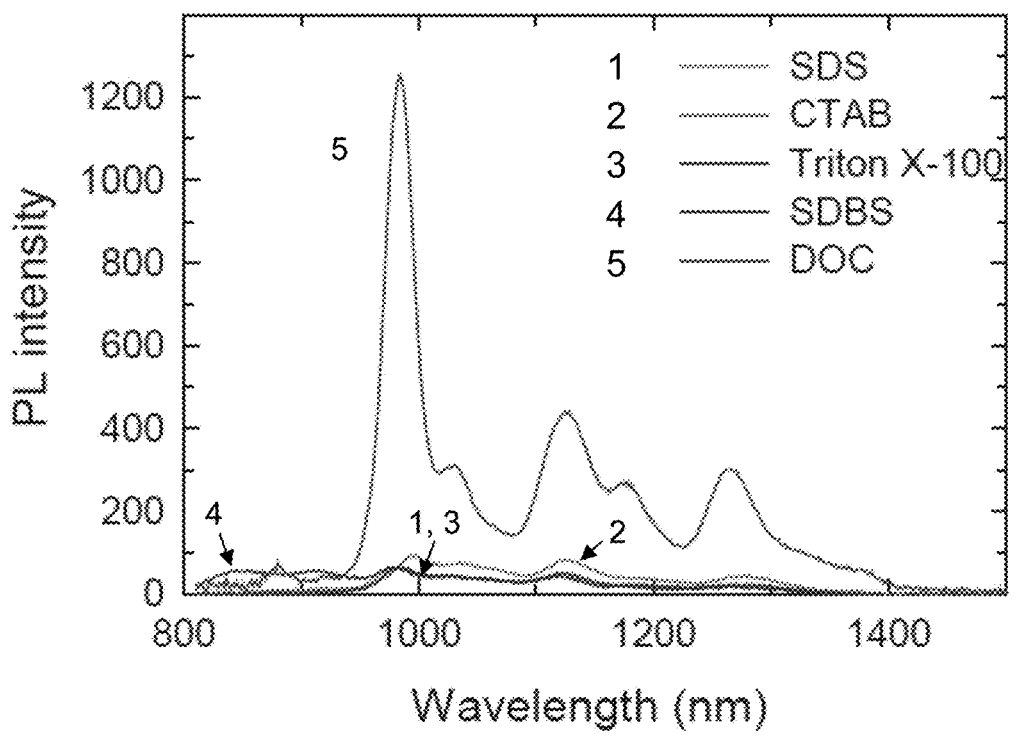
FIG. 7 illustrates the ability of different surfactants to disperse HiPco SWCNTs using S2E.
Figures 8A, 8B:
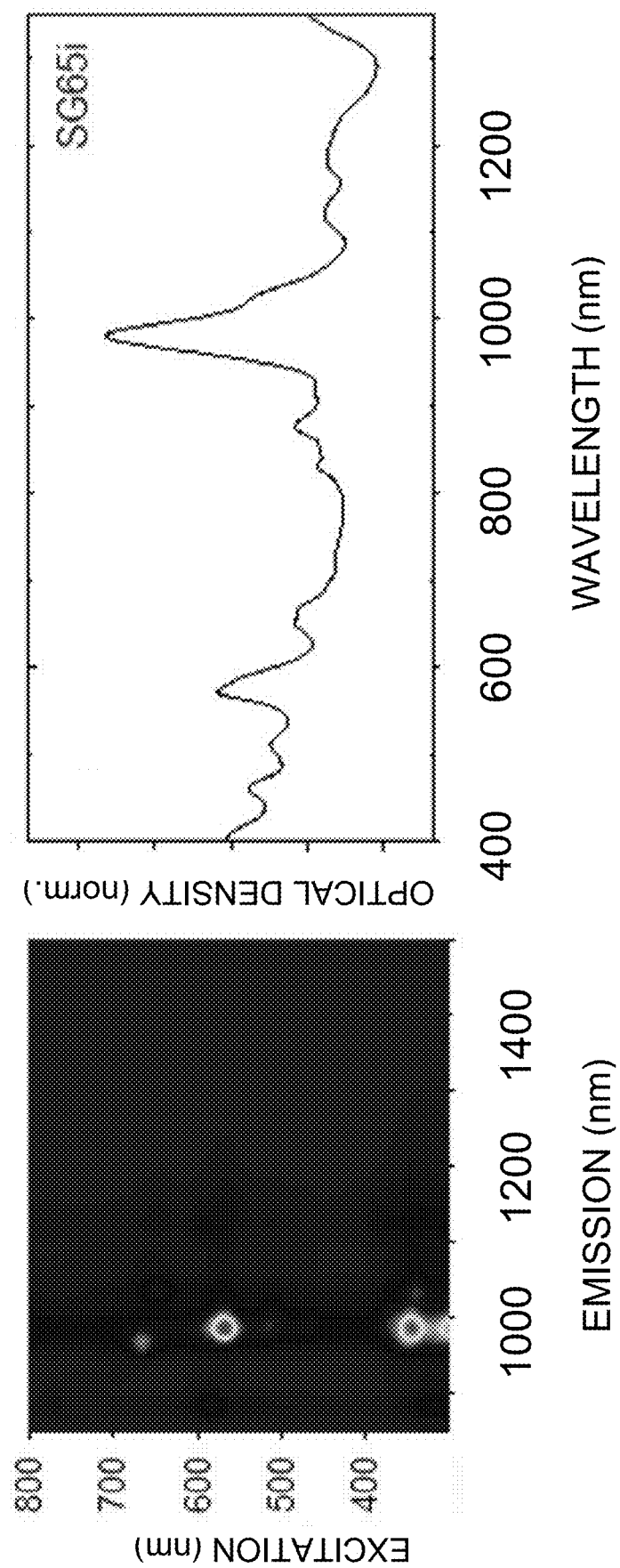
FIGS. 8A-8F illustrate aqueous dispersions of SWCNTs from four different sources using the S2E method.
Figures 8C, 8D:
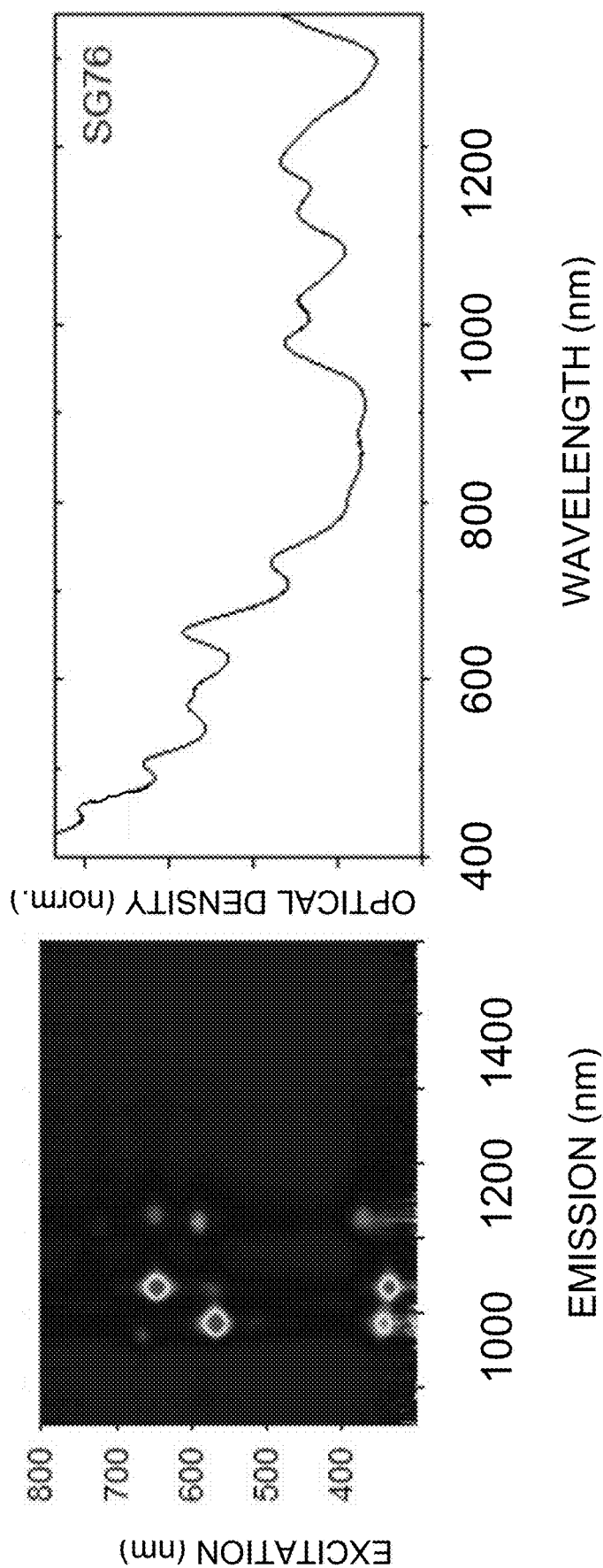
Figures 8E, 8F:
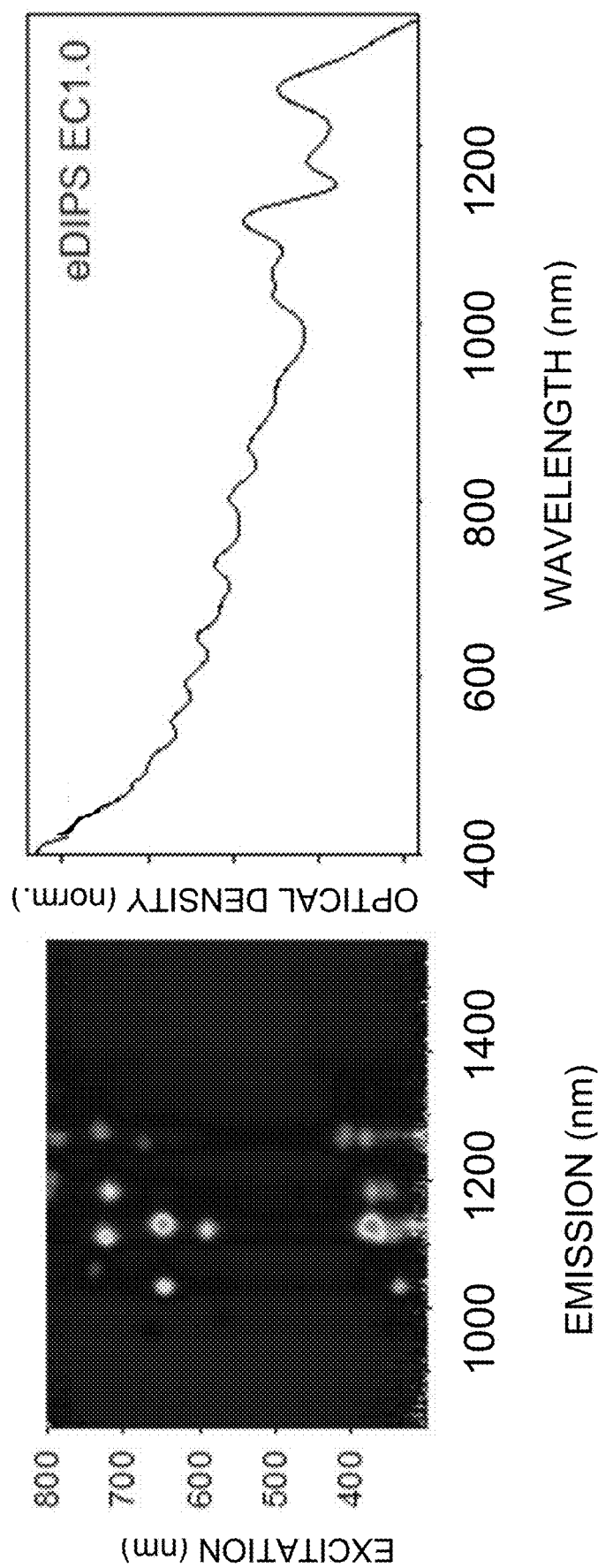

Among the various surfactants that are commonly used for dispersing SWCNTs, it was found that DOC, a steroid acid salt, was most effective for the S2E method (FIG. 7). DOC and other steroid acid salts features rigid but slightly bent steroid rings that can easily accommodate the curved nanotube surface [Haggenmueller, 2008], thus presumably enabling the high dispersion stability of the individual SWCNTs.

Example 5

Use of Various SWCNTs Sources

Although HiPco materials, the most studied source of SWCNTs, were used for demonstration purposes, other sources of SWCNTs, including CoMoCAT SG65i, CoMo-CAT SG76, and MEIJO eDIPS EC1.0, were similarly successful at individual dispersal (FIGS. 8A-F).

Example 6

S2E Dispersion of Graphene

Graphite powder (1 mg, Sigma Aldrich) was mixed with 10 mL of CSA in a 50 mL round flask with vigorous stirring (1200 rpm) for 3 days using a Teflon™ coated magnetic stir bar. The S2E procedure of Example 1 for dispersion of SWCNTs were used to disperse the graphite as graphene, except that sodium cholate (SC) was used as the surfactant at ~0.01 wt/v %. SC appears to be more effective than DOC for dispersion of graphite.

Aqueous graphene dispersions, can be analyzed, for example, by transmission electron microscopy (TEM, to analyze graphene flake size and crystalline state (by small area diffraction)), atomic force microscopy (AFM, to analyze the flake thickness) and resonance Raman spectroscopy (to analyze the defect density).

Example 7

Characterization of S2E-SWCNTs

The length of S2E-SWCNTs were characterized by AFM. The individually dispersed SWCNTs were deposited on (3-aminopropyl) triethoxysilane functionalized $SiO_2$/Si substrates, following a previously published method (Tabakman, 2010). In order to totally remove the surfactants and other possible organic solvents, the coated wafers were annealed in air at 300° C. for 1 h. All AFM images were recorded in tapping mode on a Veeco Multimode AFM with conical AFM probes backside-coated with gold (Tap300GD-G, with a force constant of 40 N/m, Ted Pella).

Photoluminescence (PL) of the SWCNT solutions and dispersions was characterized with a Horiba Jobin Yvon NanoLog spectrofluorometer using a liquid-$N_2$ cooled InGaAs array. Note that for PL spectroscopy measurements, $D_2O$ was used in place of nanopure water as the solvent. UV-Vis-NIR absorption spectra were measured with a spectrophotometer equipped with a broadband InGaAs detector (Lambda 1050, PerkinElmer). For TCFs, an integrating sphere (Labsphere Model No. 150MM RSA ASSY) equipped with a broadband InGaAs detector installed to the UV-Vis-NIR spectrophotometer was also used. Raman scattering was measured from thin film samples using a LabRAM ARAMIS Raman microscope (Horiba Jobin Yvon) in duo scan mode, which averaged spectra from a 30×30 $\mu m^2$ area. Each sample was measured from at least 10 different regions and averaged to ensure the data was statistically meaningful.

Photoluminescence imaging of SWCNTs was performed as follows. Small aliquots of S2E-SWCNT and 2 h sonic-SWCNT solutions in 1 wt/v % DOC-D2O were physisorbed on poly D-lysine coated glass slides (Part No. P35GC-0-10-C, MatTek Corporation). Single tube PL imaging was performed on an inverted fluorescent microscope custom-built from a Nikon Eclipse Ti-U equipped with an oil immersion objective (UAPON 150XOTIRF, NA=1.45, Olympus) to improve the collection efficiency in the NIR. SWCNTs were excited with a collimated, 730 nm diode laser (Shanghai Dream Lasers Technology) at 1 kW/cm2 power density. The PL emission was collected using a liquid-N2 cooled two-dimensional InGaAs detector (Cougar 640, Xenics, Inc.) in Integrate Then Read mode. To achieve low dark current levels, broadband PL images were also obtained using Read While Integrate modes. The integration time was 4 s.

Figure 9A:
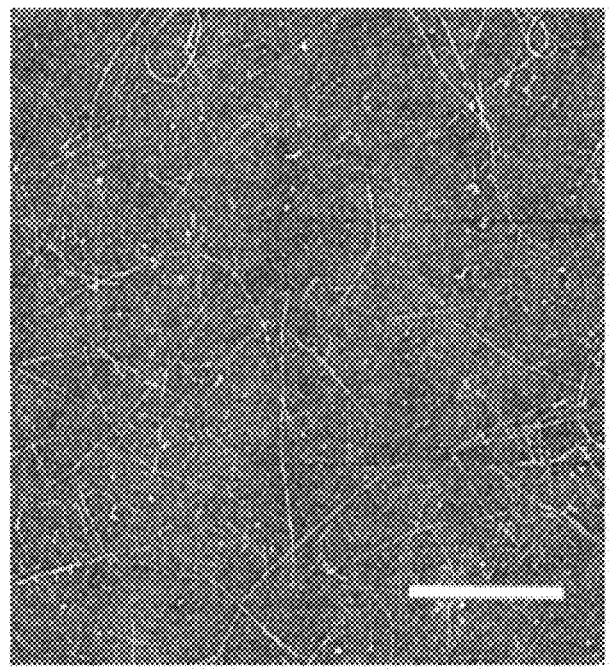
FIGS. 9A-9E illustrate the nondestructive nature of the S2E process.
Figure 9B:
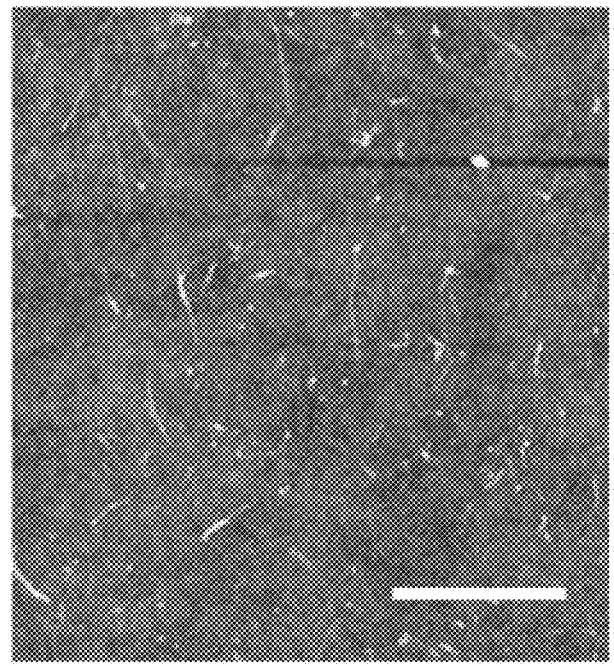
Figure 9C:
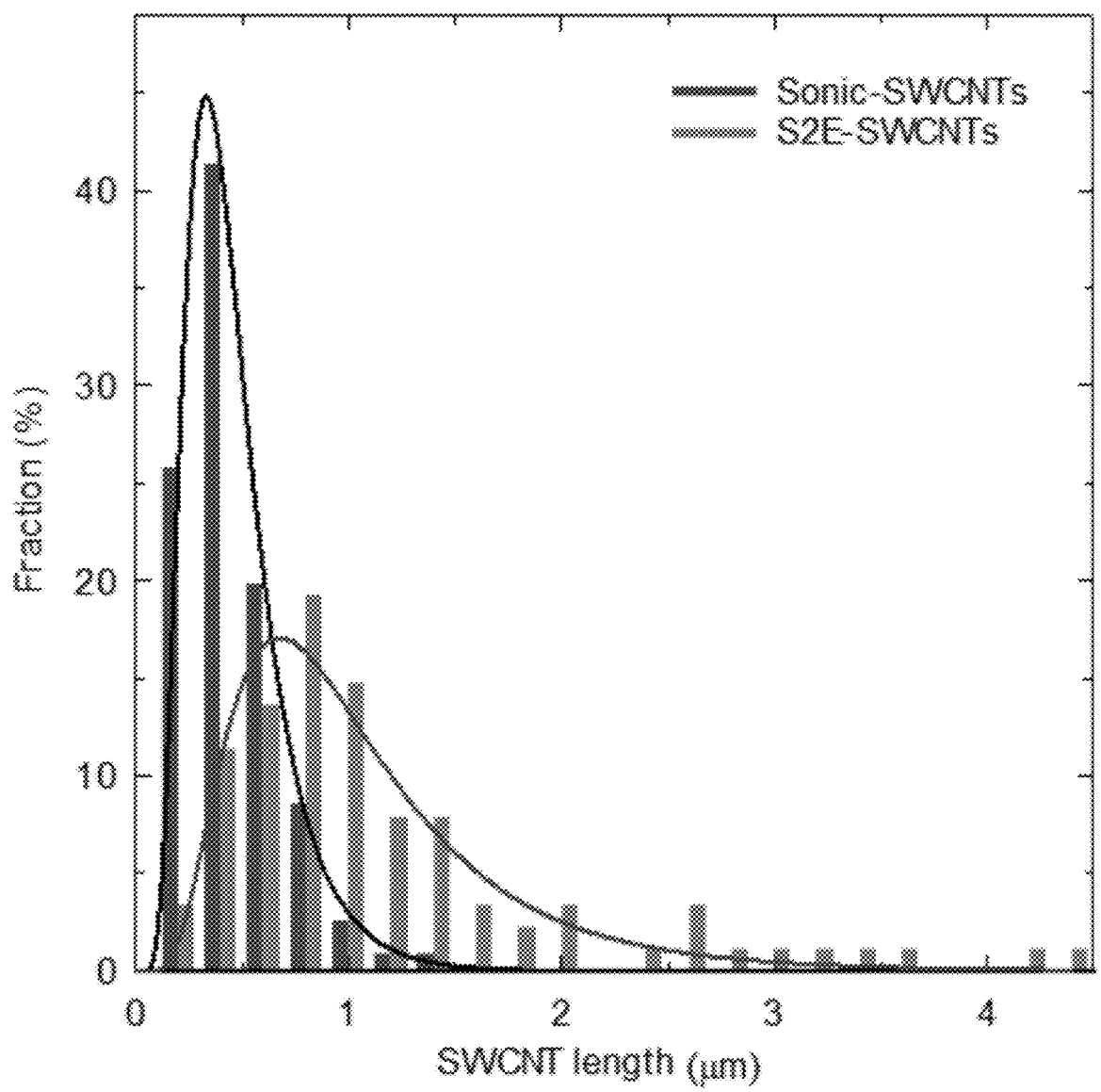
Figure 9D:
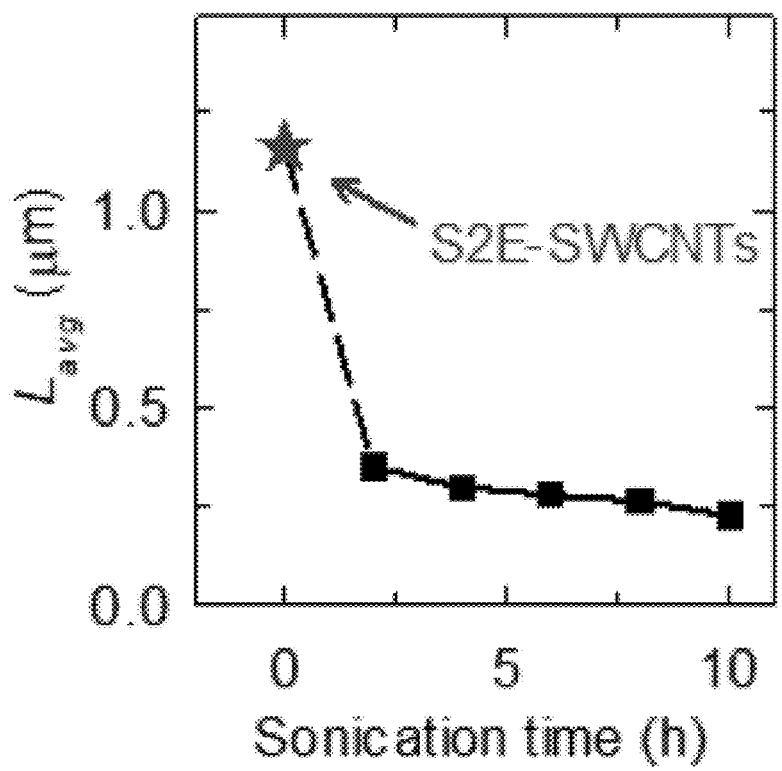
Figure 10A:
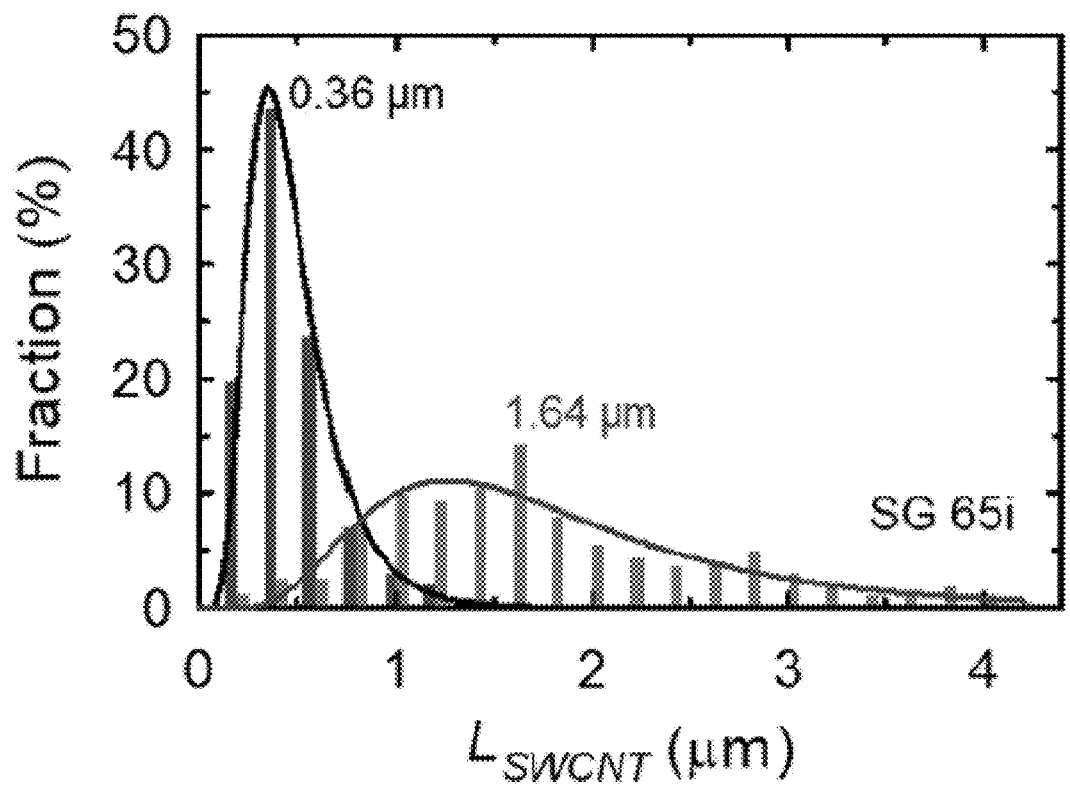
FIGS. 10A-10C illustrate length distribution characterization (based on AFM imaging) of S2E-SWCNTs (black) and sonic-SWCNTs (gray) prepared from three sources of SWCNT. The graphs length distribution histograms plotting fraction of SWCNTs (%) vs. length in μm.
Figure 10B:
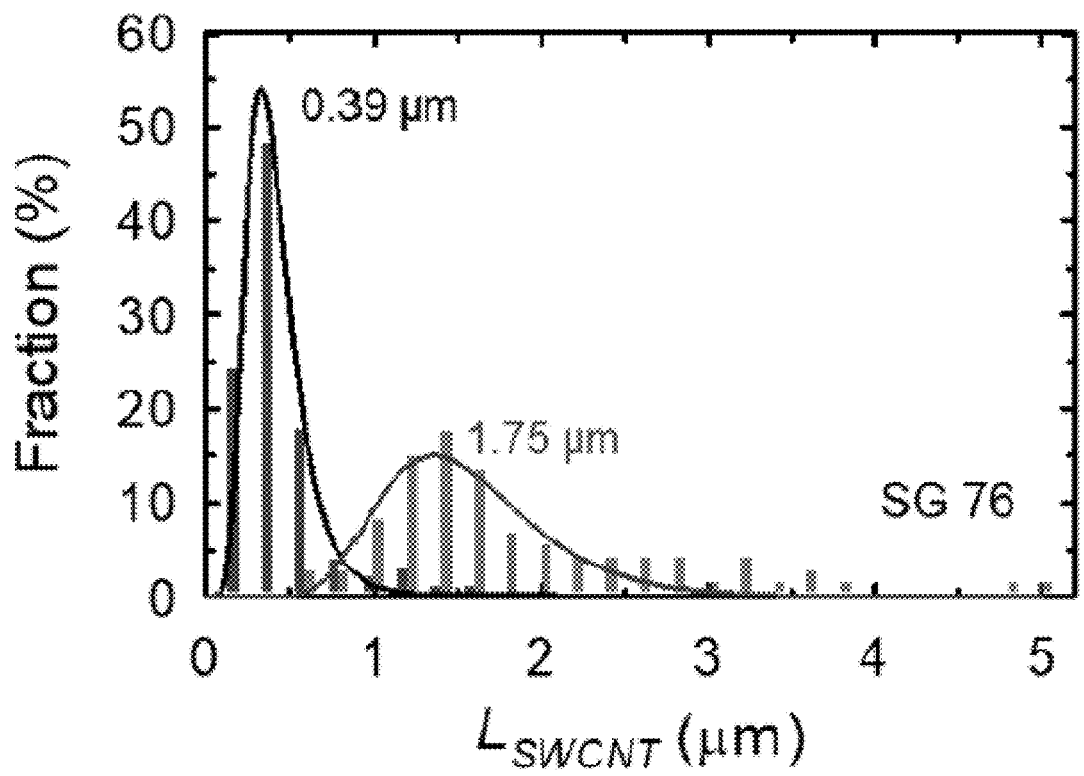
Figure 10C:
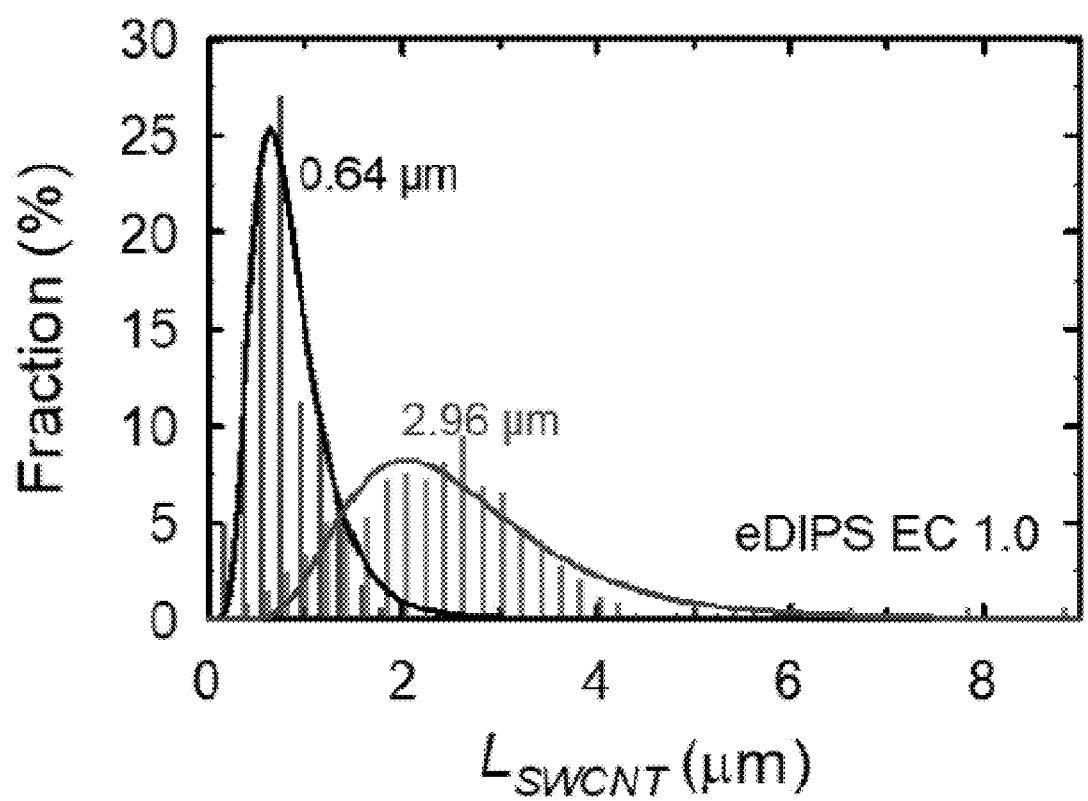

The S2E-SWCNTs were found to be significantly longer than controls prepared using ultrasonication (sonic-SWCNTs). After only 2 h of sonication, HiPco sonic-SWCNTs were into pieces with an average length ($L_{avg}$) of just 0.35 µm. In contrast, the $L_{avg}$ of the S2E-SWCNTs was 1.18 µm, which was 237% longer than the sonic-SWCNT control (FIGS. 9A-9C). The average length of the sonic-SWCNTs continued to decrease with increasing sonication time (FIG. 9D). Similar trends were observed for the three other sources of SWCNTs studied, including CoMoCAT SG65i, CoMoCAT SG76, and MEIJO eDIPS EC1.0 (FIGS. 10A-10C, respectively). $L_{avg}$ for the corresponding S2E-

SWCNTs was 1.64 μm, 1.75 μm, and 2.96 μm, respectively, which was more than 460% as large as the sonicated controls.

Figure 9E:
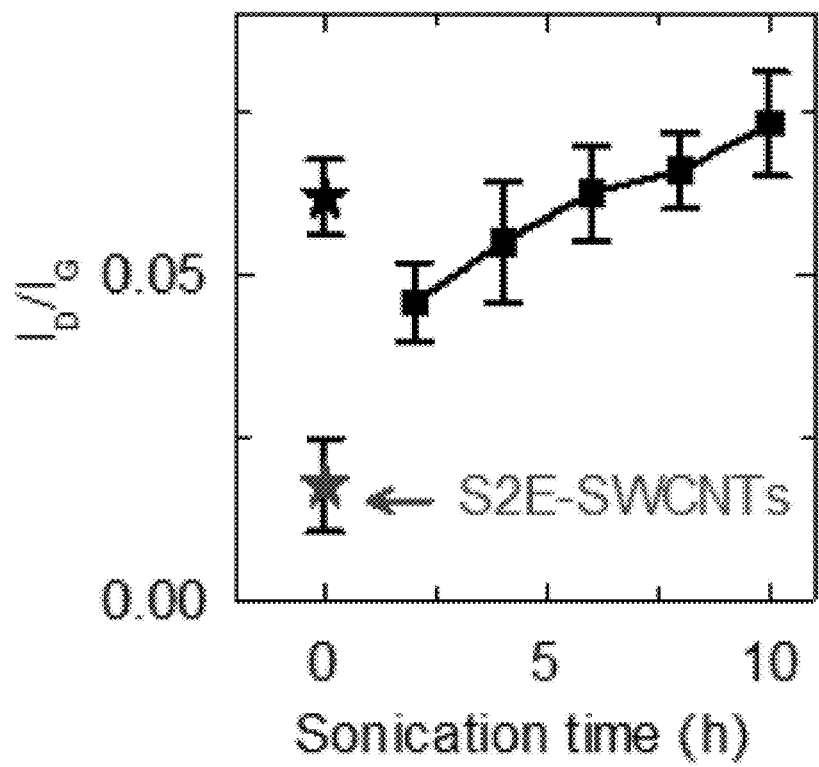
Figure 11:
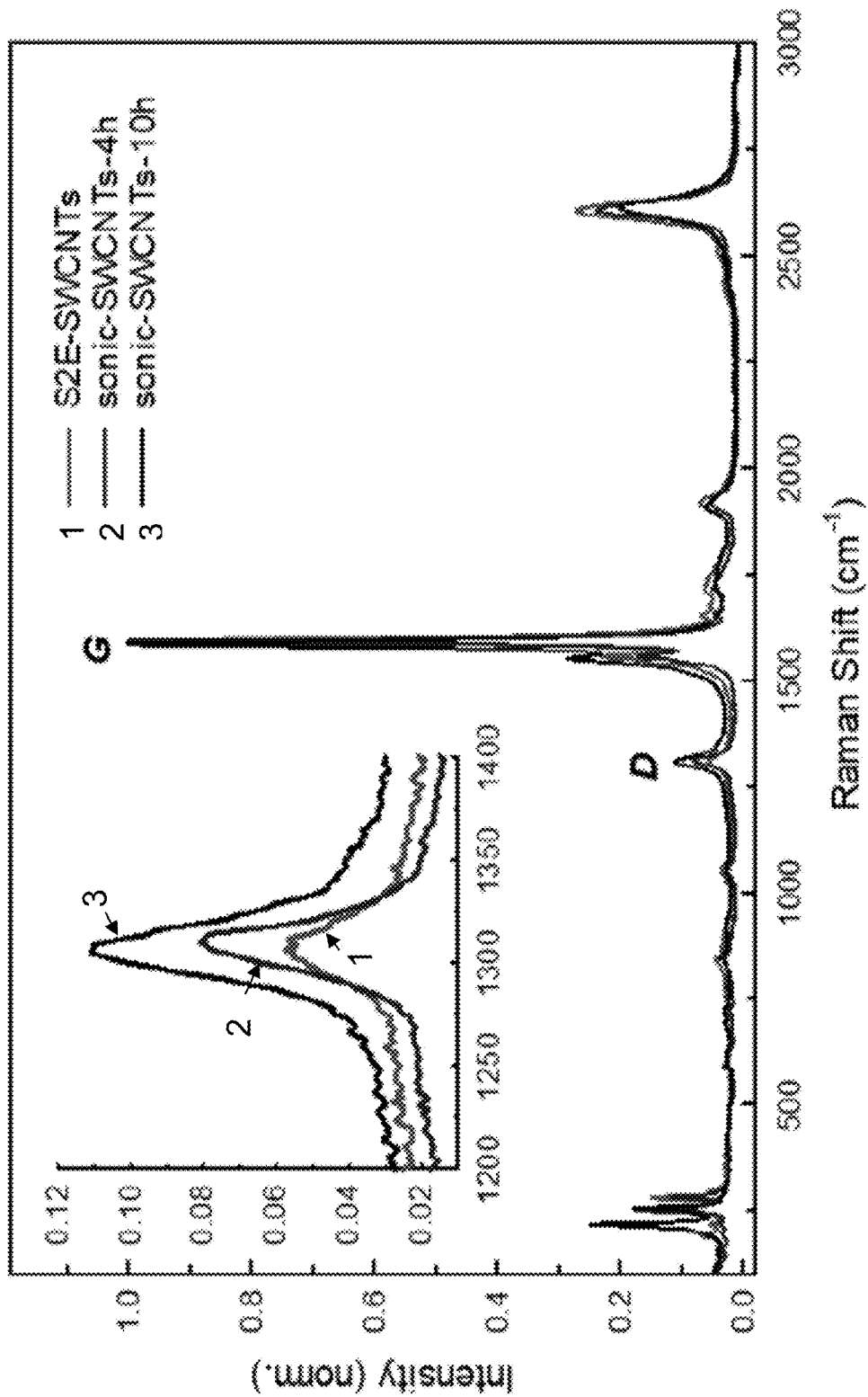
FIG. 11 illustrates a comparison of Raman spectra of the S2E-SWCNTs and sonic-SWCNTs. For clarity, only sonic-SWCNTs prepared with 4 h (2) and 10 h (3) sonication times are plotted here (633 nm laser). For comparison to S2E-SWCNTs (1). All the spectra are normalized to the G peak. The inset is a magnified view of the D peaks.

S2E-SWCNTs were found to have the lowest ID/IG ratio at ~0.02 for HiPco materials (FIG. 9E, FIG. 11). In contrast, the $I_D/I_G$ for HiPco sonic-SWCNTs increased, ranging from ~0.05 to ~0.08 with increasing sonication time. Interestingly, ID/IG is roughly proportional to $1/L_{avg}$, suggesting that the defects introduced by sonication are mainly located at the nanotube ends (i.e., end defects) which define the length of the tube. $I_D/I_G$ of the S2E-SWCNTs was even lower than the starting raw HiPco material (black star in FIG. 9E), possibly due to the purification effect of the superacid [Parra-Vasquez, 2010]. It is believed that nanotubes with a highly crystallized structure can be fully protonated by the superacid, while amorphous carbon and highly defective tubes cannot dissolve well, causing these materials to remain as solids that precipitate out of solution, thus lowering the total defects in the S2E-processed samples.

Example 8

Fabrication, Electrical Measurements, X-ray Photoelectron Spectroscopy (XPS) Study of Transparent Conductive Films (TCFs)

TCFs are fabricated by filtering the dispersed S2E-SWCNTs through a 0.025 μm nitrocellulose membrane (Merck Millipore Ltd) to deposit SWCNTs. The membranes are placed in a vacuum oven at room temperature for 12 h. After drying, the nitrocellulose membrane with the attached SWCNT film is cut into 3 cm×1 cm strips and transferred onto a glass slide according to a method established by Wu, 2004. Prior to transferring, the glass slides are cleaned in piranha solution at 90° C. for 45 mins, followed by rinsing in nanopure water and blow-drying with argon. Then in order to fully remove the remaining surfactants and residues from the nitrocellulose membrane, the thin films are immersed in 40% nitric acid solution for 0.5 h as described by Geng, 2007 and then immersed in nanopure water for 2 h.

The electrical conductivities of the films are measured by a 4-probe technique. The electrodes are deposited on SWCNT strips at equal spacing by thermally evaporating silver (80 nm thickness) using a Metra Thermal Evaporator. I-V curves are measured on a Cascade probe station using a Keithley S4200 semiconductor parameter analyzer. Each data point is the average of at least 3 measurements.

XPS measurements are performed on a Kratos Axis 165 X-ray spectrometer equipped with monochromatic Al Ka (1486.7 eV) radiation. Survey scans and high resolution scans are taken with pass energies of 160 eV and 40 eV, respectively. All samples are calibrated to the sp² C 1s peak at 284.4 eV. The peaks are fitted using CasaXPS.

Figure 12A:
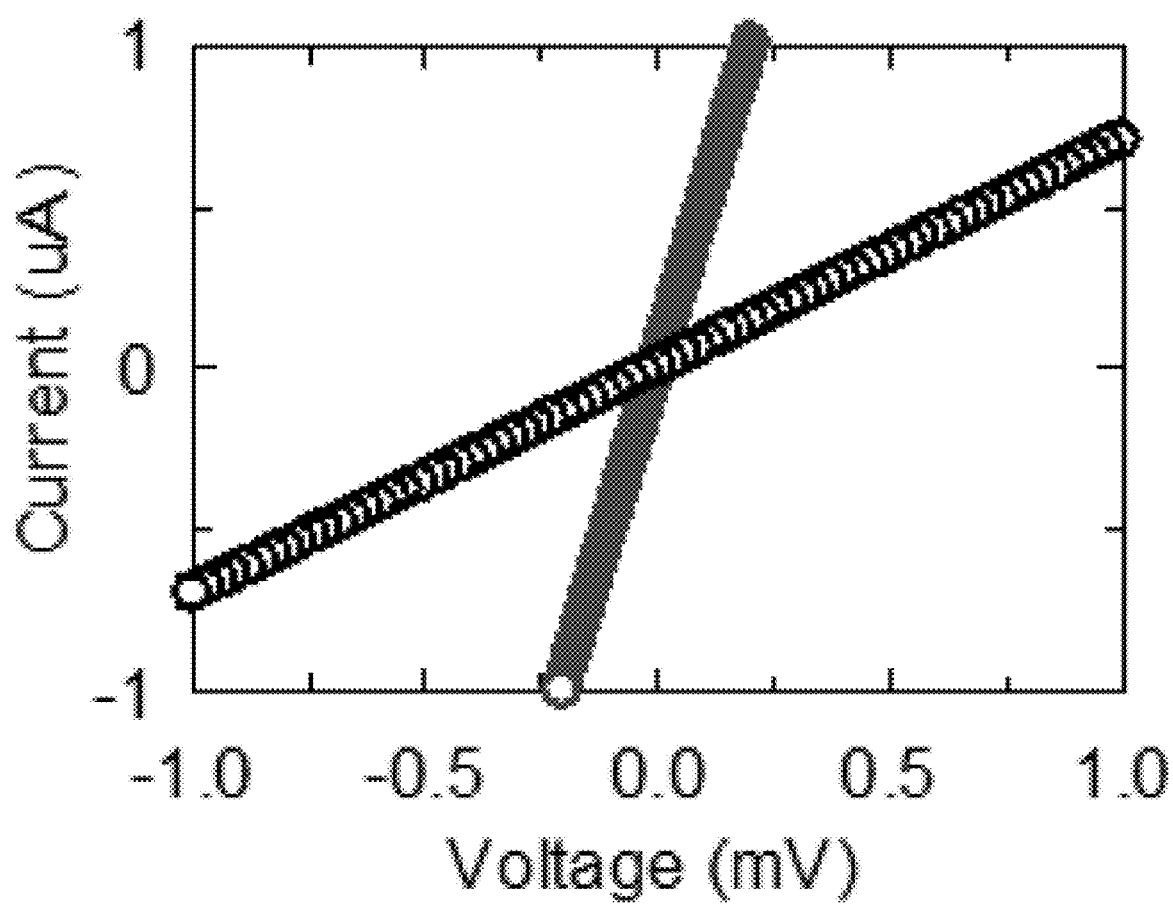
FIGS. 12A and 12B illustrate electrical and optical properties of S2E-SWCNT thin conducting films benchmarked against sonic-SWCNT controls and ITO.
Figure 12B:
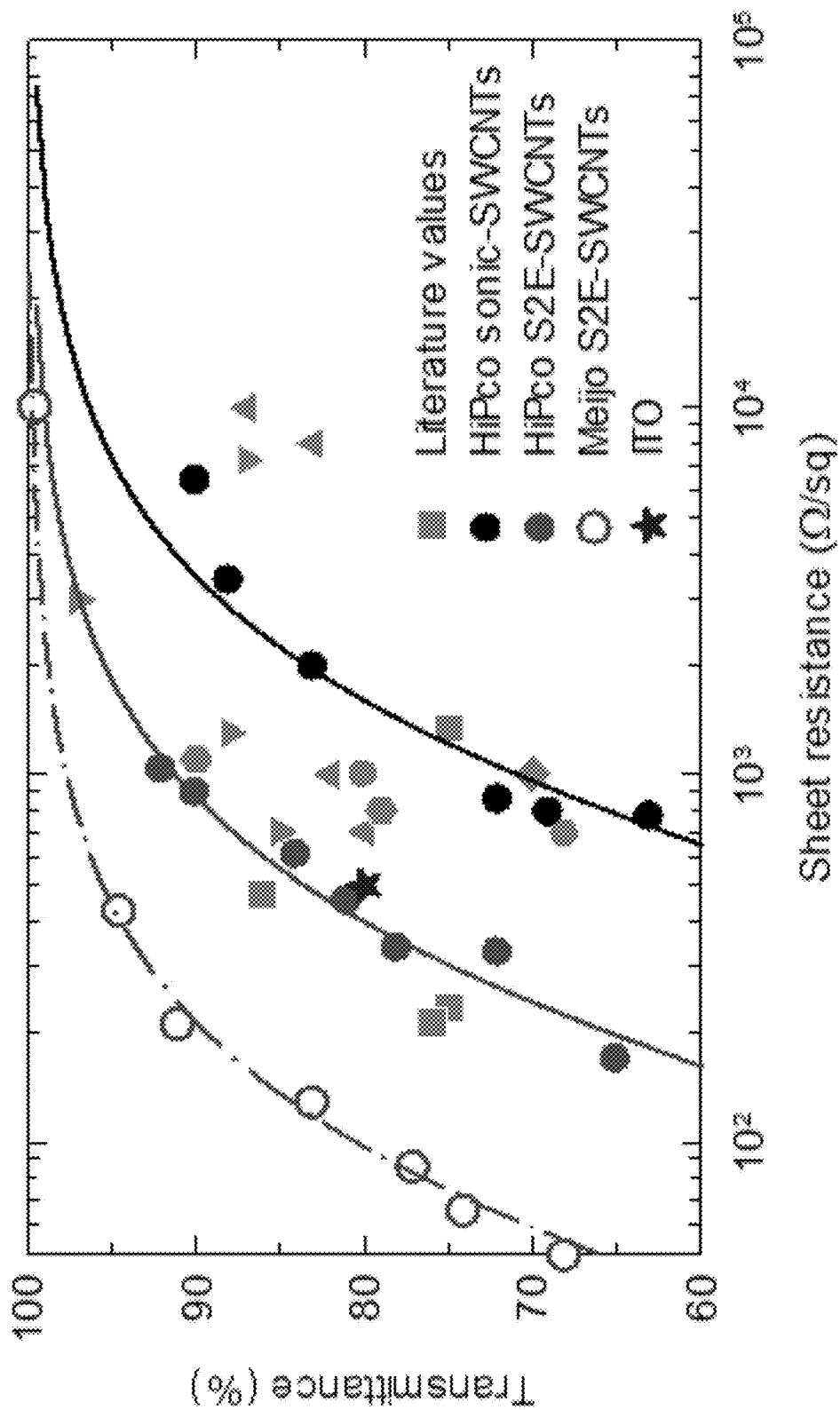

Transparent conducting films (TCFs) are an emerging application of carbon nanotubes [Wu, 2004]. The sheet resistance (RS) of a nanotube TCF is dominated by the junction resistance [Hecht, 2006]. The longer the nanotubes, the fewer the junctions that are encountered by the current traversing the film, and as a result, the conductivity of a nanotube film scales with nanotube length by a power law [Hecht, 2006]. Based on four-point probe measurements, it is found that TCFs made from S2E-SWCNTs showed an RS as small as 66 S2/sq at 75% optical transmittance at 550 nm, which was 11.5-times more conductive than the sonic-SWCNT control TCF (760 Ω/sq; FIGS. 12A and 12B).

Figure 13:
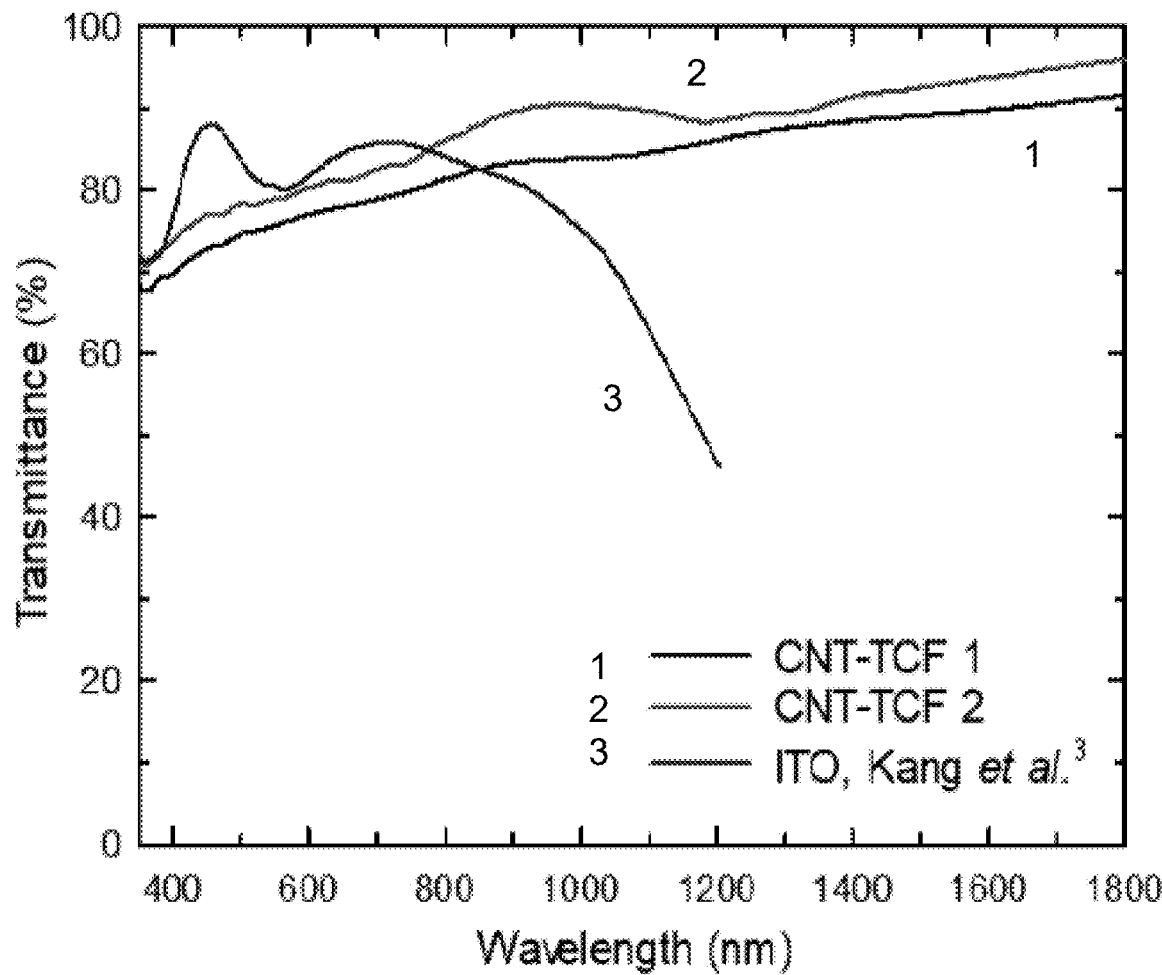
FIG. 13 illustrates transmittance curves of SWCNT-TCFs and indium tin oxide (ITO). TCF 1 (1) and TCF 2 (2) are representative curves out of 50 TCFs fabricated as described herein from S2E-HiPco. The transmittance curve of ITO (3) was adapted from Kang, 2012 for comparison.

Notably, the SWCNT-TCFs exhibited high transmittance in both the visible and NIR wavelengths (FIG. 13).

The performance of these TCFs was further evaluated using the ratio of the optical ($\sigma_{op}$) and current ($\sigma_{dc}$) conductivity, which is correlated to the sheet resistance ($R_S$) and the optical transmittance (T), according to the following equation [Hecht, 2006]

$$\frac{\sigma_{op}}{\sigma_{dc}} = \left(\frac{1}{\sqrt{T}} - 1\right) \times \frac{R_S}{188}. \qquad \text{Eq. 2}$$

A lower $\sigma_{op}/\sigma_{dc}$ value indicates better opto-electronic performance of the TCF (i.e., higher conductivity at higher optical transparency). FIG. 12B shows the sheet resistance-transmittance curves of TCFs fabricated from HiPco S2E-SWCNTs in comparison with the sonic-SWCNT control and other HiPco TCFs reported in the literature. At 550 nm, the HiPco S2E-SWCNT TCFs had a $\sigma_{op}/\sigma_{dc}$ value 0.26, which is 3.4-times more conductive than the sonicated controls. The conductivity of these HiPco thin films is comparable with the best reported in the literature [Mirri, 2012].

Figure 14:
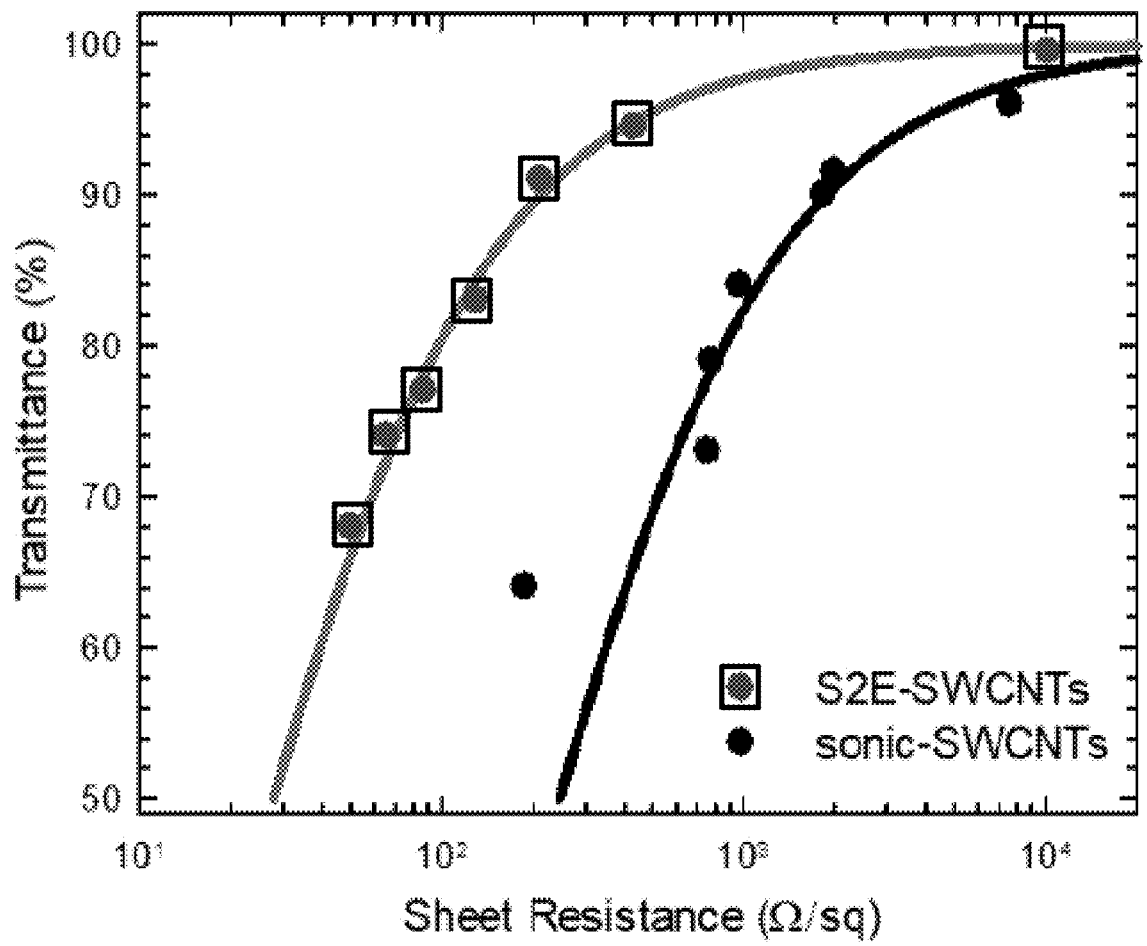
FIG. 14 illustrates a comparison of sheet resistance versus transmittance for TCFs. The comparison is of S2E-SWCNTs (gray in boxes) and sonic-SWCNTs (black) prepared from MEIJO eDIPS EC1.0. Both the gray and black lines are fitted according to Eq. 2.

In the case of MEIJO eDIPS EC1.0 SWCNTs, the enhancement was even more pronounced, with a $\sigma_{op}/\sigma_{dc}$ value of 0.06 for S2E-SWCNTs and 0.54 for the sonication control, which is an 8-fold improvement in the conductivity (FIG. 12B, FIG. 14). The conductivity of the MEIJO eDIPS EC1.0 S2E-SWCNTs (130 Ω/sq at 83% transmittance) is also significantly better than that of indium tin oxide (ITO), the most widely used transparent conducting film (star in FIG. 12B). Notably, this high conductivity is achieved without having to chemically dope the nanotubes, as is commonly practiced for conductive thin films [Hecht, 2006].

Figures 15A, 15B:
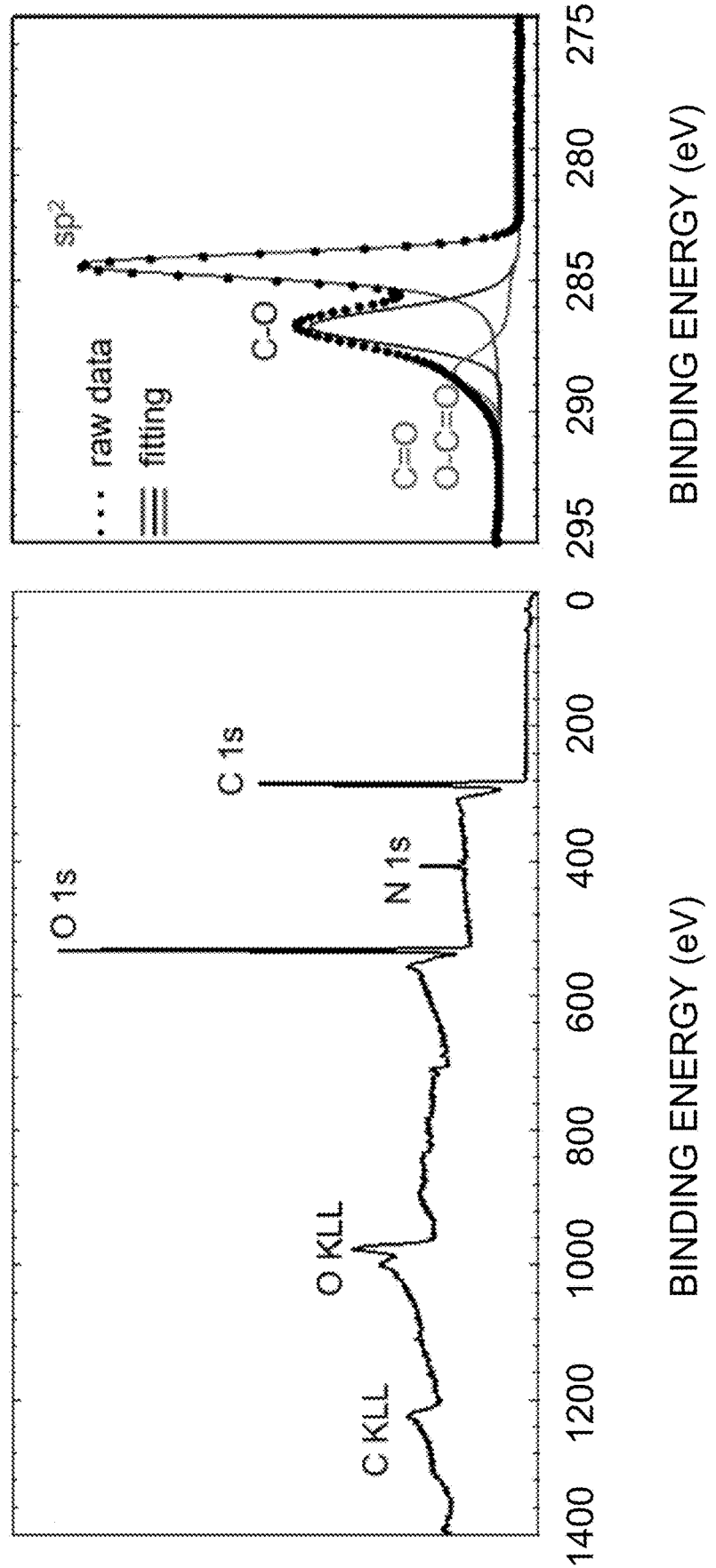
FIGS. 15A-15F illustrate XPS characterization of the TCFs fabricated from S2E-SWCNTs. XPS survey scans (FIGS. 15A, 15C and 15E) and high resolution scans of the C 1s peak (FIGS. 15B, 15D and 15F) are shown for the SWCNT TCFs.
Figures 15C, 15D:
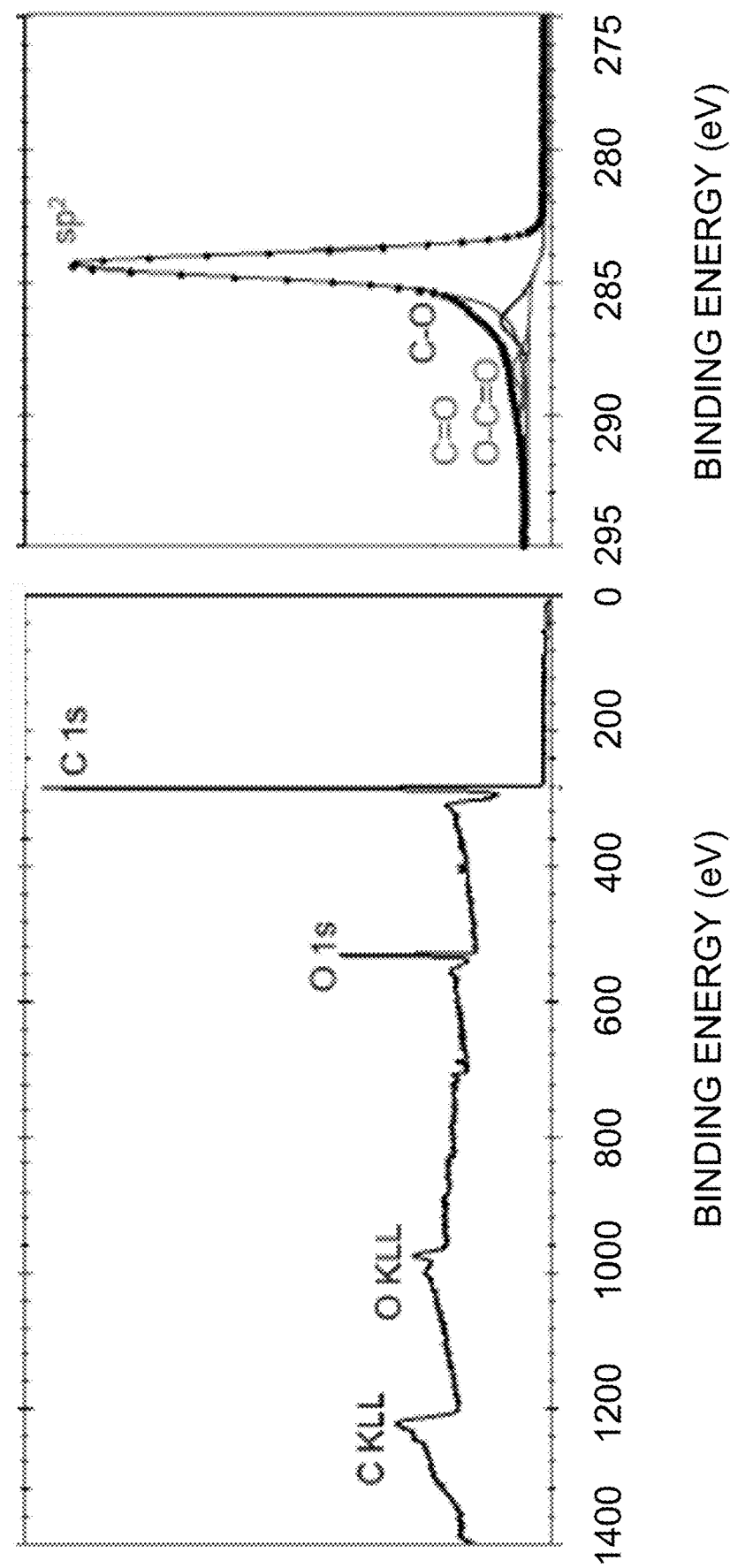
Figures 15E, 15F:
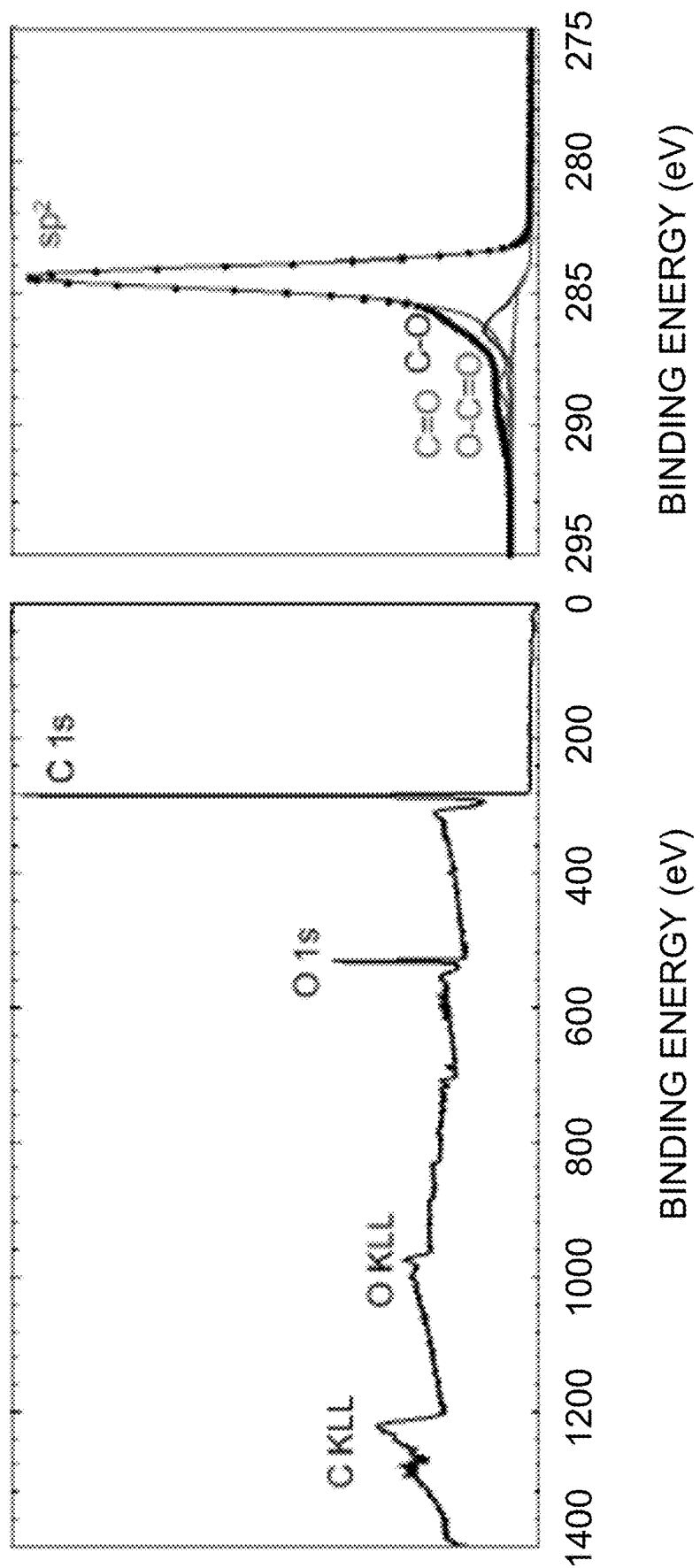

XPS confirms that the S2E-SWCNTs are not doped, which is consistent with the observed high stability of the film conductance (FIGS. 15A-15F). FIGS. 15A, 15C and 15E show the survey scans and FIGS. 15B, 15D and 15F shown the corresponding high resolution scans of the C 1s peak for the SWCNT TCFs. The deconvoluted peaks can be attributed to the single (286.5 eV) and double (288.4 eV) carbon-oxygen bonds. Survey scans (FIGS. 15A and 15C) show that after soaking the TCFs in nitric acid, the atomic percentage of carbon increased from 65.9% to 89.0%, while oxygen decreased from 29.6% to 9.2%, confirming that residues on the films, possibly from the nitrocellulose membrane used for the preparation of TCFs by filtration (FIGS. 15C and 15D), can be removed. The percentages of carbon, oxygen, and nitrogen from the nitric acid soaked samples (89.0% of C, 9.2% of O, and 1.4% of N) were similar to those of the raw SWCNT samples (89.7% of C, 8.5% of O, and 1.2% of N; FIGS. 15E and 15F), indicating no dopants are introduced.

Figure 16:
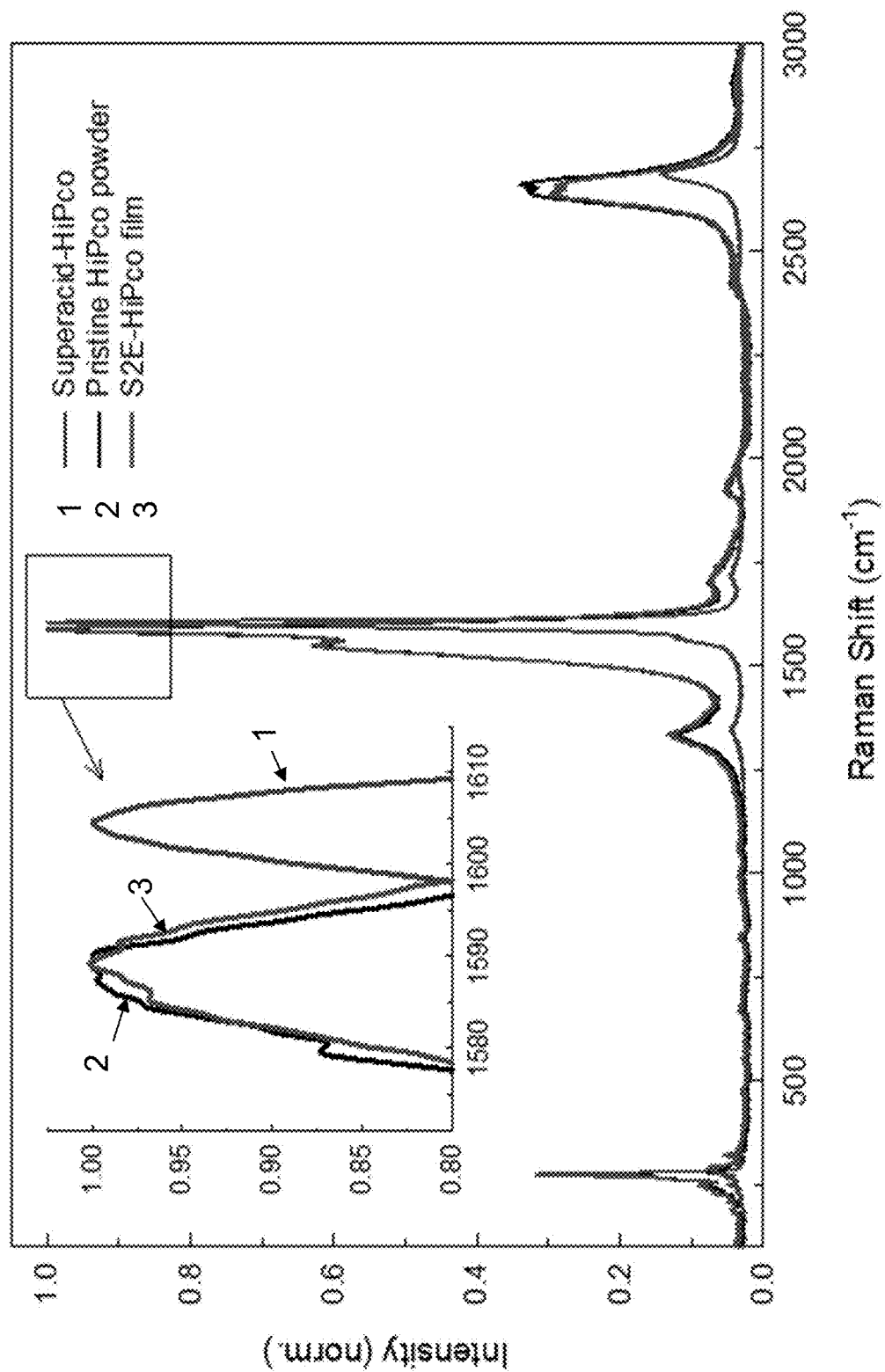
FIG. 16 illustrates Raman spectra that confirm that S2E-SWCNTs were not doped. The Raman spectra of superacid-HiPco (1), pristine HiPco powder (2), and S2E-HiPco TCFs (3) were collected. The inset is the magnified Raman G band region. The excitation wavelength is 532 nm.
Figure 17:
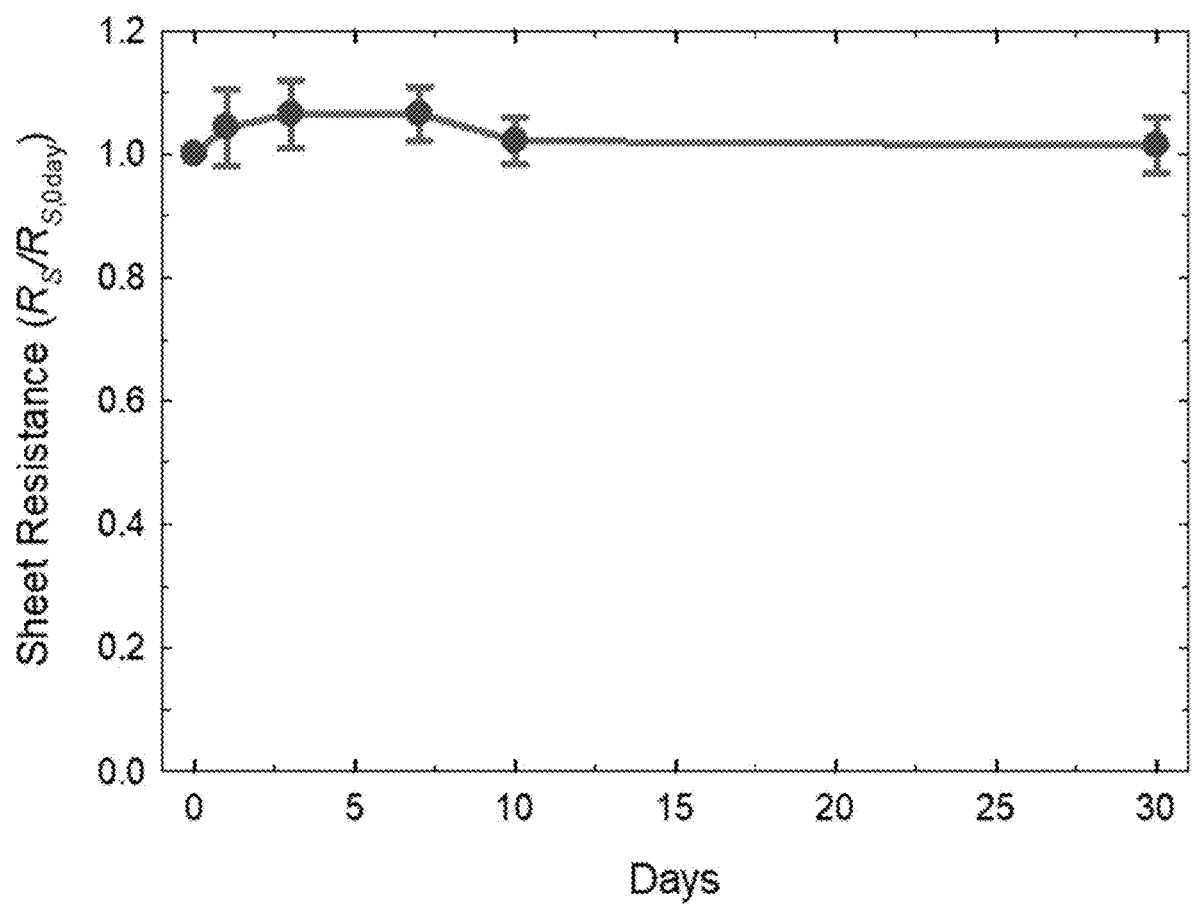
FIG. 17 illustrates the stability of electrical conductivity of S2E-TCFs.

Raman scattering also confirms that S2E-SWCNTs are not doped (FIG. 16). The doping states are studied by monitoring the Raman shift of the G peak. Three sets of samples are compared: Superacid-HiPco, pristine HiPco powder, and 52E-HiPco TCFs. SWCNTs in superacids are p-doped, which is reflected by the upshift of the G peak to ~1605 cm$^{-1}$ from ~1590 cm$^{-1}$ for the pristine HiPco powder. The G peak from S2E-HiPco TCFs also appears at ~1590 cm$^{-1}$, indicating that NaOH de-doped the SWCNTs and that there was no other dopant introduced into the S2E-SWCNT TCFs during the film fabrication process. The conductivities of the TCFs remained stable in air for over a month, which also consistently supports that the S2E-processed SWCNTs were not doped (FIG. 17). This result indicates that S2E nanotube TCFs would be ideal in applications such as flexible electronics, since doped films are not stable and tend to lose conductivity over time [Hecht, 2006].

Example 9

Chirality Sorting of S2E-SWCNTs

Separating SWCNTs by chirality is important for taking full advantage of the remarkable optical and electrical properties of these low dimensional materials, as well as to enable important fundamental studies [Hersam, 2008; DeVolder, 2013] Nearly all established separation techniques are based on aqueous solution processing methods [Hersam, 2008]. However, the cutting effects of ultrasonication and the limited scalability of ultracentrifugation have created major obstacles to obtaining long, chirality-pure SWCNTs at reasonably large quantities.

To demonstrate that our S2E dispersion method is compatible with established sorting techniques, we applied aqueous two phase (ATP) separation, a highly scalable solution-based sorting technique [Subbaiyan, 2014] to S2E processed nanotubes. In ATP, SWCNTs spontaneously partition into two immiscible aqueous phases depending on their structures, resulting in the isolation of single chirality SWCNTs [Khirpin, 2013; Subbaiyan, 2014] Although ATP has been successfully used to purify single chiralities from a SWCNT mixture, the sorted nanotubes are typically short (<500 nm) due to the need for sonication in order to prepare the starting aqueous solution of individually dispersed nanotubes. Applying ATP separation to S2E dispersed nanotubes is straightforward since the aqueous S2E-SWCNT solution can be directly used as a starting material for the separation method.

An ATP separation method [Subbaiyan, 2015] was used to isolate (6,5)-SWCNTs from S2E- and sonic-SWCNT samples. Three major sources of SWCNTs, including HiPco, CoMoCAT SG76, and CoMoCAT SG65i, were used in this experiment to demonstrate the general compatibility of S2E as starting materials for ATP separations. Because ATP separation is sensitive to the surfactant type and pH of the solution, CTAB was removed by centrifugal ultrafiltration (Amicon Ultra-15, PLHK Ultracel-PL Membrane, 100 kDa) and adjusting the pH to ~8.

Figure 18A:
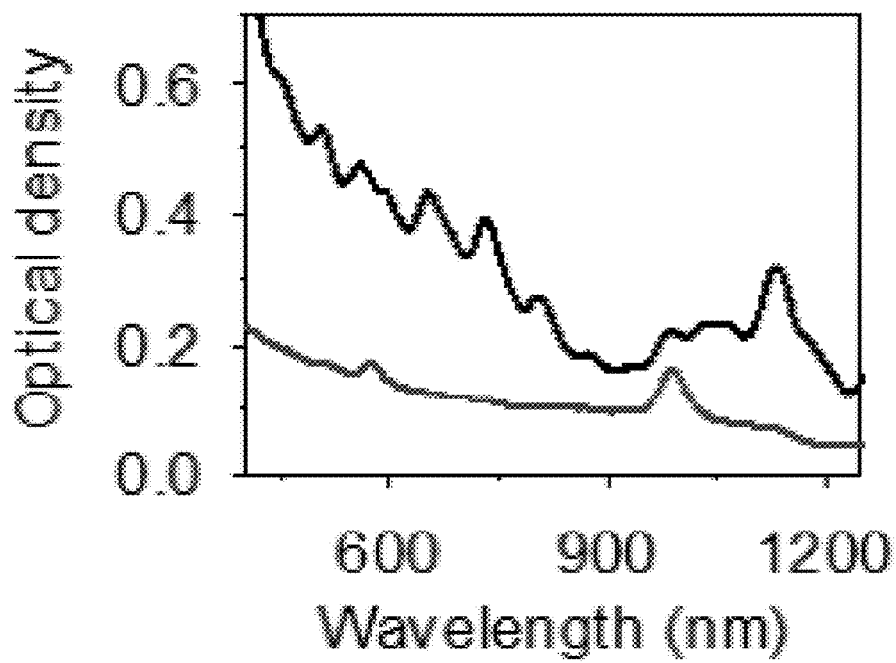
FIGS. 18A-18G illustrate bright NIR PL from long, single chirality-pure (6,5)-SWCNTs sorted from S2E-SWCNTs and sonic-SWCNTs.
Figure 18B:
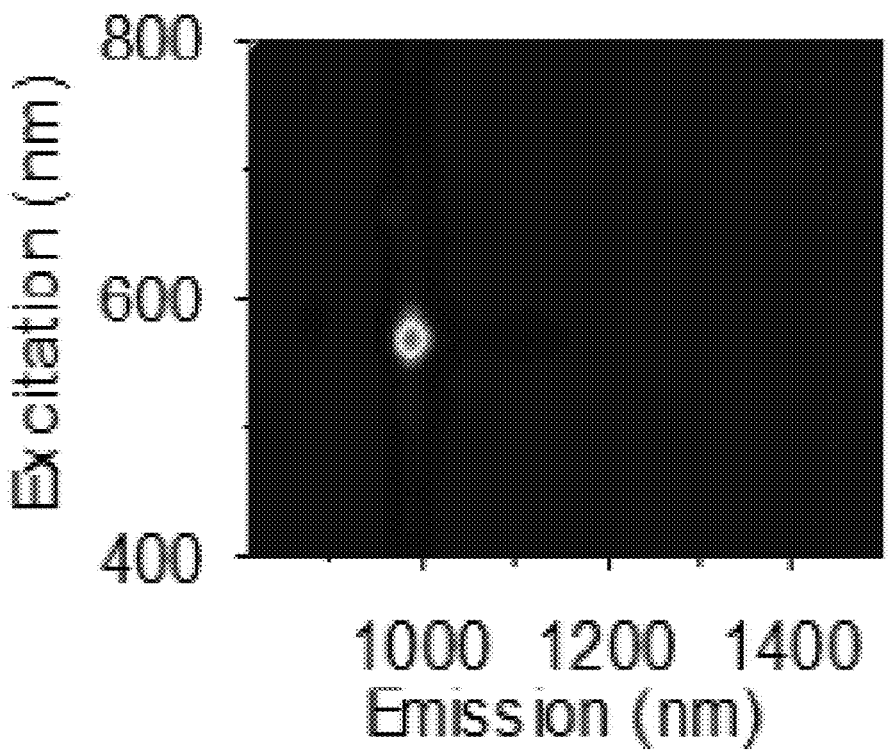
Figure 18C:
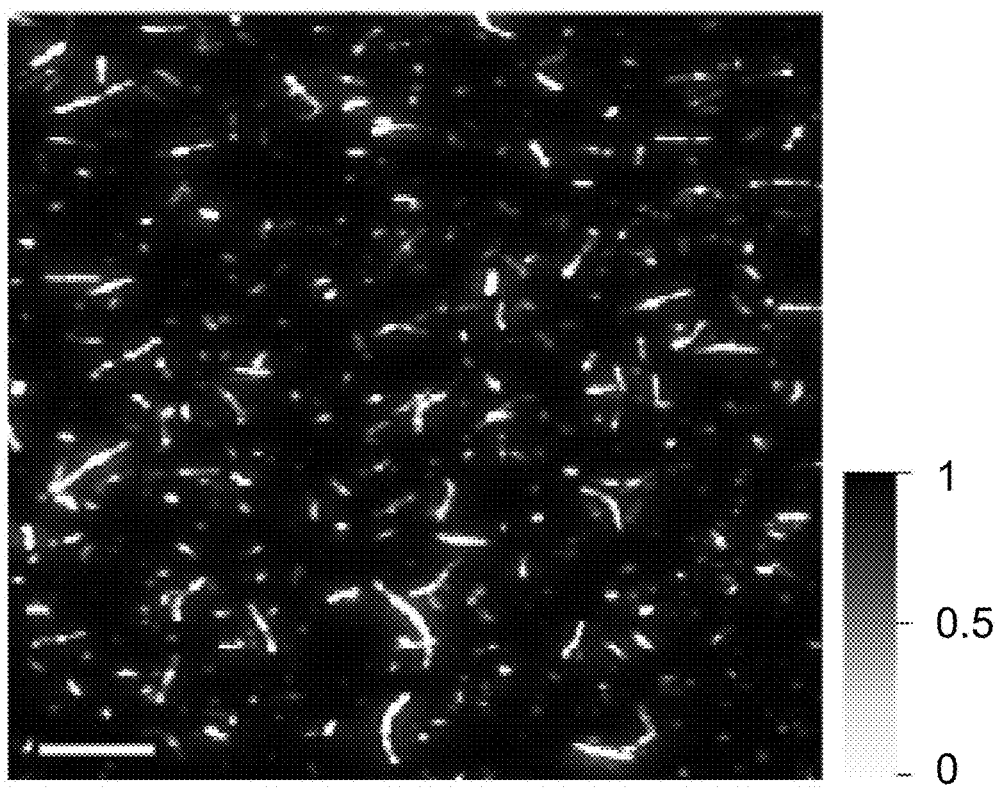

FIG. 18A shows the UV-Vis-NIR absorption spectra of (6,5)-SWCNT sorted from S2E-SWCNT solutions of HiPco materials that initially contained an assortment of different chiralities. The successful separation is clearly evident by the sharp absorption peaks characteristic of the (6,5) chirality, including its first (E11 at 987 nm) and second (E22 at 571 nm) optical transitions. Consistently, the PL map (FIG. 18B) also presents a single excitation-emission feature of (6,5)-SWCNT, in stark contrast with the map for the starting mixture (FIG. 1B), thus unambiguously confirming the separation of a single chirality from the heterogeneous starting material.

Figure 19A:
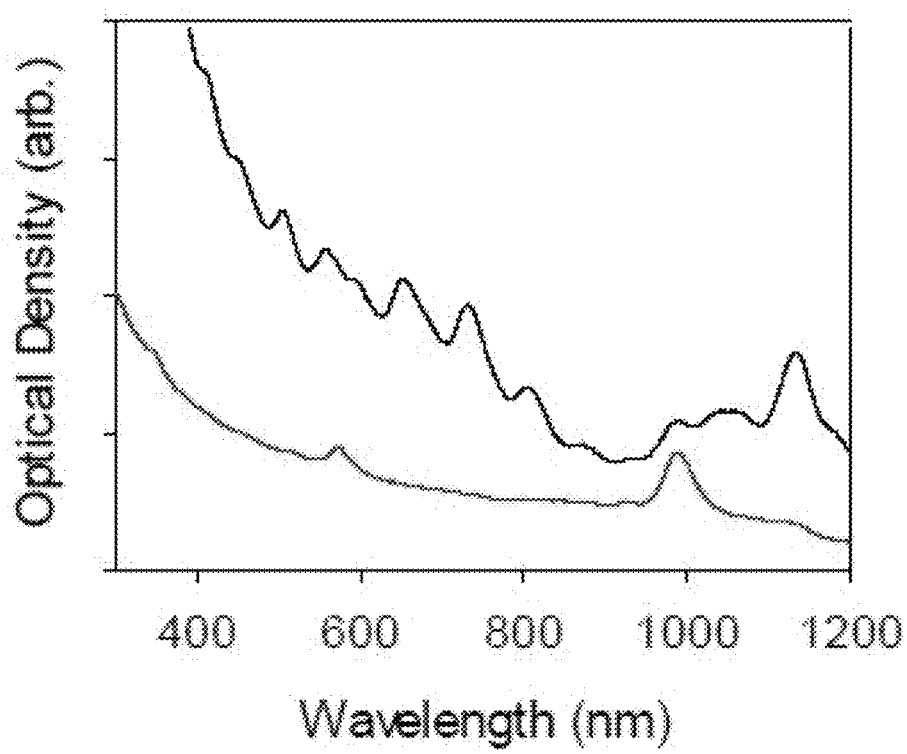
FIGS. 19A-C illustrate (6,5)-SWCNT purification by ATP separation of S2E-SWCNTs. UV-Vis-NIR absorption spectra before (black) and after (gray) ATP separation are illustrated. The S2E-SWCNTs prepared from HiPco, CoMoCAT SG65i, and CoMoCAT SG76 SWCNTs are shown in FIGS. 19A, 19B and 19C, respectively.
Figure 19B:
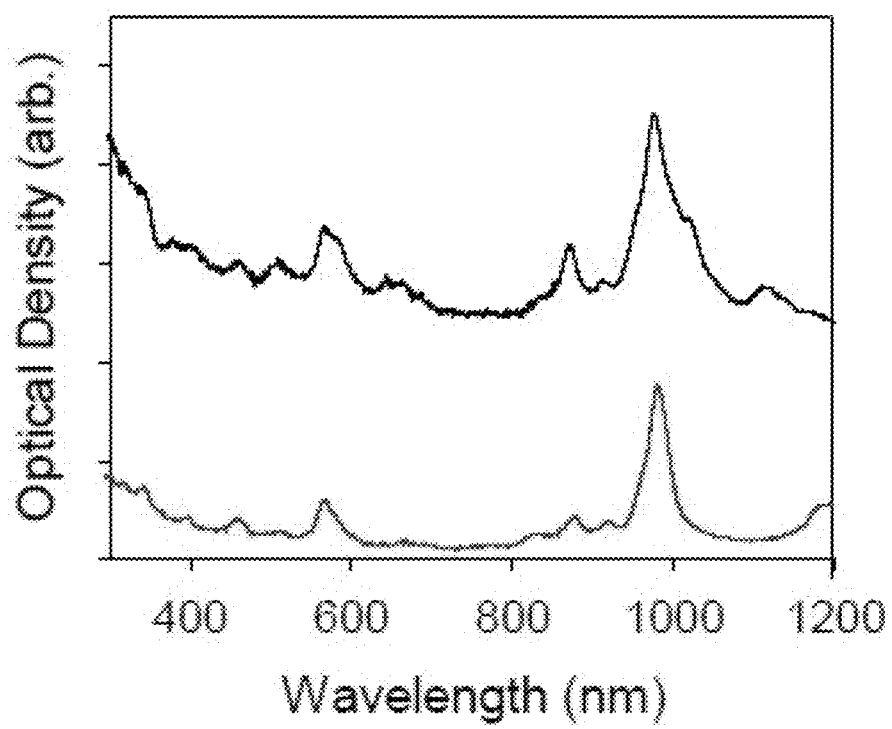
Figure 19C:
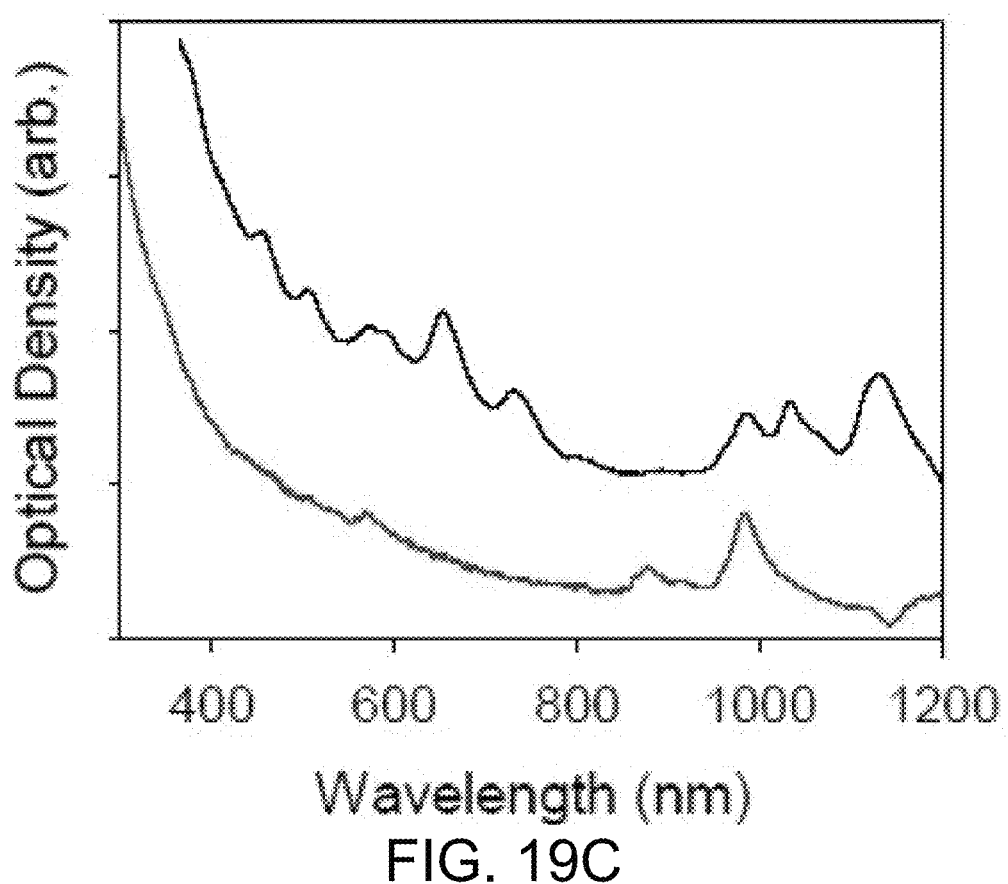

ATP aqueous processing compatibility was also demonstrated for various SWCNT sources (FIGS. 19A-C).

Figure 18D:
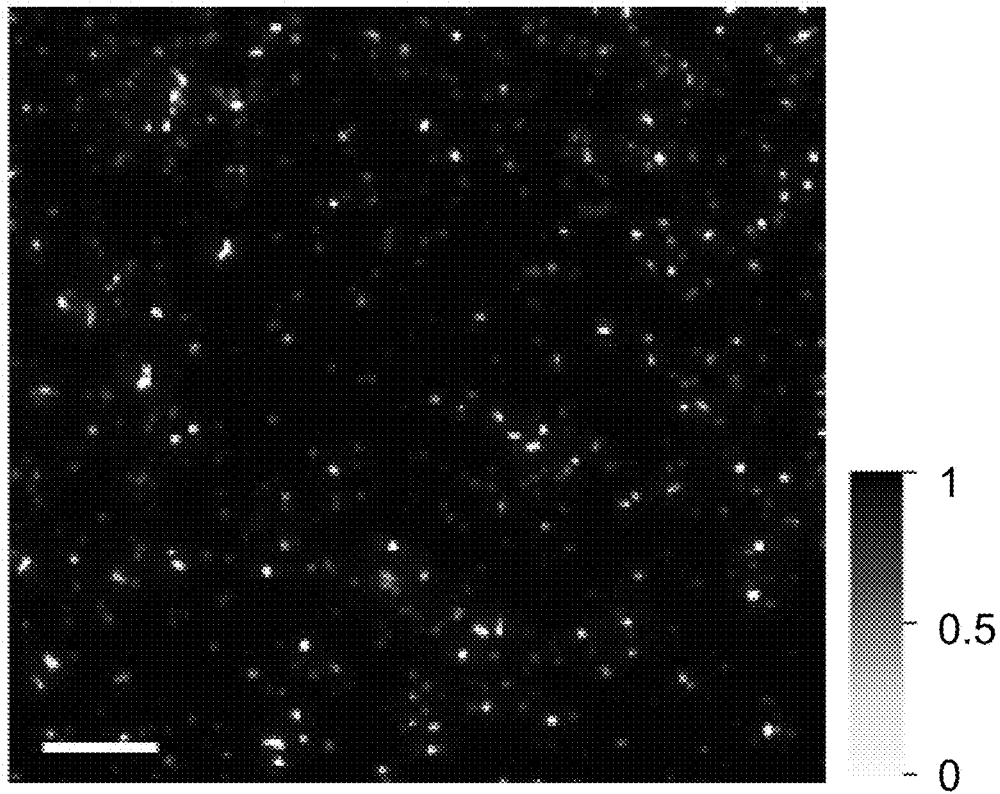
Figure 18E:
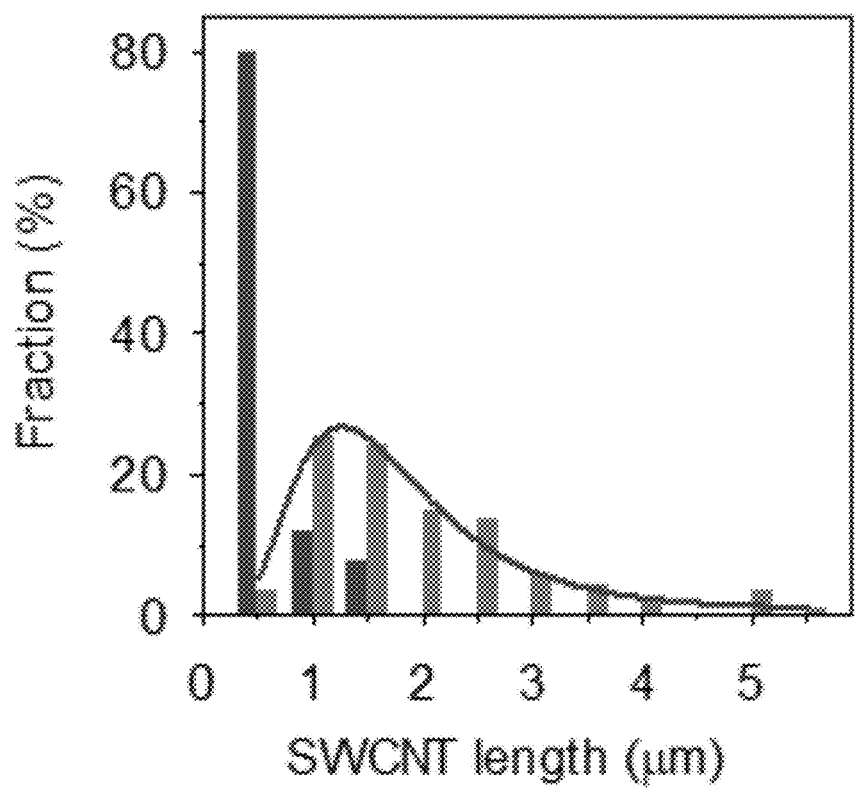
Figure 18F:
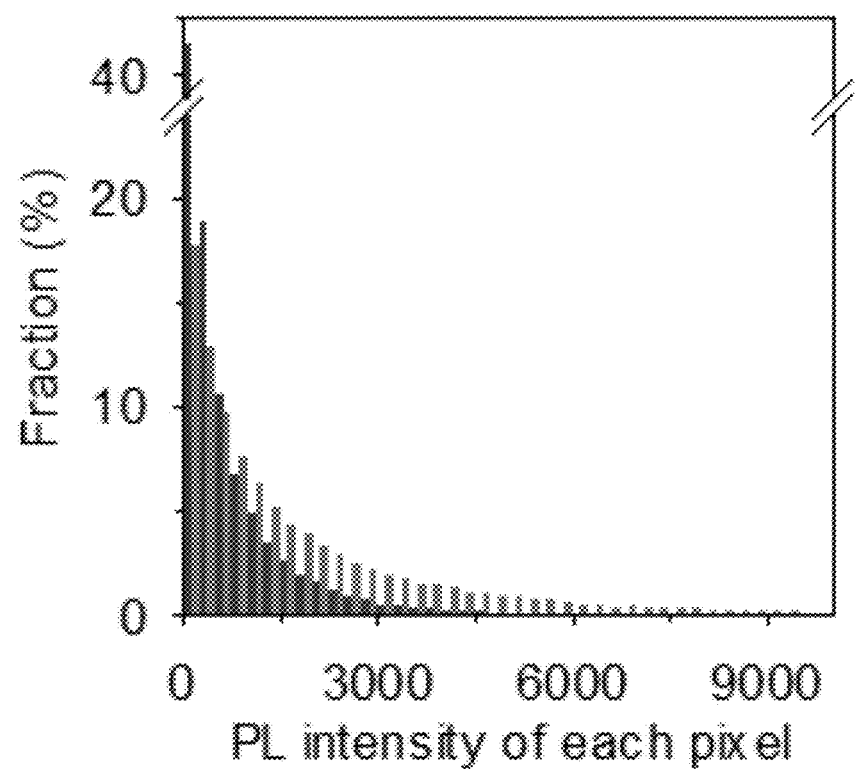
Figure 20:
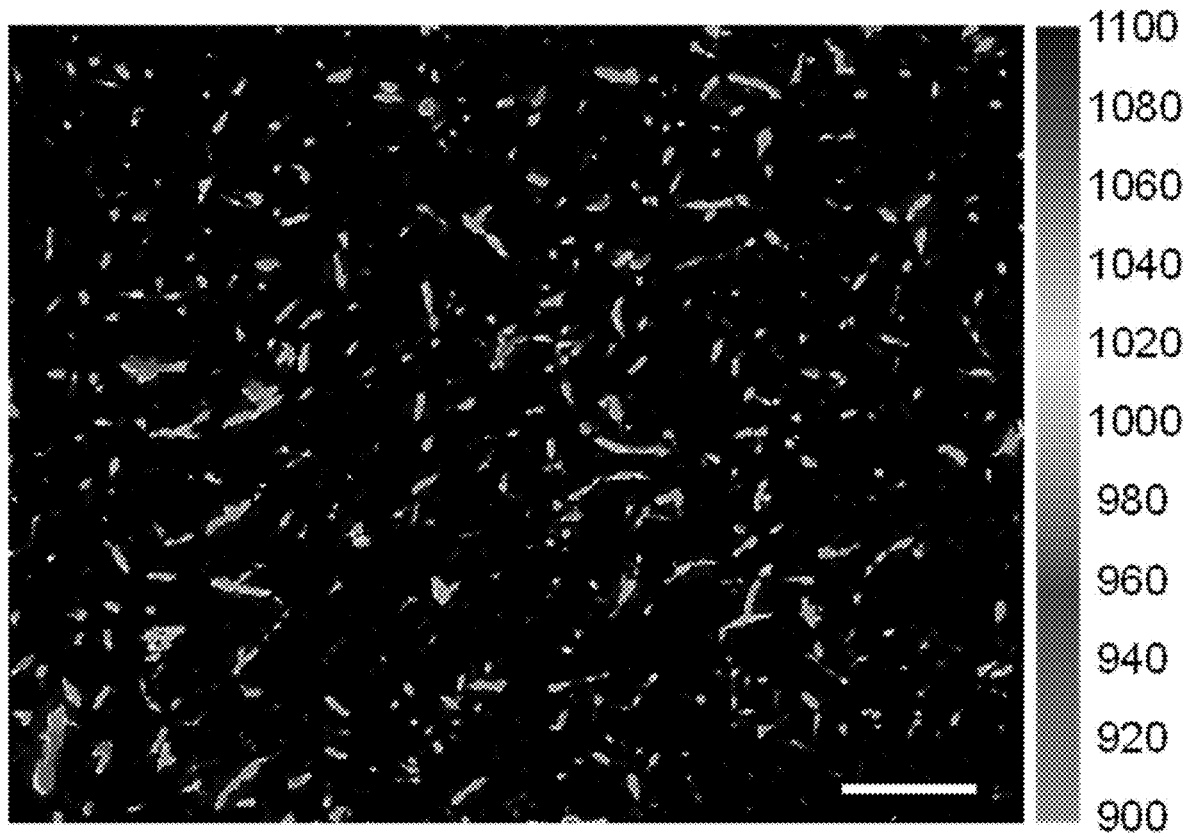
FIG. 20 illustrates a PL image of (6,5)-enriched S2E-SWCNTs. Each SWCNT is colored by the wavelength of the maximum PL intensity from Lorentzian fittings of the emission spectra. The color bar indicates the center wavelength (nm) of PL emission. (6,5)-SWCNTs were identified by the PL emission at 988 nm, which corresponds to the E11 transition of the (6,5) chirality, and pseudo-colored within the broadband (900-1600 nm) PL image. Scale bar is 10 μm.
Figure 21A:
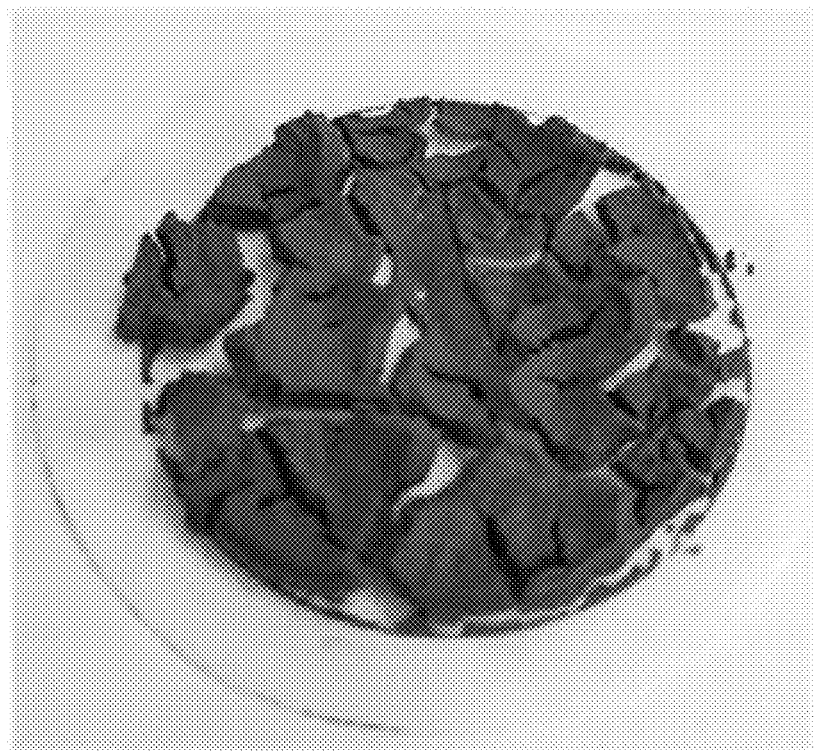
Figure 21B:
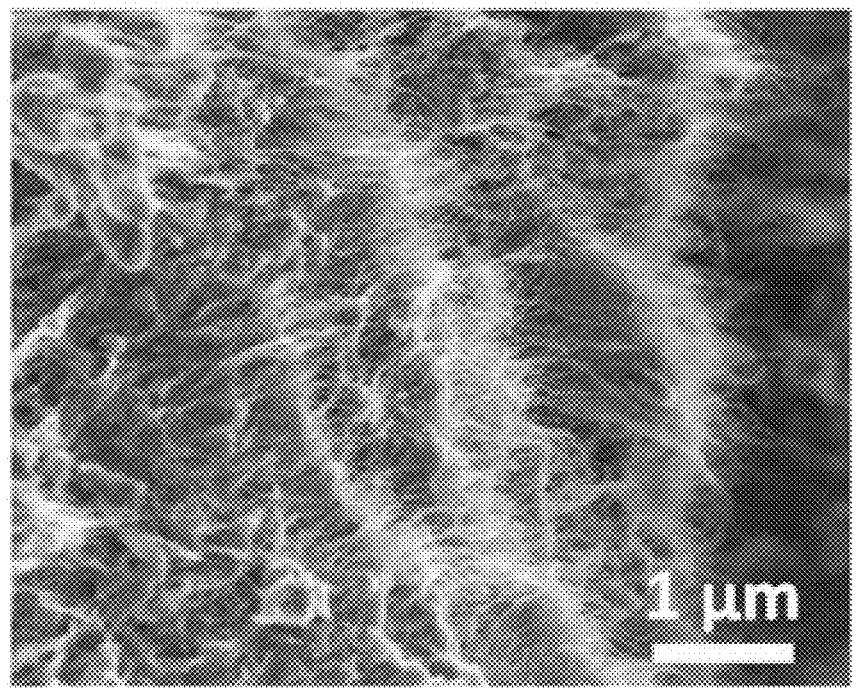
Figure 21C:
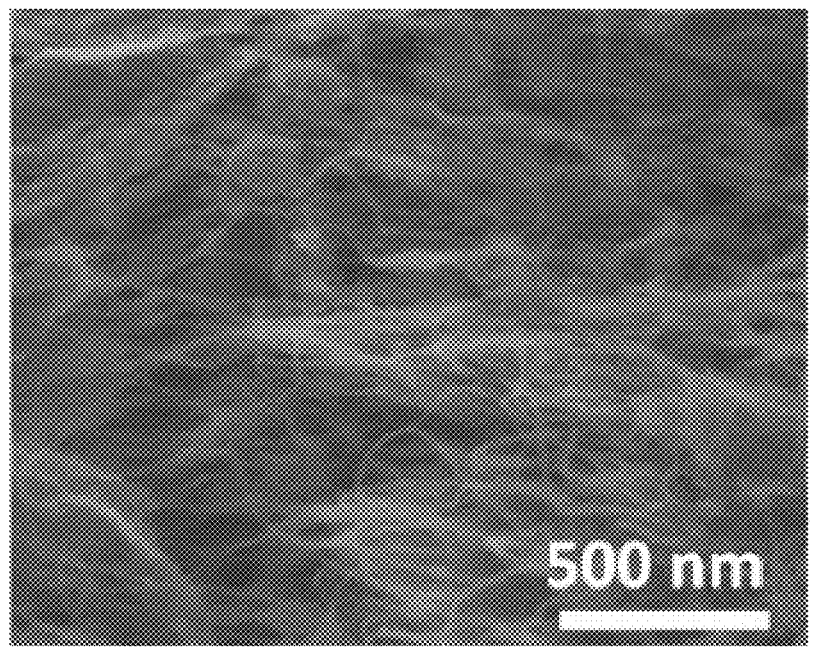
Figure 21D:
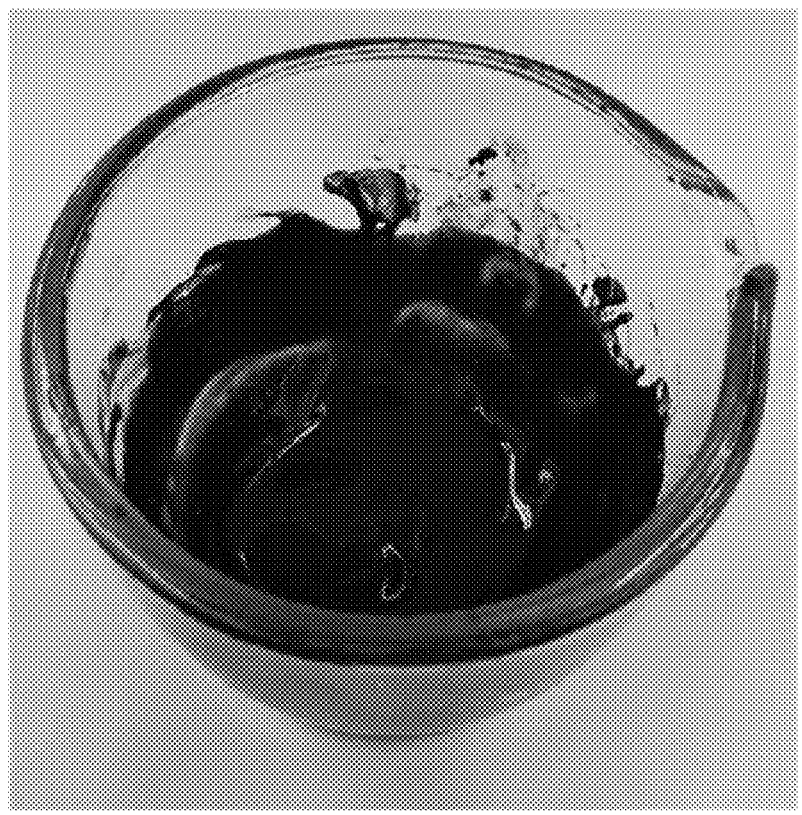
Figure 22:
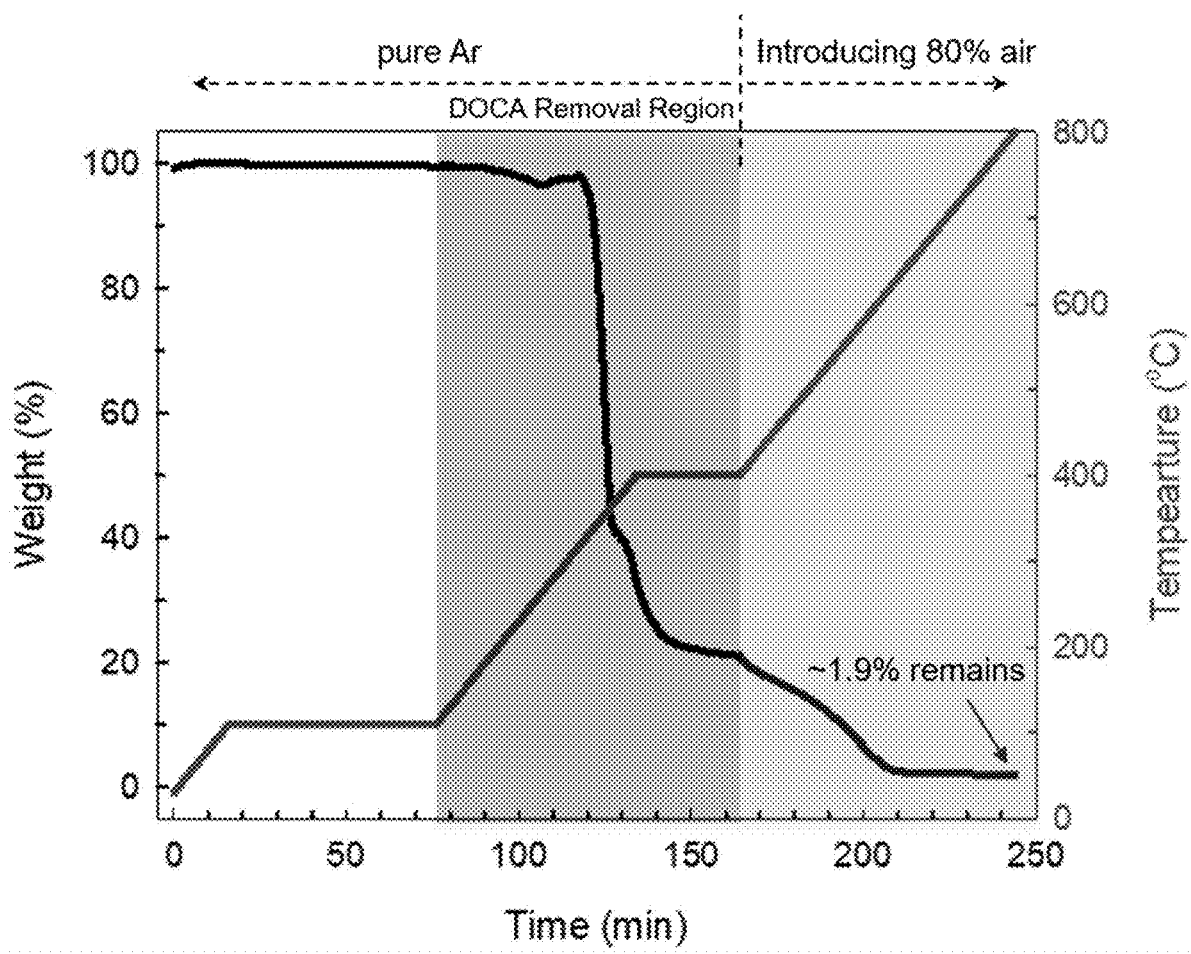
FIG. 22 illustrates TGA analysis of SWCNTs ink. After the thermal annealing process, only ~1.9% of the initial weight is left as residue, after the high temperature annealing process, demonstrating the "clean" nature of the SWCNTs ink.

NIR PL of the S2E-SWCNTs was significantly brighter than those of the sonication control. Using PL imaging, the fluorescence could be quantitatively analyzed at the individual particle level [Roxbury, 2015]. In FIGS. 18D and 18EE, the NIR PL images of S2E (6,5)-SWCNTs are compared to those of the sonic (6,5)-SWCNT control, which is also sorted to pure single chirality via ATP the same protocol. Although the absorption spectra for the sorted S2E-SWCNTs and the sonicated control are nearly identical, the individually resolved fluorescent nanotubes exhibit significant differences in both length distribution and PL intensity. More than 50% of the fluorescent nanotubes from the sonication control were shorter than the spatial resolution of our microscope (0.56 µm) and therefore displayed as "dots" in the image. In contrast, 80% of the S2E-SWCNTs can be spatially resolved to reveal their lengths, which ranged from 0.6 µm to 7.44 µm in consistence with AFM measurements (FIG. 18E). Over a large spectral range (900-1600 nm), 93.5% of the fluorescent S2E-nanotubes (out of 200 counts) emitted at 988 nm (FIG. 20), which is the E11 emission of (6,5)-SWCNT. Their PL intensities were also brighter than the sonicated control (FIG. 18F).

Figure 18G:
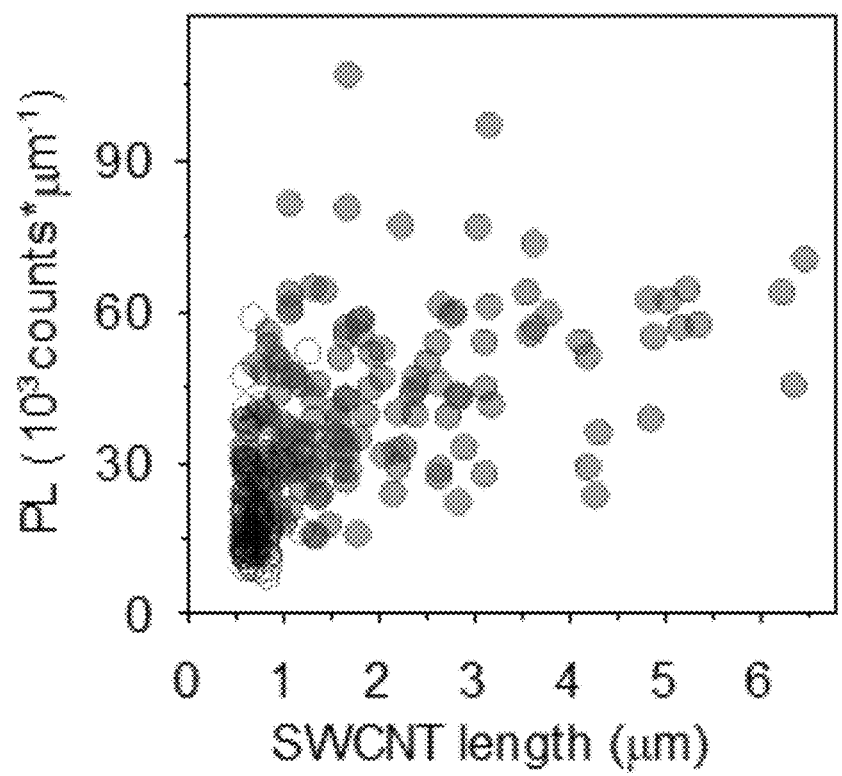

PL down the length of these S2E-SWCNTs is homogeneous, both in terms of emission wavelength and intensity, which excludes the existence of quenching sites. Since the exciton diffusion length at room temperature is significantly lower than 500 nm in defect-free nanotubes [Cognet, 2007], the PL intensity is not expected to vary significantly along the length of SWCNTs that are longer than the diffraction limit. However, a correlation between the PL intensity per unit length and the length in the S2E (6,5)-SWCNTs (FIG. 18G) is observed. For longer SWCNTs (>1.2 µm), the average PL intensity per unit length is 96% brighter than that of the sonicated control. Even for those nanotubes within the same length range (0.6-1.2 µm), S2E nanotubes were still 45% brighter than the sonication control. This intensity difference indicates that in addition to cutting, ultrasonication also introduces quenching defects, which cause excitons to decay non-radiatively. Eliminating the need for sonication, as made possible through S2E, avoids cutting nanotubes and the introduction of structural defects, opening the possibility of scaled solution processing of long, chirality pure, individual SWCNTs that are largely free of defects.

Example 10

Preparation of Carbon Nanomaterial Clays

The S2E can also be performed at a lower DOC concentration, which benefits the SWCNTs dispersion efficiency and can improve materials processing. Dispersion efficiency is the ratio of the amount of individually dispersed SWCNTs in aqueous solution after S2E to the amount of individually SWCNTs in superacid. The SWCNT/CSA solution is added dropwise to an aqueous solution of 0.75 M NaOH and ~0.08 wt/v % DOC with vigorous stirring until the pH decreases to ~8. The solution is stirred until the pH stabilizes (~1 hr). A few drops of HCl (1 M) are then added to the solution to adjust the pH to ~6 (below the pKa of deoxycholic acid), such that the DOC molecules are protonated and coagulate along with the SWCNTs into a grey/black precipitate. The precipitates (of carbon nanomaterial/steroid acid salt) are designated carbon nanomaterial clays (more specifically for SWCNTs, SWCNT clays) are collected on a 47 mm sized polyvinylidene fluoride filtration membrane.

SWCNT-clays are mixed with selected amounts of water and a few drops of NaOH (1 M) is added to adjust the pH back to ~8 to return to the black SWCNTs aqueous dispersion. The resulting solution is then stirred for 1-3 day and centrifuged at 23264 g. A portion of the top solution (top ~70% volume) is collected for further characterizations and applications.

Example 11

Formulating the SWCNTs Ink

Formulation of highly conductive ink composed of SWCNTs is important for large-scale printing techniques.

The use of water-based ink is preferable due to its environmental-friendly natures. However, low viscosity of aqueous SWCNTs solutions present difficulties for printing. To solve such problems, addition of binders (such as polymers) is used to increase the solution viscosity. However, polymer residues are generally electrically insulating and difficult to remove after the printing, reducing the overall conductivity of printed features. SWCNT-clays obtained from S2E long tubes can form "binder free" SWCNTs inks by simply tuning the pH values around ~6.7 for DOC (around the pKa value of the surfactant molecules). When the pH is about the pKa of deoxycholic acid, deoxycholate exhibits SWCNTs polymer-like rheological and viscoelastic properties and processability. The viscosity of the ink can be adjusted by adjusting the pH around the pKa of the surfactant.

As the concentration of SWCNTs increases, a continuous transition from a dilute SWCNTs dilution dispersion to a SWCNTs paste (SWCNTs ink, FIG. 20D) is observed. More significantly, the viscosity of such SWCNTs can be easily tuned by changing the overall pH of the ink around the pKa of the steroid acid surfactant. These SWCNTs inks are immediate usable for printings. FIGS. 20E and 20F show a Chinese character we printed using the formulated ink. SEM image (FIG. 20G) indicates that after printing, the ink is composed of continuous SWCNTs percolative networks, which can render high electrical conductivity for various application such as printable electronics. It is also important to note that in this SWCNTs ink formulation, the deoxycholate acid and ammonium deoxycholate are the only additives. There two compounds can be totally removed by post-printing thermal annealing treatment (FIG. 21), leaving the resulting composite made by pure SWCNTs. SWCNT-clays (60 mg, with mass ratio of SWCNTs to DOC of 1:2) are mixed with ~1.9 mg nanopure water and ~0.1 mL 30% wt % ammonium hydroxide solution. The resulting mixtures are ground for 1 min with a mortar with a pestle to form a SWCNTs ink. The viscosity of the formulated SWCNTs ink can be easily tuned by adjusting the pH value of the ink.

TGA analysis is used to further analyze the chemical composition of the SWCNTs ink. The TGA thermal curve was collected at a heating rate of 5° C./min under an atmosphere of Ar (flow rate 50 sccm) over a temperature range of 50° C.-100° C. The sample was kept at 100° C. (~1 hr) to totally remove absorbed water on the ink until the weight of the sample is stable. The temperature of the sample was then increased to 400° C. (at a rate of 5° C./min) and maintained at this temperature (~0.5 h) until mass loss ends, indicating the total removal of deoxycholate acid and ammonium deoxycholate. The sample temperature is then raised to 800° C. (at a rate of 5° C./min) and a flow of 80% of air (flow rate 100 sccm) is added to burn the remaining SWCNTs. The final weight of the residue after the TGA process is ~1.9%.

REFERENCES

Arnold, M. S., Green, A. A., Hulvat, J. F., Stupp, S. I. & Hersam, M. C. Sorting carbon nanotubes by electronic structure using density differentiation. *Nat. Nanotech.* 1, 60-65 (2006).

Behabtu, N. et al. Strong, Light, Multifunctional Fibers of Carbon Nanotubes with Ultrahigh Conductivity. *Science* 339, 182 (2013).

Choi, H.; Woo, J. S.; Han, J. T.; Park, S-Y. Fabrication of water-dispersible single-walled carbon nanotube powder using N-methylmorpholine N-oxide. *Nanotechnology* 28, 465706 (2017).

Cognet, L. et al. Stepwise quenching of exciton fluorescence in carbon nanotubes by single-molecule reactions. *Science* 316, 1465-1468 (2007).

Davis, V. A. et al. Phase Behavior and Rheology of SWNTs in Superacids. *Macromolecules* 37, 154-160 (2004).

Davis, V. A. et al. True solutions of single-walled carbon nanotubes for assembly into macroscopic materials. *Nat. Nanotech.* 4, 830-834 (2009).

De Volder, M. F. L., Tawfick, S. H., Baughman, R. H. & Hart, A. J. Carbon nanotubes: Present and future commercial applications. *Science* 339, 535 (2013).

Dyke, C. A. & Tour, J. M. Overcoming the insolubility of carbon nanotubes through high degrees of sidewall functionalization. *Chem. Eur. J.* 10, 812-817 (2004).

Ewels C. P.; Glerup, M. J. *Nanosci. Nanotech.* (2005) 5(9), 1345 (2005).

Fagan, J. A. Aqueous two-polymer phase extraction of single-wall carbon nanotubes using surfactants. *Nanoscale Advances* (2019) DOI: 10.1039/c9na00280d.

Fagan, J. A.; Khripin, C. Y.; Silvera Batista, C. A.; Simpson, J. R.; Hároz, E. H.; Hight Walker, A. R.; Zheng, M., Isolation of Specific Small-Diameter Single-Wall Carbon Nanotube Species via Aqueous Two-Phase Extraction. *Advanced Materials* 26, 2800 (2014).

Fagan, J. A.; Hároz, E. H.; Ihly R.; Gui, H.; Blackburn, J. L.; Simpson, J. R.; Lam, S.; Hight Walker, A. R.; Doorn, S. K.; Zheng, M. Isolation of >1 nm Diameter Single-Wall Carbon Nanotubes Species Using Aqueous Two-Phase Extraction. *ACS Nano* 9, 5377 (2105).

Gao, Z. et al. Optical detection of individual ultra-short carbon nanotubes enables their length characterization down to 10 nm. *Sci. Rep.* 5, 17093 (2015).

Geng, H.-Z. et al. Effect of acid treatment on carbon nanotube-based flexible transparent conducting films. *J. Am. Chem. Soc.* 129, 7758-7759 (2007).

Girifalco, L. A., Hodak, M. & Lee, R. S. Carbon nanotubes, buckyballs, ropes, and a universal graphitic potential. *Phys. Rev. B* 62, 13104-13110 (2000).

Graf, A. et al. Large scale, selective dispersion of long single-walled carbon nanotubes with high photoluminescence quantum yield by shear force mixing. *Carbon* 105, 593-599 (2016).

Gui, H.; Streit, J. K.; Fagan, J. A.; Hight Walker, A. R.; Zhou, C.; Zheng, M. *Nano Lett.* 15, 1642 (2015).

Haggenmueller, R. et al. Comparison of the quality of aqueous dispersions of single wall carbon nanotubes using surfactants and biomolecules. *Langmuir* 24, 5070-5078 (2008).

Harrah, D. M. & Swan, A. K. The Role of Length and Defects on Optical Quantum Efficiency and Exciton Decay Dynamics in Single-Walled Carbon Nanotubes. *ACS Nano* 5, 647-655 (2011).

Hecht, D., Hu, L. & Grüner, G. Conductivity scaling with bundle length and diameter in single walled carbon nanotube networks. *Appl. Phys. Lett.* 89, 133112 (2006).

Hecht, D. S., Hu, L. & Irvin, G. Emerging transparent electrodes based on thin films of carbon nanotubes, graphene, and metallic nanostructures. *Adv. Mater.* 23, 1482-1513 (2011).

Hernandez, Y. et al. High-yield production of graphene by liquid-phase exfoliation of graphite *Nat. Nanotechnology* 3, 567 (2008).

Hersam, M. C. Progress towards monodisperse single-walled carbon nanotubes. *Nat. Nanotech.* 3, 387-394 (2008).

Hofmann, A. F.; Hagey, L. R.; Krasowski, M. D. Bile salts of vertebrates: structural variation and possible evolutionary significance. *J. Lipid Res.* 51, 226 (2010).

Hong, G., Diao, S., Antaris, A. L. & Dai, H. Carbon Nanomaterials for Biological Imaging and Nanomedicinal Therapy. *Chem. Rev.* 115, 10816-10906 (2015).

Kang, S. B.; Lim, J. W.; Lee, S.; Kim, J. J.; Kim, H. K. Transparent Indium Oxide Films Doped with High Lewis Acid Strength Ge Dopant for Phosphorescent Organic Light-emitting Diodes. *J. Phys. Chem. D: Appl. Phys.*, 45, 325102 (2012)

Khripin, C. Y., Fagan, J. A. & Zheng, M. Spontaneous partition of carbon nanotubes in polymer-modified aqueous phases. *J. Am. Chem. Soc.* 135, 6822-6825 (2013).

Landry, M. P. et al. Single-molecule detection of protein efflux from microorganisms using fluorescent single-walled carbon nanotube sensor arrays. *Nat. Nanotech.* 12, 368-377 (2017).

Li, D.; Muller, M. B.; Gilje, S.; Kaner, R. B.; Wallace, G G. Processable aqueous dispersions of graphene nanosheets. *Nat. Nanotechnology* 3, 10 (2008).

Lotya, M. et al. Liquid Phase Production of Graphene by Exfoliation of Graphite in Surfactant/Water Solutions. *J. Am. Chem. Soc.* 131, 3611-3620 (2009).

Lu, K. L. et al. Mechanical damage of carbon nanotubes by ultrasound. *Carbon* 34, 814-816 (1996).

Mirri, F. et al. High-performance carbon nanotube transparent conductive films by scalable dip coating. *ACS Nano* 6, 9737-9744 (2012).

Miyata, Y. et al. Solution-phase extraction of ultrathin inner shells from double-wall carbon nanotubes. *ACS Nano* 4, 5807-5812 (2010).

O'Connell, M. J. et al. Band gap fluorescence from individual single-walled carbon nanotubes. *Science* 297, 593 (2002).

Parra-Vasquez, A. N. G. et al. Spontaneous dissolution of ultralong single- and multiwalled carbon nanotubes. *ACS Nano* 4, 3969-3978 (2010).

Pénicaud A, Poulin P, DerréA, Anglaret E, Petit P. Spontaneous Dissolution of a Single-Wall Carbon Nanotube Salt. *J. Am. Chem. Soc.* 2005; 127:8-9.

Roxbury, D. et al. Hyperspectral microscopy of near-infrared fluorescence enables 17-chirality carbon nanotube imaging. *Sci. Rep.* 5, 14167 (2015).

Shin, W. H., et al. *Nano Letters* 12(5):2283-2288 (2012).

Subbaiyan, N. K. et al. Bench-top aqueous two-phase extraction of isolated individual single-walled carbon nanotubes. *Nano Res.* 8, 1755-1769 (2015).

Subbaiyan, N. K. et al. Role of surfactants and salt in aqueous two-phase separation of carbon nanotubes toward simple chirality isolation. *ACS Nano* 8, 1619-1628 (2014).

Tabakman, S. M., Welsher, K., Hong, G. & Dai, H. Optical properties of single-walled carbon nanotubes separated in a density gradient: Length, bundling, and aromatic stacking effects. *J. Phys. Chem. C* 114, 19569-19575 (2010).

Tu, X., Manohar, S., Jagota, A. & Zheng, M. DNA sequence motifs for structure-specific recognition and separation of carbon nanotubes. *Nature* (London, United Kingdom) 460, 250-253 (2009).

Wang, P.; Kim, M.; Peng, Z.; Sun, C-F.; Mok, J.; Lieberman, A.; Wang, Y. Superacid-Surfactant Exchange: Enabling Nondestructibe Dispersion of Full-Length Carbon nanotubes in Water. *ACS Nano* 11(9), 9231 (2017) and supporting information available on ACS Publications website at DOI: 10.1021/acsnano.7b04429.

Wang, P.; Peng, Z.; Li, M.; Wang, Y. Stretchable Transparent Conductive Films from Long Carbon Nanotube Metals. *Small* 1802625 (2018).

Wenseleers, W.; Vlasov, I. I.; Goovaerts, E.; Obraztsova, E. D.; Lobach, A. S.; Bouwen, A. Efficient Isolation and Solubilization of Pristine Single-Walled nanotubes in Bile Salt Micelles. *Advanced Functional Materials* 2004, 14(11), 1105 (2004).

Wu, Z. et al. Transparent, conductive carbon nanotube films. *Science* 305, 1273-1277 (2004).

Zhai, Z. et al. Reversible dispersion and precipitation of single-walled carbon nanotubes using a pH-responsive rigid surfactant. *Chem. Commun.* 2018, 54, 12171 (2018).

Zhang, M.; Khripin, C. Y.; Fagan, J. A.; McPhie, P.; Ito, Y.; Zheng, M. Single-Step Total fractionation of Single-Wall Carbon Nanotubes by Countercurrent Chromatography. *Analytical Chemistry* 86, 3980 (2014).

What is claimed is:

1. A method for dispersion of carbon nanomaterials in an aqueous solution which comprises:
    adding carbon nanomaterials that are dissolved in a superacid into a basic aqueous solution containing a steroid acid surfactant such that the carbon nanomaterials are individually dispersed in the aqueous solution to form an aqueous dispersion of the carbon nanomaterials.

2. The method of claim 1, wherein the steroid acid surfactant is selected from the group consisting of a salt of cholate, a salt of deoxycholate, a salt of chenodeoxycholate, a salt of ursodeoxycholate, a salt of lithocholate, a salt of obeticholate, a salt of a taurine conjugate of cholate, a salt of a taurine conjugate of deoxycholate, a salt of a taurine conjugate of chenodeoxycholate, a salt of a taurine conjugate of ursodeoxycholate, a salt of a taurine conjugate of lithocholate, a salt of a taurine conjugate of obeticholate, a salt of a glycine conjugate of cholate, a salt of a glycine conjugate of deoxycholate, a salt of a glycine conjugate of chenodeoxycholate, a salt of a glycine conjugate of ursodoxycholate, a salt of a glycine conjugate of lithocholate, a salt of a glycine conjugate of obeticholate, and any mixtures thereof.

3. The method of claim 2, wherein the steroid acid surfactant is a sodium salt.

4. The method of claim 2, wherein the steroid acid surfactant is an ammonium salt.

5. The method of claim 1, wherein the steroid acid surfactant is sodium cholate, sodium deoxycholate or a mixture thereof.

6. The method of claim 1, wherein the carbon nanomaterials are single-walled carbon nanotubes, double-walled carbon nanotubes, multi-walled carbon nanotubes, graphite, graphite oxide or graphene nanoribbons.

7. The method of claim 1, wherein the carbon nanomaterials are organic-color-center-tailored carbon nanotubes or N-doped carbon nanotubes.

8. The method of claim 1, wherein the carbon nanomaterials are single-walled carbon nanotubes and the steroid acid surfactant is sodium deoxycholate.

9. The method of claim 1, wherein the carbon nanomaterials are graphite, the steroid acid surfactant is sodium cholate and the aqueous dispersion comprises graphene.

10. The method of claim 1, wherein concentration of steroid acid surfactant in the basic aqueous solution ranges from 0.01 wt/v % to 2 wt/v %.

11. The method of claim 1, wherein the superacid, in which the carbon nanomaterials are dissolved, is added to the basic aqueous solution until the pH of the mixture resulting from the addition ranges from a pKa of the steroid acid of the steroid acid surfactant to pH 13.0.

12. The method of claim 1, wherein the steroid acid surfactant is a salt of deoxycholic acid and the superacid, in which the carbon nanomaterials are dissolved, is added to the basic aqueous solution until pH of the mixture resulting from the addition ranges from about pH 6.5 to pH 13, such that the salt of deoxycholic acid is soluble in the mixture resulting from the addition.

13. The method of claim 1, wherein single-walled carbon nanotubes are dispersed and the single-walled carbon nanotubes dispersed in aqueous solution have average length of 1-5 microns.

14. The method of claim 1, wherein single-walled carbon nanotubes are dispersed and the single-walled carbon nanotubes dispersed in aqueous solution have average length of 5 microns or longer.

15. The method of claim 1, wherein the superacid is chlorosulfonic acid.

16. The method of claim 1, further comprising adding a second surfactant, other than a steroid acid surfactant, to the aqueous dispersion of carbon nanomaterials to cause phase separation.

17. The method of claim 16, wherein the second surfactant is a cationic surfactant, or an anionic surfactant.

18. The method of claim 1, wherein the carbon nanomaterials are dispersed without use of destructive sonication, or ultrasonication which increases defects in the carbon nanomaterials.

19. The method of claim 1, wherein the addition of carbon nanomaterials dissolved in superacid into the basic aqueous solution and dispersion of carbon nanomaterials in aqueous solution is performed at room temperature.

20. The method of claim 1, which comprises:
adding the carbon nanomaterials that are dissolved in the superacid, into the basic aqueous solution containing a steroid acid surfactant to form a first aqueous solution comprising surfactant-encapsulated carbon nanomaterials;
adjusting pH of the first aqueous solution to a lower pH to precipitate surfactant-encapsulated carbon nanomaterials out of the first aqueous solution;
separating the first aqueous solution from the precipitated surfactant-encapsulated carbon nanomaterials; and
adding a second aqueous solution having increased pH compared to the adjusted pH of the first aqueous solution to the precipitated surfactant-encapsulated nanomaterials to redisperse the carbon nanomaterials in the second aqueous solution.

21. A method for dispersion of carbon nanomaterials in aqueous solution consisting essentially of:
adding carbon nanomaterials that are dissolved in a superacid into a basic aqueous solution containing a steroid acid surfactant such that the carbon nanomaterials are individually dispersed in aqueous solution to form an aqueous dispersion of the carbon nanomaterials.

22. The method of claim 21, wherein the carbon nanomaterials are single-walled carbon nanotubes and the steroid acid surfactant is a salt of cholate or a salt of deoxycholate.

23. A method for dispersion of carbon nanomaterials in aqueous solution consisting essentially of:
adding carbon nanomaterials that are dissolved in a superacid into a basic aqueous solution containing a steroid acid surfactant to form a first aqueous solution comprising surfactant-encapsulated carbon nanomaterials wherein the carbon nanomaterials are individually dispersed;
adjusting pH of the first aqueous solution to a lower pH to precipitate surfactant-encapsulated carbon nanomaterials out of the first aqueous solution;
separating the first aqueous solution from the precipitated surfactant-encapsulated carbon nanomaterials; and
adding a second aqueous solution having increased pH compared to the adjusted pH of the first aqueous solution to the precipitated surfactant-encapsulated nanomaterials to redisperse the carbon nanomaterials in the second aqueous solution.

* * * * *